United States Patent
Niles et al.

(10) Patent No.: US 11,531,600 B2
(45) Date of Patent: Dec. 20, 2022

(54) PERSISTENT MEMORY IMAGE CAPTURE

(71) Applicant: MemVerge, Inc., Milpitas, CA (US)

(72) Inventors: Ronald S. Niles, San Jose, CA (US); Yue Li, Fremont, CA (US); Jun Gan, Milpitas, CA (US); Chenggong Fan, Milpitas, CA (US); Robert W. Beauchamp, Milpitas, CA (US)

(73) Assignee: MEMVERGE, INC., Milpitas, CA (US)

( * ) Notice: Subject to any disclaimer, the term of this patent is extended or adjusted under 35 U.S.C. 154(b) by 120 days.

(21) Appl. No.: 17/067,150

(22) Filed: Oct. 9, 2020

(65) Prior Publication Data

US 2021/0342229 A1 Nov. 4, 2021

Related U.S. Application Data

(60) Provisional application No. 63/050,032, filed on Jul. 9, 2020, provisional application No. 63/017,464, filed on Apr. 29, 2020.

(51) Int. Cl.
*G06F 11/14* (2006.01)
*G06F 3/06* (2006.01)
*G06F 9/46* (2006.01)

(52) U.S. Cl.
CPC ........ *G06F 11/1469* (2013.01); *G06F 3/0604* (2013.01); *G06F 3/0619* (2013.01); *G06F 3/0655* (2013.01); *G06F 3/0656* (2013.01); *G06F 3/0667* (2013.01); *G06F 3/0676* (2013.01); *G06F 3/0679* (2013.01); *G06F 9/461* (2013.01); *G06F 11/1451* (2013.01)

(58) Field of Classification Search
CPC ............ G06F 11/1469; G06F 11/1451; G06F 3/0679; G06F 3/0667; G06F 3/0656; G06F 3/0619; G06F 3/0655; G06F 3/0676; G06F 9/461; G06F 3/0604
See application file for complete search history.

(56) References Cited

U.S. PATENT DOCUMENTS

| | | | |
|---|---|---|---|
| 7,840,595 B1 | 11/2010 | Blitzer et al. | |
| 9,069,709 B1 | 6/2015 | Natanzon et al. | |
| 9,940,241 B1* | 4/2018 | Mehrotra | G06F 3/0688 |
| 10,754,844 B1 | 8/2020 | Jain et al. | |
| 10,802,747 B2 | 10/2020 | Sridharan | |

(Continued)

*Primary Examiner* — Mark A Giardino, Jr.
(74) *Attorney, Agent, or Firm* — Perkins Coie LLP

(57) ABSTRACT

A memory image can be captured by generating metadata indicative of a state of volatile memory and/or byte-addressable PMEM at a particular time during execution of a process by an application. This memory image can be persisted without copying the in-memory data into a separate persistent storage by storing the metadata and safekeeping the in-memory data in the volatile memory and/or PMEM. Metadata associated with multiple time-evolved memory images captured can be stored and managed using a linked index scheme. A linked index scheme can be configured in various ways including a full index and a difference-only index. The memory images can be used for various purposes including suspending and later resuming execution of the application process, restoring a failed application to a previous point in time, cloning an application, and recovering an application process to a most recent state in an application log.

57 Claims, 42 Drawing Sheets

(56) References Cited

U.S. PATENT DOCUMENTS

| | | | |
|---|---|---|---|
| 11,042,503 B1 | 6/2021 | Vig et al. | |
| 11,163,721 B1* | 11/2021 | Mahuli | G06F 16/16 |
| 2002/0162020 A1 | 10/2002 | Bellaton et al. | |
| 2003/0093444 A1 | 5/2003 | Huxoll | |
| 2004/0221030 A1 | 11/2004 | Huras et al. | |
| 2007/0006017 A1* | 1/2007 | Thompson | G06F 11/1466 |
| | | | 714/E11.125 |
| 2014/0215149 A1* | 7/2014 | Sampathkumar | G06F 3/0608 |
| | | | 711/114 |
| 2016/0314046 A1* | 10/2016 | Kumarasamy | G06F 11/1435 |
| 2018/0143881 A1 | 5/2018 | Singer et al. | |
| 2018/0267739 A1* | 9/2018 | Luo | G06F 12/0246 |
| 2019/0065383 A1 | 2/2019 | Loaiza et al. | |
| 2019/0114232 A1* | 4/2019 | Squires | G06F 11/1464 |
| 2019/0163372 A1 | 5/2019 | Sridharan | |
| 2019/0196914 A1 | 6/2019 | Goikhman et al. | |
| 2020/0073759 A1 | 3/2020 | Spottswood et al. | |
| 2020/0174926 A1* | 6/2020 | Roozbeh | G06F 11/3034 |
| 2020/0250046 A1 | 8/2020 | Wong et al. | |
| 2020/0349008 A1 | 11/2020 | Dawkins et al. | |
| 2020/0387523 A1 | 12/2020 | Jakkula et al. | |
| 2021/0034477 A1* | 2/2021 | Pederson | G06F 11/1471 |
| 2021/0064264 A1* | 3/2021 | Bajaj | G06F 3/0619 |
| 2021/0096841 A1 | 4/2021 | Iwata et al. | |
| 2021/0303407 A1* | 9/2021 | Keller | G06F 11/1471 |
| 2021/0328593 A1* | 10/2021 | Kesavan | G06F 16/13 |

* cited by examiner

State 1802

State 1804

- Object with no child deleted

State 1806

- Delete object having one child

FIG. 27

PERSISTENT MEMORY IMAGE CAPTURE

CROSS-REFERENCE TO RELATED APPLICATION(S)

This application claims the benefit of U.S. Provisional Application No. 63/050,032, titled "RESTORE, CLONE, AND RECOVERY USING CAPTURED MEMORY IMAGES," filed on Jul. 9, 2020, and U.S. Provisional Application No. 63/017,464, titled "CAPTURE AND MANAGEMENT OF MEMORY IMAGES," filed on Apr. 29, 2020, the contents of which are hereby incorporated by reference in their entireties.

TECHNICAL FIELD

The present disclosure relates generally to memory management in a computer system, and more particularly, to the capture, management, and use of memory images.

BACKGROUND

The computer industry continues to develop and refine solid-state storage devices and media, moving closer and closer to achieving memory-class storage. In the past several years the access latency of affordable storage devices has dramatically decreased and is expected to continue to decrease in coming years. At the same time, advances in networking technology have led to increases in bandwidth with commensurate decreases in latency. Further, the emergence of standardized remote direct memory access (RDMA) functionality, allowing computers in a network to exchange data in main memory without involving the processor, cache or the operating system, has led to improvements in communication efficiency and further reduced latency.

These faster computing infrastructures demand new data architecture where both memory-speed data access and disk-like high storage density are strongly desired at the same time. Such new data architecture can bring significant performance improvements to computing tasks whose working data set sizes exceed dynamic random-access memory (DRAM) capacity, and where highly frequent data movements between DRAM and lower storage tiers, such as solid-state drive (SSD) and hard disk drive (HDD), are therefore required.

To reduce the possible access latency between DRAM and lower-level memory devices, operating system support of emerging persistent memory (PMEM) technology has created mechanisms for a user-space application to have direct access (DAX) to PMEM media (i.e., without the access being performed by operating system software). PMEM generally refers to solid-state byte-addressable memory devices that reside on a memory bus of a given system. Being on the memory bus allows PMEM to have similar speed and latency to DRAM while enjoying the benefit of the non-volatility of SSDs and HDDs. Examples of existing solutions from providing DAX to PMEM include "NOVA," "Strata," "Octopus," "Hotpot," and "FluidMem."

BRIEF DESCRIPTION OF THE DRAWINGS

FIG. 27 shows a diagram of various example transaction logs associated with a recovery process;

DETAILED DESCRIPTION

1. Overview

Figure 1:
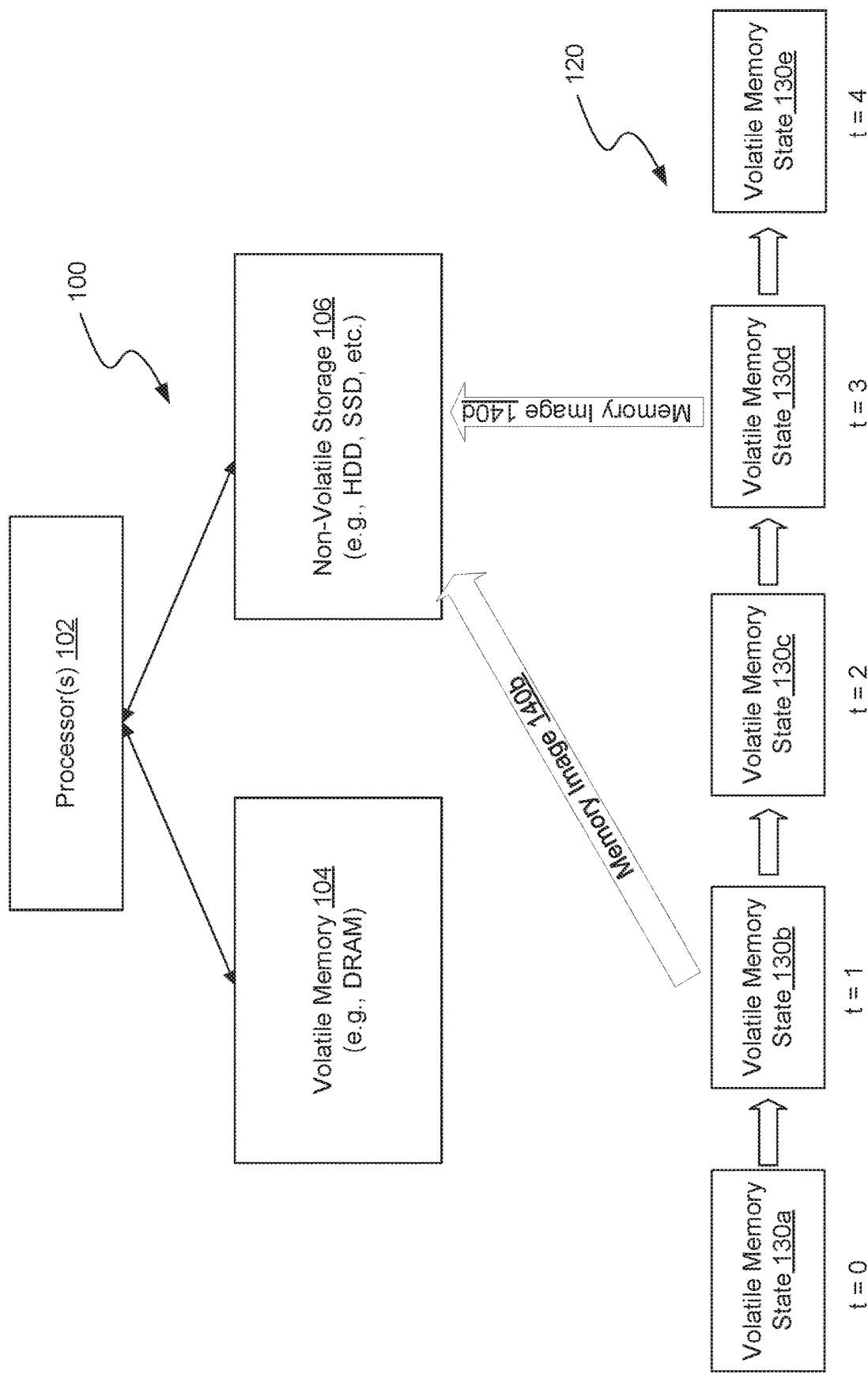
FIG. 1 shows a high-level diagram that illustrates an existing technique for capturing memory images that includes copying in-memory data from volatile memory into a non-volatile storage.

Saving and restoring an executing application process is an important functionality in various computing contexts such as: suspending execution to temporarily free resources, suspending execution to enter a hibernation mode, migrating a process to another environment for upgrades or load-balancing, creating additional instances of a process for greater throughput, and/or resuming execution of a recent save point after a failure. Saving and restoring an executing application process may require capturing an image of a state of the memory (referred to herein as a "memory image") that is utilized by the executing application.

Capturing such a memory image (also referred to as a "snapshot") typically includes freezing or otherwise suspending execution of the application process, while a copy of the state of the volatile memory (e.g., DRAM, synchronous DRAM (SDRAM), and/or static random-access memory (SRAM)) is created and saved to a persistent storage device such as a HDD. The operations associated with copying data from volatile memory and storing such data in a non-volatile storage are not performed instantaneously. Due to various constraints (e.g., speed of the volatile memory, speed of the memory bus, speed of the HDD, etc.), operations associated with copying and moving data from volatile memory into non-volatile storage can take up to one or more minutes, depending on the amount of data.

The time needed to create and save a memory image can impact overall system performance since it impacts how long a process must remain in a frozen state to create the memory image. Thus, the ability to quickly and efficiently save memory images can improve overall system performance, particularly in a failure restart use case. For example, reducing the time needed to save a memory image can reduce a period of suspension to a level that is suitable to an application process (e.g., to meet a service response time objective). As another example, reducing the time needed to save a memory image can facilitate more frequent captures which can improve failure-recovery time, because less catch-up work is required to get back to the state right before the failure. Further, beyond the time required to create a memory image, there is a processing cost associated with collecting and copying large amounts of data.

Some use cases attempt to avoid this data processing overhead by maintaining some power to the volatile memory to prevent data loss. For example, in contrast with hibernation which typically involves moving data from volatile memory into non-volatile storage, a low power sleep mode may power down certain processing functions while still maintaining power to the volatile memory hardware to preserve the in-memory data in the volatile memory unit the computer wakes from the sleep mode. While sleep mode enables a computer to retain its state and resume execution, it still relies on power being supplied to the volatile memory hardware. Accordingly, existing sleep modes do not effectively persist the state of the volatile memory in a robust manner that prevents data loss when power is lost.

Introduced herein is a technique for capturing and managing process memory images that reduces the amount of data that needs to be copied and/or generated which can therefore reduce the amount of time and processing resources needed to capture such a memory image. In some embodiments, an application may utilize at least some PMEM in place of volatile memory (e.g., DRAM) to store and access in-memory data during execution of a process. This use of PMEM in place of volatile memory is referred to herein as "volatile mode PMEM." In some embodiments, enabling the application to use volatile-mode PMEM can include virtualizing a memory object as anonymous byte-addressable memory for use by the application. A memory image can then be captured during execution of the process by generating and storing metadata indicative of a particular state of the PMEM at a particular time and by safekeeping, retaining, preserving, or otherwise persisting a particular state of the in-memory data in the PMEM at the particular state of the PMEM. In the case of a virtualized memory object, most of the metadata indicative of the state of the PMEM may already be available to a memory capturing operation since a service providing the virtualized memory object and managing allocations may maintain a continually updated record of mappings associated with the PMEM.

Since the PMEM is persistent by nature, embodiments of the introduced technique that include the use of PMEM do not require copying the in-memory data from the PMEM to a separate non-volatile storage, as would be required in the case of volatile memory such as DRAM. Further, the metadata generated to indicate a state of the PMEM can be relatively small in comparison to the in-memory data (e.g., on the order of kilobytes or megabytes of metadata vs. gigabytes of in-memory data). This can greatly reduce the time and processing costs of capturing a memory image since the in-memory data is already essentially in a persistent state. For example, several gigabytes of data in volatile memory (e.g., DRAM) may take up to a minute or more to copy into a separate persistent storage device to effectively capture a memory image. Conversely, capturing a memory image using the introduced technique, where a similar amount of data is mapped into volatile-mode PMEM, may take only seconds or fractions of a second to create since most of the data needed to capture the image (i.e., the in-memory data) is already effectively stored in a persistent state in the PMEM.

While certain example embodiments are described herein in the context of PMEM, the introduced technique can be implemented with other memory technology that shares the persistent characteristics of PMEM. Further, the introduced technique can also be implemented with other memory technology that does not share the persistent characteristics of PMEM such as volatile memory (e.g., DRAM). For example, embodiments of the introduced technique can be applied to capture memory images based on volatile memory (e.g., DRAM) without the use of PMEM. While such embodiments may not support restoration after a power failure (without separately moving data to a non-volatile storage), such embodiments can support other functionalities such as resume/restore of an interrupted application process.

2. Capturing Memory Images

FIG. 1 shows a high-level diagram that illustrates an existing technique for capturing memory images. As shown in FIG. 1, an existing computer system 100 may include one or more processors 102 that are communicatively coupled to volatile memory 104 and non-volatile storage 106. The one or more processors 102 may include, for example, central processing units (CPUs), graphics processing units (GPU), field programmable gate arrays (FPGAs), programmable logic devices (PLDs), application-specific integrated circuits (ASICs), or any other general or special purpose processing devices. The volatile memory 104 may include DRAM, SDRAM, SRAM, or any other volatile memory media. The non-volatile storage 106 may include HDD, SSD, or any other non-volatile media configured for data storage (as opposed to memory). Non-volatile storage 106 is relatively cheap as compared to volatile memory 104 which allows for higher capacities and higher densities; however, such non-volatile storage 106 is slow and therefore generally not suitable for use as memory. Conversely, while much faster than non-volatile storage 106, volatile memory 104 is expensive which leads to lower capacities and lower densities. Further, volatile memory 104 is, by its nature, volatile, which means that data stored in memory is lost when power is lost.

In general, instructions are executed by the processor 104 by storing data in volatile memory 104 and accessing such data to perform computations. Such data is considered to be "in-memory" as opposed to in storage. As instructions are executed, the data is manipulated which changes the state of the data stored in volatile memory 104. In other words, processing includes continually accessing a current memory state which results in a new memory state. This is reflected in the volatile memory state progression 120 depicted in FIG. 1. As shown in FIG. 1, over time from time t=0 to time t=4, the volatile memory 104 progresses through multiple states 130*a-e* as instructions are executed by the processor 102. In other words, each of the volatile memory states 130*a-e* may represent a particular state of the volatile memory 104 (including a particular state of the in-memory data in volatile memory 104) at a particular time. For example, the in-memory data at volatile memory state 130*a* at first time (t=0) may be different than the in-memory data at volatile memory state 130*c* at a later second time (t=3).

Note, indicated time values (e.g., times t=0 through time t=4) are used to indicate temporal sequence, but are not intended to indicate actual time values or to imply that the period between indicated time values is uniform. For example, the period between time t=0 and time t=1 may be different than the period between time t=1 and time t=2. This nomenclature may apply to other figures described herein.

Since the memory 104 is volatile, any interruption (e.g., due to power loss or crash) will typically result in a loss of data that is in memory. As a result, such interruptions may require the instructions executed by the processor 104 to be restarted from the beginning. To mitigate the impact of such interruptions, existing systems may capture memory images at various times during execution. For example, FIG. 1 depicts a first memory image 140*b* captured based on a first volatile memory state 130*b* and a second memory image 140*d* captured based on second volatile memory state 130*d*.

Notably, since volatile memory 104 is not persistent itself, persisting memory images 140*b* and 140*d* requires copying data that is in the volatile memory 104 into the non-volatile storage 106. Further, since copying data is not instantaneous, capturing a memory image during execution of a process by an application typically includes freezing or otherwise suspending execution of the process, while a copy of the state of the volatile memory (e.g., volatile memory state 130*b*) is generated and saved to non-volatile storage 106. For example, in an existing Linux capture procedure, the collected process state information includes: 1) information regarding external connections (e.g., file descriptors, inter-process communication channels, network connections, etc.), 2) information regarding execution state (e.g., CPU registered context for each execution thread), 3) credentials, 4) memory region descriptions (e.g., address range, access rights, backing image if any, etc.), and 5) the memory content (i.e., data in memory) of any un-backed volatile memory 104 regions. Collecting the memory region descriptions (item 4) and copying the memory content of un-backed volatile memory 104 (item 5) can take a significant amount of time and computing resources, particularly where large of amounts of data (e.g., gigabytes of data) are in memory. Even when using relatively high-speed non-volatile storage devices such as SSD, the process of copying and storing multiple gigabytes of data from volatile memory 104 may take several minutes. Since the data in volatile memory 104 must remain in a current state until the capture is complete, the application process must remain frozen during this time which introduces significant processing delays.

Figure 2:
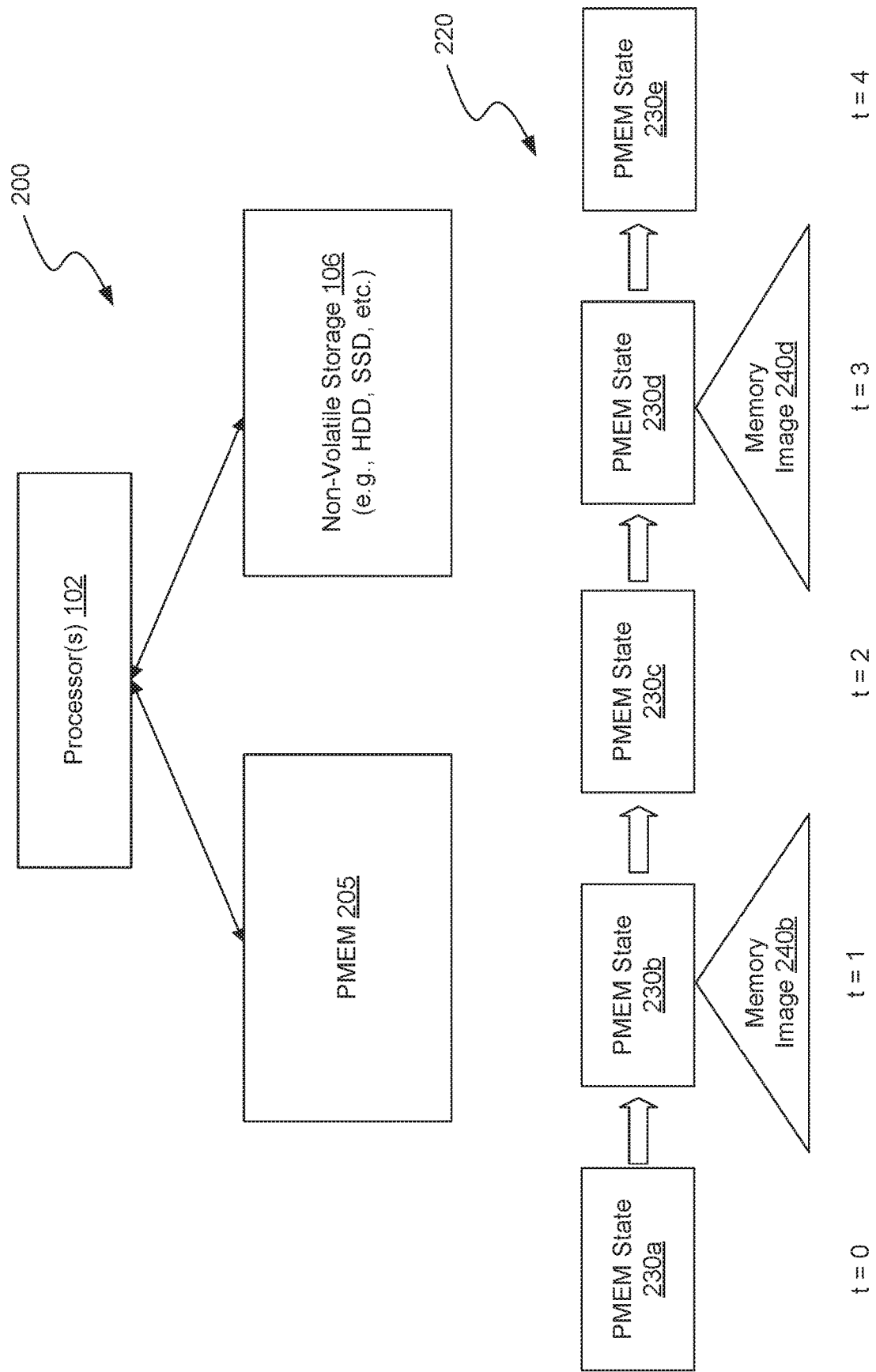
FIG. 2 shows a high-level diagram that illustrates a concept for capturing memory images based on persistent states of PMEM, according to an embodiment of the introduced technique.

In contrast with the scenario depicted in FIG. 1, an embodiment of the introduced technique may involve safekeeping, retaining, preserving, or otherwise persisting states of in-memory data in the PMEM itself instead of copying in-memory data to a separate non-volatile storage. FIG. 2 shows a high-level diagram that illustrates a concept for capturing memory images based on persistent states of PMEM, according to an embodiment of the introduced technique. As shown in FIG. 2, a computer system 200 includes one or more processors 102 and may include non-volatile storage 106, similar to example computer system 100 of FIG. 1. In contrast with computer system 100, computer system 200 may include PMEM 205 in place of (or in addition to) volatile memory.

As previously mentioned, residing on the memory bus enables PMEM 205 to have similar speed and latency as volatile memory 104 while retaining the persistent characteristics of non-volatile storage 106. Thus, PMEM 205 can be used in a volatile mode as byte-addressable memory to support execution of instructions by the processor 102. In other words, PMEM 205 can take the place of volatile memory such as DRAM.

As with computer system 100, instructions are executed by the processor 104 by storing data in memory and accessing such data to perform computations. However, the data stored in memory may now be stored in PMEM 205. As instructions are executed, the data is manipulated which changes the state of PMEM 205. This is reflected in the PMEM state progression 220 depicted in FIG. 2. As reflected in the PMEM state progression 220, over time from t=0 to t=4, the PMEM 205 progresses through multiple states 230a-e as instructions are executed by the processor 102. In other words, each of the PMEM states 230a-e may represent a particular state of the PMEM 205 (including a particular state of the in-memory data in PMEM 205) at a particular time. For example, the in-memory data at PMEM state 230a at first time (t=0) may be different than the in-memory data at PMEM state 230c at a later second time (t=3).

Computer system 200 can be configured to capture memory images at various times during execution, according to an embodiment of the introduced technique. For example, FIG. 2 depicts a first memory image 240b captured based on a first PMEM state 230b and a second memory image 240d captured based on second PMEM state 230d. However, in contrast with existing techniques for capturing memory images, the existing technique does not require copying the data in PMEM 205 into a separate non-volatile storage (e.g., non-volatile storage 106). This is because, the data in PMEM 205 is already stored in a persistent state due to the persistent nature of PMEM 205. Accordingly, memory images 240b and 240d can be captured without performing the computationally expensive and time-consuming operations associated with copying data from PMEM 205 into a separate persistent device (e.g., non-volatile storage 106). Instead, the memory images 240b and 240d can be persisted by just collecting, generating, identifying, changing, recording, or otherwise obtaining metadata that is indicative of a particular state of PMEM 205. Such metadata may include, for example, metadata indicative of volatile-mode PMEM mappings such as pointers to portions of the PMEM 205 where content data is stored, which will generally include far less data than the actual content data.

The computer system 200 and associated process described with respect to FIG. 2 is an example provided for illustrative purposes and is not to be construed as limiting. In practice, a computer system may have more components than are depicted in FIG. 2, including additional memory devices. For example, although PMEM 205 is described as taking the place of volatile memory 104, this is not intended to imply that the introduced technique cannot be implemented in a computer system that includes volatile memory as well as PMEM.

Figure 3:
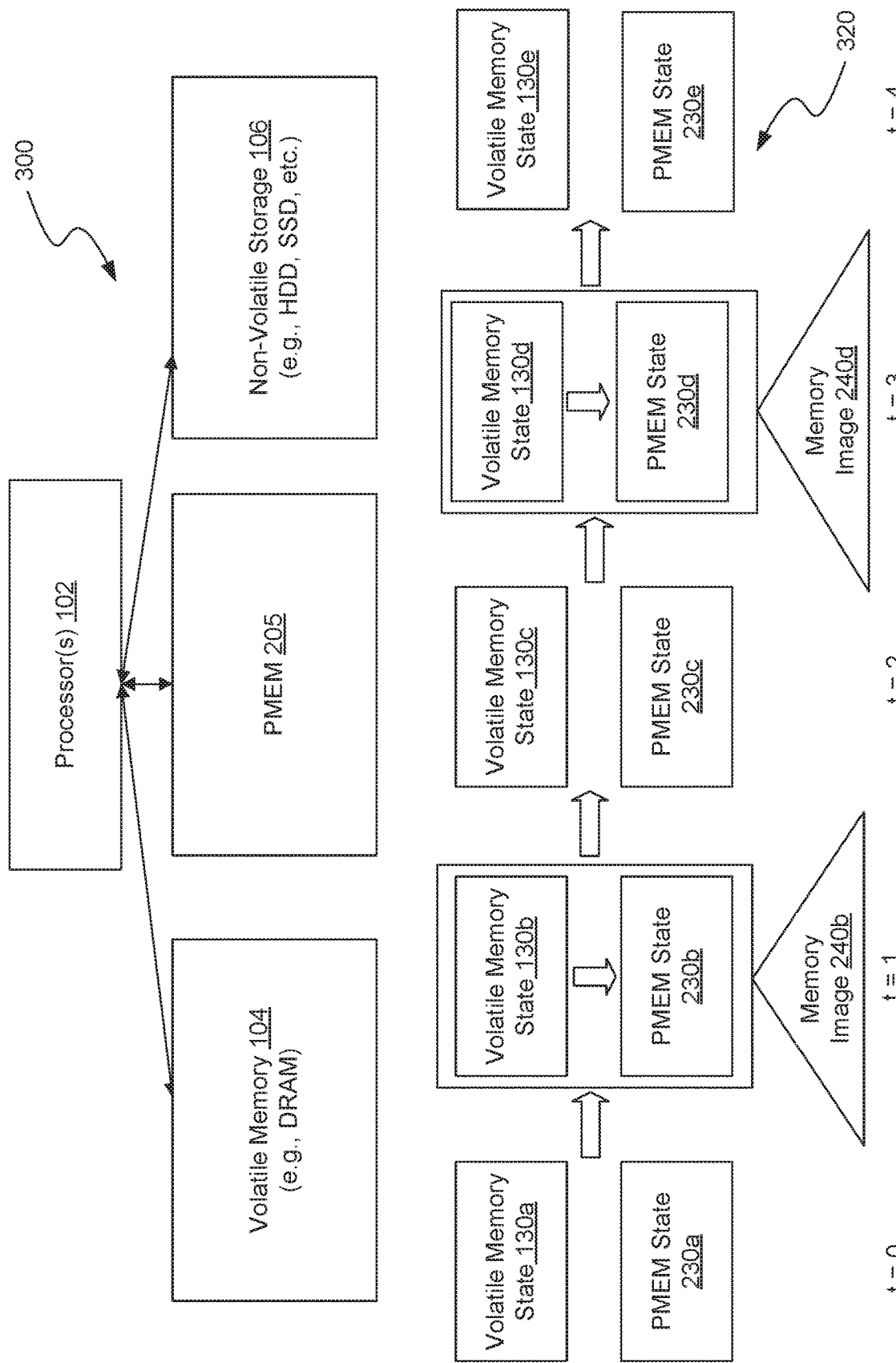
FIG. 3 shows a high-level diagram that illustrates a concept for capturing memory images in a computer system that includes both volatile memory and PMEM, according to an embodiment of the introduced technique.

FIG. 3 shows a high-level diagram that illustrates a concept for capturing memory images in a computer system that includes both volatile memory and PMEM, according to an embodiment of the introduced technique. As shown in FIG. 3, a computer system 300 includes both volatile memory 104 and PMEM 205. Instructions executed by processor 102 may, for various reasons, utilize both volatile memory 104 and PMEM during execution. For example, certain tasks may require the lower latency of volatile memory 104. In such cases, and as indicated by memory state progression 320, the volatile memory 104 and PMEM 205 will progress through multiple states 130a-e and 230a-e (respectively) over time over time from t=0 to t=4 as instructions are executed by the processor 102.

As with computer system 200, computer system 300 can also be configured to capture memory images at various times during execution of a process. For example, FIG. 3 depicts a first memory image 340b captured based on a first volatile memory state 130b and a first PMEM state 230b, and a second memory image 340d captured based on a second volatile memory state 130d and a second PMEM state 230d. Since data in volatile memory 104 is not stored in a persistent state, capturing and persisting a memory image may include copying certain content data from volatile memory 104 into PMEM 205 (or other non-volatile storage 106). In other words, data copied from volatile memory 104 may be merged, migrated, flushed, or otherwise stored in PMEM 205 to persist an image of the overall memory state associated with a process. For example, data associated with volatile memory state 130b can be copied into PMEM 205 which, along with PMEM state 230b, may form a memory image 240b of the overall memory state at a given point in time. This can be extended to any other volatile memory including processor-level caches, GPU memory, etc. Despite the additional time and computing resources needed to copy content data from volatile memory 104 into PMEM 205, this still may represent an improvement over existing approaches where all the data in memory is in volatile memory 104.

In some embodiments, a persistent memory object that is based, at least in part, on physical PMEM media can be virtualized as anonymous byte-addressable volatile-mode memory for use by an application process.

2.1 Persistent Memory Objects

Figure 4:
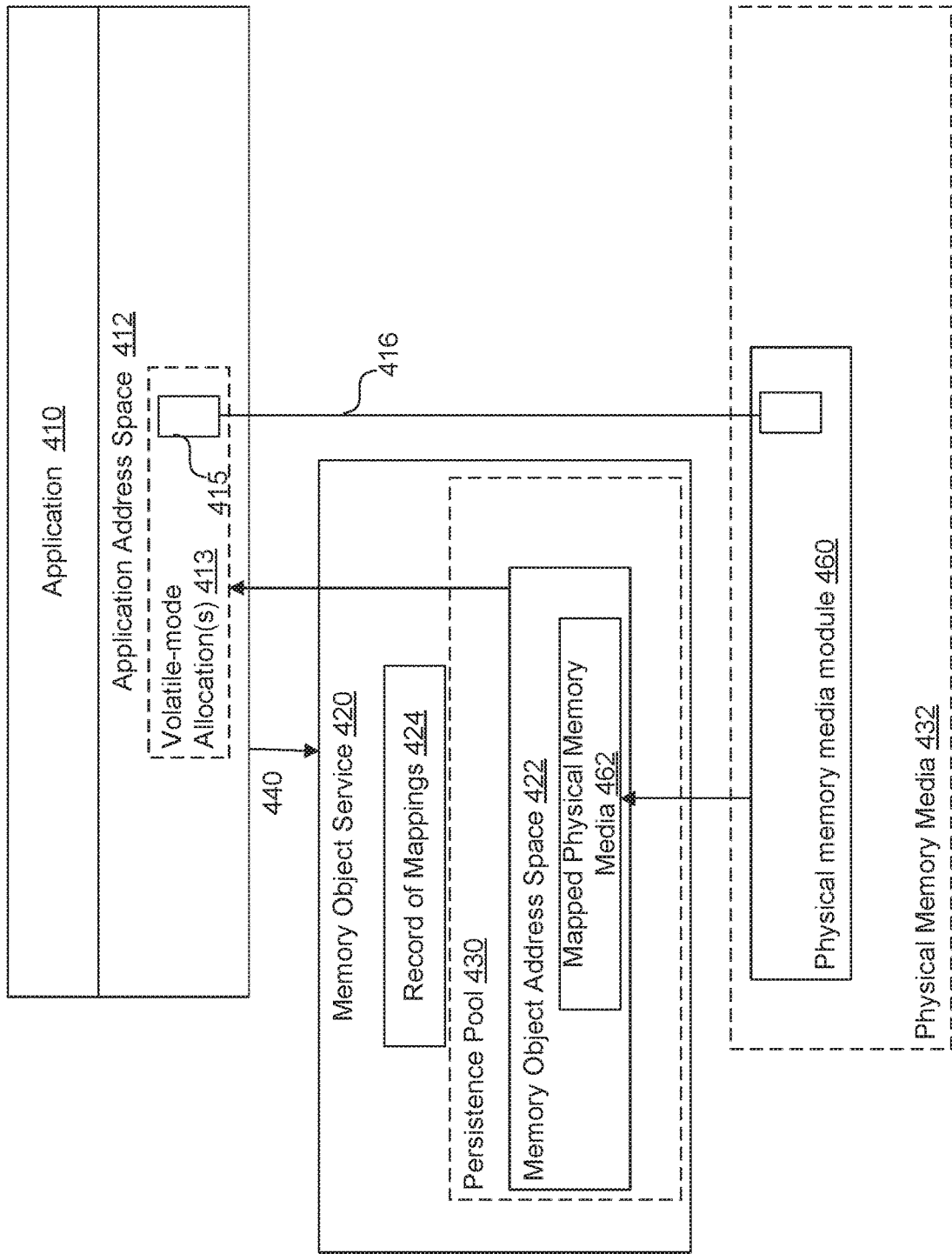
FIG. 4 shows a diagram of an application utilizing a persistent memory object for byte-addressable volatile-mode memory.

FIG. 4 shows a diagram of an application 410 utilizing a persistent memory object for byte-addressable volatile-mode memory. To execute a process, the application 410 can call (operation 440) one or more memory functions to allocate volatile-mode memory. For example, application 410 may call a function via an application programming interface (API) associated with a memory object service 420. Alternatively, the application may call one or more functions in a software library of a standardized programming language (e.g., C, C++, etc.) that can be intercepted and processed by the memory object service 420. For example, the C standard library includes C dynamic memory allocation functions such as malloc( ) which allocates a specified number of bytes. Other standardized memory functions include mmap( ), mmap64( ), munmap( ), mprotect( ), madvise( ), etc.

In response to the call at operation 440, the memory object service 420 may allocation a portion of PMEM 460 that is mapped to one or more byte-addressable memory objects. In some, embodiments, the one or more byte-addressable memory objects may be persistent memory objects and may be created and/or maintained using a persistence memory pool that is based on various physical memory media. For example, the memory object service 420 may manage and maintain a memory persistence pool 430 that is backed by one or more physical memory media 432. In the example depicted in FIG. 4, the physical memory media module 460 may represent physical PMEM media such as one or more non-volatile dual in-line memory modules (NVDIMMs) and/or physical volatile memory media (e.g., DRAM DIMMs) that are communicatively coupled to a memory bus of a computer system or the memory busses of multiple computing nodes in a distributed system. In some embodiments, at least some of the physical memory media 460 may be mapped to an address space 422 associated with a memory object (e.g., mapped physical memory media 462). In other words, the mapped portion of physical memory media 460 is being utilized as part of the persistence pool 430 managed by the memory object service 420. The memory object (or a portion thereof) can be mapped to the application address space 412 of the application 410 as one or more volatile-mode allocations 413. The volatile-mode allocations 413 can be conceptualize as "pseudo-volatile" since they are byte-addressable (like volatile memory) although they are made via the persistence pool 430 using a persistent memory object and may be implemented using non-volatile memory media such as PMEM.

As the application 110 executes an application process, one or more pages in the application address space 112 may be mapped to an allocated portion of the physical memory media 460. For example, FIG. 4 depicts page 415 mapped to the physical memory media 460, as indicated by line 416. The application 412 can then write to and access data stored in the physical memory media 460 using the associated mapped pages in the application address space 412. The memory object service 420 may maintain and dynamically update a record of the mappings 424 as the application 410 executes one or more application processes.

2.2 Image Capture Using Persistent Memory

Figure 5:
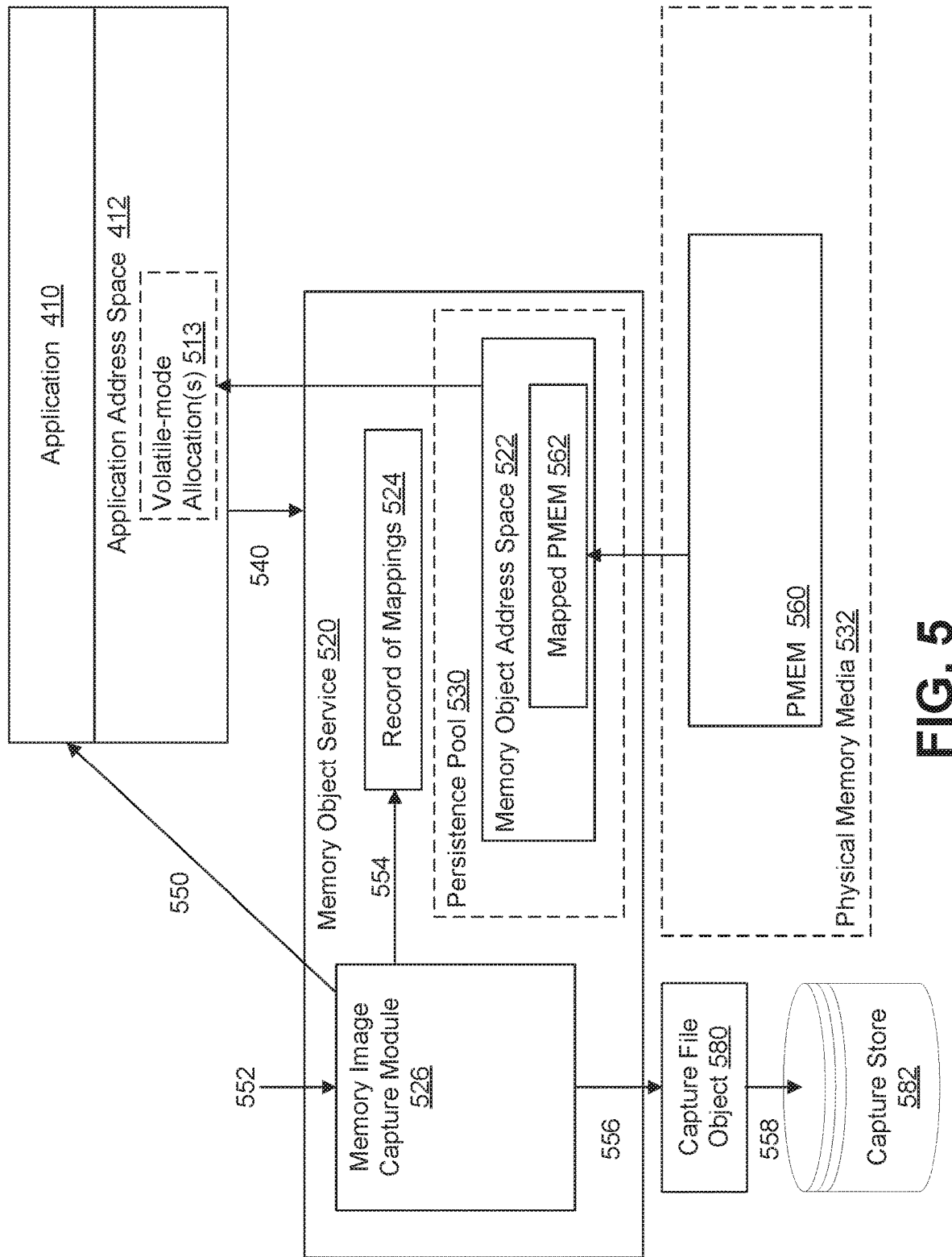
FIG. 5 shows a diagram illustrating an example process for capturing a memory object based on data in PMEM, according to an embodiment of the introduced technique.

FIG. 5 shows an architecture flow diagram that illustrates an example process for capturing a memory image in a computer system that include PMEM. The system depicted in FIG. 5 is similar to that depicted in FIG. 4, except that the memory object service 520 (analogous to memory object service 420) further includes a memory image capture module 526 that is configured to perform one or more operations associated with capturing a memory image, according to an embodiment of the introduced technique. Further, the physical memory media 532 (analogous to physical memory media 432) includes PMEM 560 (e.g., one or more NVDIMMS) which is mapped to a memory object address space in a persistence pool associated with the memory object service 520. For example, FIG. 5 depicts mapped PMEM 562 in a memory object address space 522 (analogous to memory object address space 422) in the persistence pool 530 (analogous to persistence pool 430). The memory object (or a portion thereof) can be mapped to the application address space 412 of the application 410 as one or more volatile-mode allocations 513 (analogous to volatile mode allocations 413).

The memory image capture module 526 may be implemented in hardware and/or software. The memory image capture module 526 is depicted as a module within the memory object service 520 for illustrative purposes; however, this is not to be construed as limiting. In some embodiments, the memory image capture module 526 may not be part of the memory object service 520. Further, in some embodiments, the functionality associated with the memory image capture module 526 may be divided into more than one module.

To execute an application process, the application 410 can call (operation 540) one or more memory functions to allocate volatile-mode memory, for example, as described with respect to operation 440 of FIG. 4. At any point during execution of the application process, the memory image capture module 526 may initiate an image capture procedure by, at operation 550, causing the application 410 to freeze execution of an ongoing process. Note, although depicted in FIG. 5 as a direct communication between memory image capture module 526 and application 410, other embodiments may facilitate freezing an application process in a different manner. For example, memory image capture module 526 may communicate with a computer operating system to cause application 410 to freeze execution of a process.

In some embodiments, the memory image capture module 526 initiates an image capture procedure in response to an input received at operation 552. The input received at operation may, for example, be an event indicative of an application processing failure, computer system failure, overloaded computer system resources, scheduled recovery point image capture, request to migrate the application to another computer system, request to create an additional instance of the application, or any other event that may necessitate a memory image capture.

Once the process executed by application 410 is frozen, write protection is set on the memory mappings associated with the process (e.g., mapping 416 shown in FIG. 4) to set up a copy-on-write (CoW) operation. In other words, the data in place in PMEM 560 that is mapped to the application address space 412 is write protected such that if the process (or another process) attempts to modify the data, a CoW operation is automatically performed to create a separate copy of the data. This write protecting is performed since the data stored in PMEM 560 will be used as the save point to capture the memory image. Note, for illustrative clarity, page mappings between the physical PMEM media 560 and the application address space 412 (e.g., similar to page 415 in FIG. 4) are not depicted in FIG. 5.

With the mapped data in PMEM 560 write protected, the memory image capture module 526 may begin capturing the state of the PMEM mappings associated with the application process. In some embodiments, and although not depicted in FIG. 5, this can include collecting information indicative of external connections associated with the process (e.g., file descriptors, inter-process communication channel, network connections, etc.), information indicative of the execution state of the process (e.g., CPU registers for each execution thread), information indicative of credentials associated with the process, or any other relevant information associated with the process. Such information may be collected by communicating with an operating system of a computing system on which application 410 is executing the process.

Notably, the memory object service 520 already has information associated with memory regions descriptions since it maintains, and continually updates, the record of mappings 524 (analogous to the record of mappings 422). Accordingly, unlike existing memory capture techniques, the introduced technique can skip the time-consuming process of collecting all of the details of the memory areas in use by the process while the process is frozen. Further, in-memory data associated with the process that is stored in PMEM 560 is already saved in a persistent state since the PMEM 560 is persistent by nature. Therefore, in some embodiments, to capture the memory image, the memory image capture module 526 may, at operation 554, access the record of mappings 524 to collect, generate, identify, change, record, or otherwise obtain data indicative of the memory region descriptions associated with the process. In some embodiments, the memory image capture module 526 may generate metadata that describes or is otherwise indicative of one or more volatile-mode PMEM mappings associated with the process at a frozen process state associated with the process. This metadata may include, for example, first metadata indicative of mappings, at the frozen process state, from the logical application address space 412 to a file offset of a portion of PMEM 560 (or the mapped PMEM 562) allocated to the process, and second metadata indicative of mappings, at the frozen process state, from the file offset to the overall physical media space of the PMEM 560 (or some sub module thereof).

Since the data in PMEM 560 is already persistently stored, this data will comprise the content of the memory image (as opposed to a copy of the data from volatile memory media such as DRAM). Therefore, the metadata describing the volatile-mode PMEM mappings, along with any other process state information collected from the operating system, may effectively capture the memory state of the process when it was frozen. Further, since this metadata is based on the record of the mappings 524, and since the mappings were previous write protected, any operations associated with generating and storing such metadata can be performed outside of the freeze time. In other words, the previously frozen process can resume execution before the metadata describing a memory image is finalized. This can dramatically reduce the amount of time the process must remain frozen to effectively capture the memory image.

In some cases, some data associated with the application process may have to be in a cache (e.g., a CPU cache) when execution was frozen. In other words, the data in PMEM 560 may not comprise the entire memory contents associated with the state of the application process when execution was frozen. In such cases, the introduced technique may additionally include flushing data from the cache to PMEM 560 (or some other persistent storage) after unfreezing the process. If flushing to PMEM 560, such flushing may occur after the volatile-mode PMEM mappings associated with the process are write protected.

Once the metadata description of the memory image is finalized, the memory image can be persisted by creating, at operation 556, a capture file object 580 based on the metadata and storing, at operation 558, the capture file object in a capture store 582. The capture file object 580 created at operation 556 may include the metadata indicative of a particular state of volatile-mode PMEM mappings associated with the process at a particular time. In some embodiments, the capture file object 582 may additionally include any data flushed from the application process or a cache that is not yet stored in PMEM 560. Note that a separate capture store 582 is depicted in FIG. 5 to illustrate a logical store for data associated with memory images but may not require a separate data storage device. For example, in some embodiments, the metadata associated with the capture file object 580 (e.g., the metadata descriptions of the PMEM mappings) may be stored in the PMEM 560 associated with the memory object service 520. Additional details regarding the structure and management of a memory image captured according to the introduced technique are described with respect to FIGS. 14-22.

The diagram in FIG. 5 illustrates an example system and is not to be construed as limiting. Other embodiments may include more or fewer components than are depicted in FIG. 5. For example, in some embodiments, PMEM 560 may represent a single physical PMEM module (e.g., a single NVDIMM). Alternatively, in other embodiments, PMEM 560 may represent a pool of multiple physical PMEM modules located in a single location or distributed across multiple locations. In some embodiments, the persistent memory object may be a distributed memory object (DMO) as described with respect to FIGS. 33-41. In such an embodiment, the memory object service 520 may correspond to a DMO service (e.g., DMO service 3610 in FIG. 36).

Figure 6:
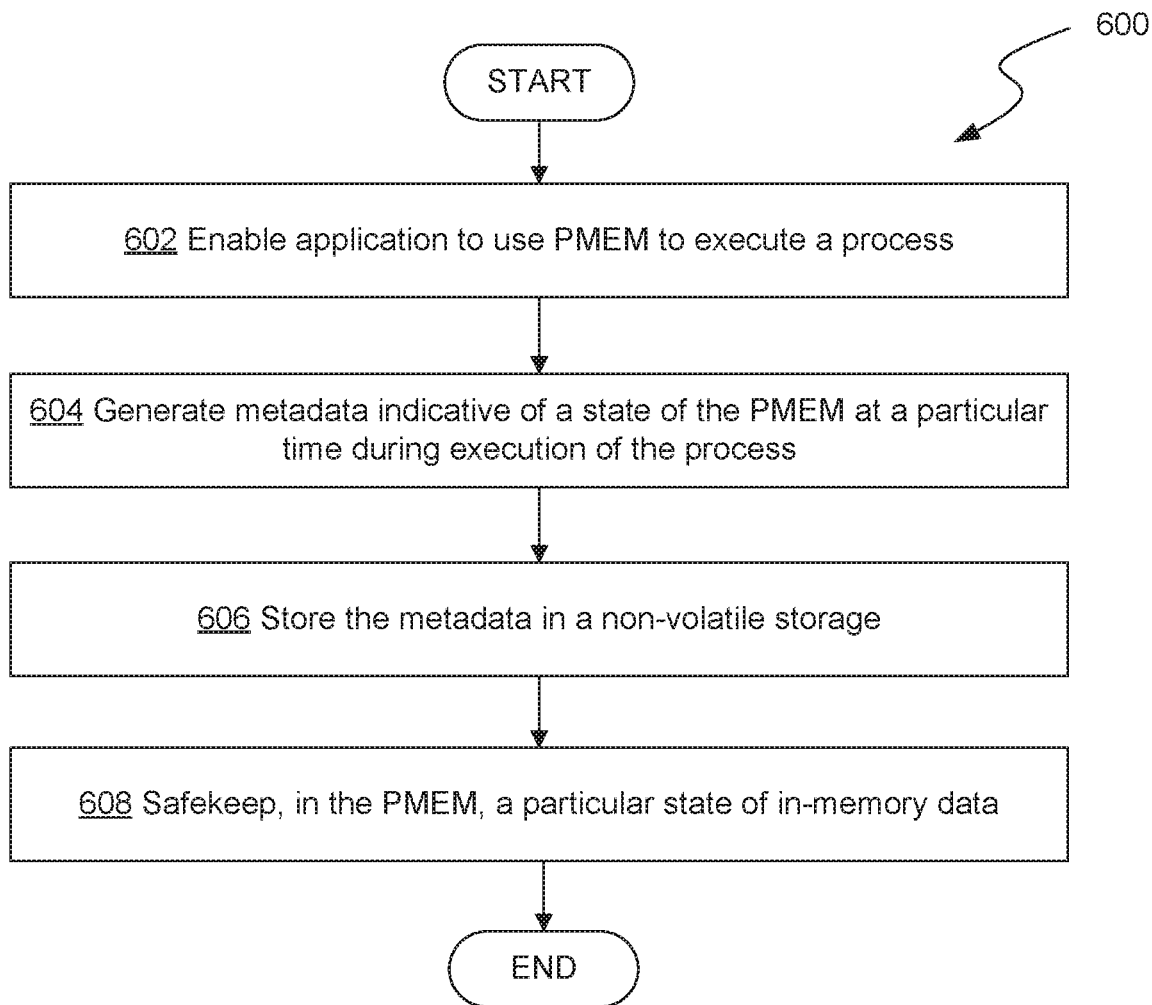
FIG. 6 shows a flow diagram of an example process for capturing a memory image using PMEM, according to an embodiment of the introduced technique.
Figure 7:
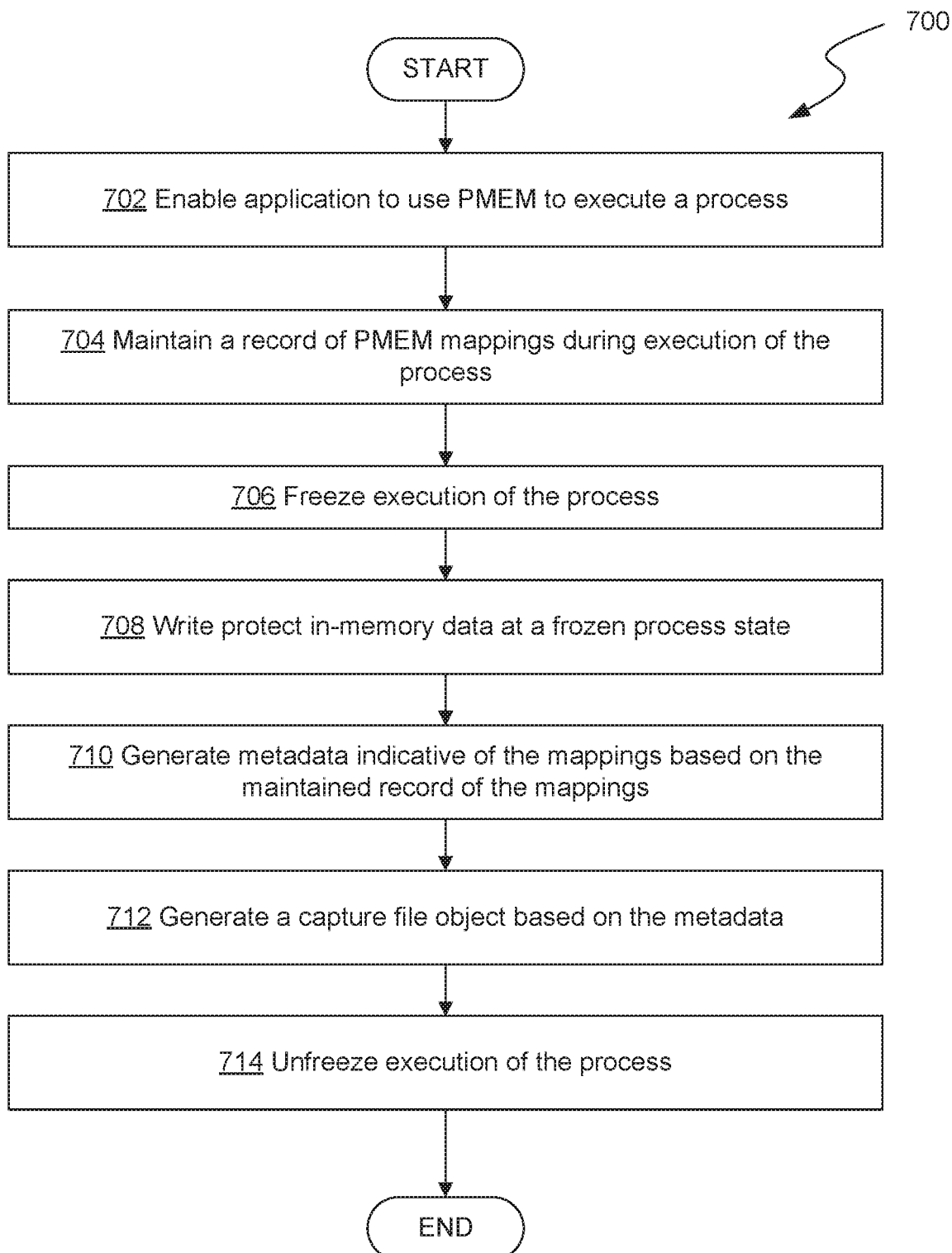
FIG. 7 shows a flow diagram of another example process for capturing a memory image using PMEM, according to an embodiment of the introduced technique.
Figure 8:
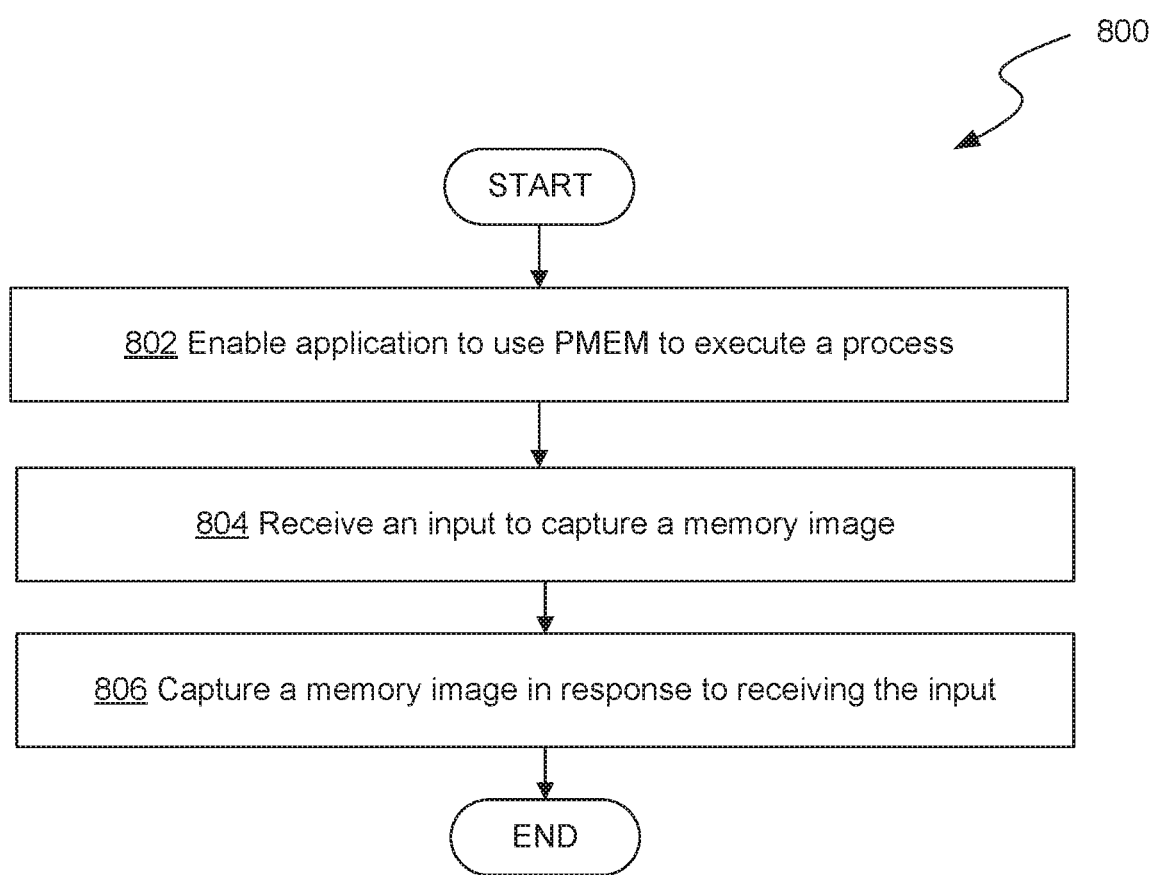
FIG. 8 shows a flow diagram of an example process for capturing a memory image using PMEM in response to an input, according to an embodiment of the introduced technique

FIGS. 6-8 show flow diagrams of example processes 600-800 capturing memory images using PMEM, according to embodiments of the introduced technique. Certain operations of the example processes 600-800 are described with reference to components described with respect to FIGS. 4-5. Example processes 600-800 can be executed by one or more of the components of a computer system such as the example processing system 4200 described with respect to FIG. 42. For example, in some embodiments, example processes 600-800 may be represented in instructions stored in memory that are then executed by a processor. Alternatively, or in addition, certain operations associated with example processes 600-800 may be implemented in hardware such as a memory controller. In this context, a memory controller may include one or more digital circuits. The digital circuitry of the memory controller may include programmable circuitry such FPGAs, PLDs, etc., special-purpose hardwired (i.e., non-programmable) circuitry such as ASICs, or a combination of such forms, that are programmed or otherwise configured to perform one or more memory management operations. Such a memory controller may be a standalone memory controller or may be integrated into another component such as CPU or a memory module (e.g., an NVDIMM). The processes 600-800 described with respect to FIGS. 6-8 are examples provided for illustrative purposes and are not to be construed as limiting. Other processes may include more or fewer operations than depicted, while remaining within the scope of the present disclosure. Further, the operations depicted in example processes 600-800 may be performed in a different order than is shown.

FIG. 6 shows a flow diagram of an example process 600 for capturing a memory image using PMEM, according to an embodiment of the introduced technique.

Example process 600 begins at operation 602 with enabling an application (e.g., application 410) to use PMEM (e.g., PMEM 560) as volatile-mode memory to execute an application process. When executing such an application process, the application may store (i.e., write) data in the PMEM and may access (i.e., read) stored data (i.e., in-memory data) from the PMEM. In some embodiments, the application may use the PMEM as volatile-mode memory in place of actual volatile memory such as DRAM to execute the application process.

In some embodiments, enabling the application to access the PMEM may include virtualizing or otherwise providing (e.g., using a memory object service 520) a persistent memory object as anonymous byte-addressable memory for use by the application. The persistent memory object may represent a virtual layer between a logical address space associated with the application and a physical address space of one or more PMEM media modules. In some embodiments, the persistent memory object may include volatile memory in addition to PMEM. In some embodiments, the persistent memory object is a shared memory object that is shared between the application process and other processes by the same application or other applications. In some embodiments, the persistent memory object is a DMO, for example, as described with respect to FIGS. 33-41. In such embodiments, the DMO can be implemented using a DMO service (e.g., DMO service 3610 in FIG. 36).

Example process 600 continues at operation 604 with generating, gathering, identifying, changing, recording, or otherwise obtaining metadata that is indicative of a state of the PMEM at a particular time during execution of the process. In other words, as the process is executed, the in-memory data is manipulated which changes the state of the PMEM overtime.

The metadata generated at operation 604 may indicate a particular state of the PMEM at a particular point in time. In some embodiments, such metadata is indicative of mappings between a logical address space associated with the application (or application process) and a physical address space associated with the PMEM. In other words, the metadata may indicate a state of the data in PMEM associated with the application process (i.e., the in-memory data) but does not include that in-memory data. The memory mappings indicated in the metadata may include multiple mappings between various logical and physical address spaces. For example, in some embodiments, the metadata includes: 1) first metadata indicative of a first mapping, at the particular time, from a logical address space associated with the application (or application process) to a file offset, and 2) second metadata indicative of a second mapping, at the particular time, from the file offset to a physical address space associated with the PMEM.

In some embodiments, example process 600 may include monitoring a state of the PMEM during execution of the application process in which case the metadata generated at operation 604 may be based on this monitored state. In other words, instead of waiting until initiating a capture procedure to collect certain information indicative of a state of the PMEM (e.g., memory region descriptions), example process 600 may include monitoring and continually updating data indicative of the changing state of the PMEM (e.g., data indicative of memory mappings associated with the PMEM). The metadata indicative of a particular state at a particular time can then be generated based on this monitored state or pulled directly from continually updated data indicative of the monitored state. In some embodiments, monitoring the state of the PMEM may include maintaining a record of PMEM mappings (e.g., record 524) during execution of the application process. This is described in more detail with respect to example process 700 in FIG. 7.

Example process 600 continues at operation 606 with storing the metadata generated at operation 604 in a non-volatile storage. This non-volatile storage may include, for example, the PMEM utilized to store the in-memory data associated with the application process, a storage-mode portion of the PMEM, or another non-volatile storage device such as an HDD or SSD. In some embodiments, the metadata is stored as a capture file object, or capture file object is generated based on the metadata and then stored. In any case the capture file object may be configured according to any data structure appropriate for the system in which the capture process is implemented. Some example data structures that can be applied for storing and managing time-evolved memory images (i.e., multiple memory images captured over time) are described in greater detail with respect to FIGS. 14-16.

Capturing a persistent memory image may not require copying the in-memory data associated with the application process into a separate non-volatile storage, as is required in existing capture techniques. This is because any in-memory data stored in the PMEM is already persistently stored (from a power failure standpoint) since the PMEM is persistent by nature. Accordingly, example process 600 concludes at operation 608 with safekeeping, retaining, preserving, or otherwise persisting, in the PMEM, a particular state of the in-memory data as it exists at the particular time (when the memory image is captured). In this context, safekeeping, retaining, preserving, or otherwise persisting the in-memory data may in the PMEM may include preventing modification of the in-memory data from a particular state at a particular time (when the memory image is captured) to a new state at a later time. In some embodiments, such modification of the particular state of the in-memory data in the PMEM may be preserved indefinitely or until some release condition is satisfied. The release condition may differ in various embodiments. For example, in some embodiments, the release condition is satisfied when the application has completed execution of the application process. In other embodiments, the release condition is satisfied when the in-memory data has successfully been offloaded to a backup non-volatile storage (e.g., HDD or SSD). In some embodiments, the release condition is satisfied when a particular period of time has elapsed (e.g., 24 hours). In some embodiments, the release condition is satisfied when available memory falls below a specified threshold. These are example release conditions that may dictate how long the in-memory data is preserved in the PMEM. Other embodiments may implement different release conditions.

In some embodiments, safekeeping, retaining, preserving, or otherwise persisting, in the PMEM, a particular state of the in-memory data may include write protecting the in-memory data at the particular state to set up a CoW operation. Execution of the application process can then proceed based on copies of portions of the data in PMEM (e.g., using CoW operations), thereby safekeeping, retaining, preserving, or otherwise persisting the state of the in-memory data in the PMEM at the capture point.

In some embodiments, one or more operations of example process 600 may be performed at multiple different times during execution of the application process to capture memory images indicative of the states of the PMEM at the multiple different times. For example, process 600 may additionally include capturing a second memory image after capturing a first memory image by repeating, for example, operations 604, 606 and 608. In some embodiments, the metadata associated with the multiple memory images may be arranged according to a linked data structure such as a linked difference-only index or linked full index, which are described in more detail with respect to FIGS. 14-16.

FIG. 7 shows a flow diagram of another example process 700 for capturing a memory image using PMEM, according to another embodiment of the introduced technique.

Example process 700 begins at operation 702 with enabling an application to use PMEM as volatile-mode memory to execute an application process, for example, as described with respect to operation 602 of example process 600.

Example process 700 continues at operation 704 with maintaining a record of PMEM mappings (e.g., record of mappings 524). In some embodiments, a memory object service (e.g., memory object service 520) may maintain such a record of the PMEM mappings. The record of PMEM mappings may include data indicative of mappings between a logical address space associated with the application (or application process) and the physical address space of the PMEM.

The memory object service can maintain the record of mappings since it handles allocations of portions of PMEM to applications. For example, before initiating execution, the application may call a memory function or utilize an API to request byte-addressable memory to execute an application process. In response to receiving the call from the application, the memory object service may allocate a portion of PMEM for use by the application (or application process). In some embodiments, allocating the portion of PMEM may include causing a portion of PMEM to be mapped into a logical address space associated with the application (or application process). This may include mapping a portion of physical PMEM into a logical address space of a memory object and mapping that logical address space associated with the memory object to a logical address space of the application (or application process). As portions of PMEM are mapped and/or existing mapped portions are modified, the memory object service may continually update the record of mappings to reflect such changes. For example, in the case of a mapped portion of PMEM, the record of mappings can be updated to reflect the mapped portion of PMEM.

The call from the application may be intended for the memory object service 520 (e.g., through a dedicated API) or may be intended for another memory function (e.g., malloc( )) and intercepted by the memory object service. For example, the memory object service may implement a capture library that is configured for intercepting and capturing memory calls from applications. Notably, the call from the application need not be specifically for PMEM (as opposed to DRAM). In other words, in some embodiments, the memory object service may handle the call and determine how to allocate memory for the application (e.g., based on capacity and availability of memory resources, characteristics of the application, characteristics of the memory call, etc.). In this way, the application does not need to be specifically modified or otherwise configured to utilize PMEM.

Example process 700 continues at operation 706 with freezing (i.e., suspending) execution of the application process.

After the application process is frozen, example process 700 continues at operation 708 with write protecting the in-memory data in the PMEM as it exists at the frozen process state. In some embodiments, write protecting the in-memory data may include setting write protections in the PMEM mappings associated with the application process. In some embodiments, write protecting the in-memory data may set up a CoW operation. The CoW operation may be automatically triggered when the application process or another application process attempts to modify any in-memory data in the PMEM (i.e., modify the PMEM mappings), for example, by deleting or writing data to the PMEM.

Example process 700 continues at operation 710 with generating, identifying, changing, recording, or otherwise obtaining, based on the record of the mappings, metadata indicative of a state of the PMEM mappings associated with the application process at the frozen process state. In other words, the metadata generated at operation 710 indicates a state of the PMEM when execution of the application process was frozen at operation 706.

In some embodiments, the maintained record of the mappings may already indicate a relatively complete image of a state of the PMEM at a given time. Accordingly, in some embodiments, operation 710 may involve finalizing a minimal amount of metadata that is already in place in the record of mappings instead of accessing the operating system or other relevant subsystems for details on memory region descriptions (e.g., address ranges, access rights, backing images, etc.).

In some embodiments, the metadata generated at operation 710 may include: 1) first metadata indicative of first mapping, at the frozen process state, from a logical address space associated with the application (or application process) (e.g., application address space 412) to a file offset associated with a persistent memory object (e.g., a portion of PMEM allocated to the application to execute the application process), and 2) second metadata indicative of a second mapping, at the frozen process state, from the file offset to the overall physical media space of the byte-addressable PMEM (or some sub module thereof such as a specific NVDIMM).

Example process 700 continues at operation 712 with persisting a memory image by generating a capture file object based on the metadata generated at operation 710. As previously discussed, PMEM is by its nature persistent. Accordingly, the in-memory data associated with the application process that is mapped to PMEM is already effectively stored in a persistent state. Therefore, in contrast with traditional memory image capture techniques, operation 712 does not involve copying memory contents in PMEM into the capture file object or a separate storage to persist the memory image. Instead, the in-memory data can be retained in the PMEM as it existed at the frozen process state of the application. The capture file object may include, or be generated based on, the metadata generated at operation 710 as well as any other metadata indicative of the state of the application process when execution was frozen. This additional metadata may include data obtained from the operating system such as information indicative of external connections associated with the process (e.g., file descriptors, inter-process communication channel, network connections, etc.), information indicative of the execution state of the process (e.g., CPU registers for each execution thread), information indicative of credentials associated with the process, or any other relevant information associated with the process.

Example process 700 concludes at operation 714 with unfreezing (i.e., resuming) execution of the application process. Although depicted as a last operation in example process 700, in some embodiments, operation 714 may be performed earlier. For example, since the PMEM mappings are already known to a memory object service (e.g., memory object service 520), execution of the application process can resume before the metadata indicative of such mappings are finalized as long as the mappings are write-protected. Accordingly, in some embodiments, execution of the application process is unfrozen (i.e., resumed) immediately after setting write protections in the mappings (i.e., at operation 708). The later operations to capture and persist the memory image (e.g., operations 610 and 612) may be performed fully or in part after the application process has resumed execution. For example, at least some of the metadata generated at operation 710 may be generated after resuming execution of the application process. If after resuming execution, the application process modifies any of the mappings (e.g., by writing data to a mapped page), a CoW operation is automatically performed to create a new copy of the modified page(s). The new copies are used by the executing application process while the original copies persist as part of the captured memory image. Resuming execution before the metadata is finalized can further reduce the amount of time the application must remain in a frozen state to effectively capture the memory image.

In some embodiments, one or more operations of example process 700 may be performed at multiple different times during execution of the application process to capture memory images indicative of the states of the PMEM at the multiple different times. For example, process 700 may additionally include capturing and persisting a second memory image after capturing and persisting a first memory image by repeating, for example, operations 706 through 714. In some embodiments, the metadata associated with the multiple memory images may be arranged according to a linked data structure such as a linked difference-only index or linked full index, which are described in more detail with respect to FIGS. 14-16.

In some embodiments, certain operations of example processes 600 or 700 are performed in response to receiving an input to capture a memory image. FIG. 8 shows a flow diagram of an example process 800 for capturing a memory image in response to an input, according to an embodiment of the introduced technique.

Example process 800 begins at operation 802 with enabling an application (e.g., application 410) to use PMEM as volatile-mode memory to execute an application process, for example, as described with respect to operation 602 of example process 600.

Example process 800 continues at operation 804 with receiving an input to capture a memory image during execution of the application process.

In some embodiments, the input received at operation 804 may be based on an input from another entity (e.g., a user, a device, another process, etc.) that is indicative of a request to capture a memory image. For example, a user may provide an input, via a user interface, during execution of an application process, to capture a memory image associated with application process. As another example, the application executing the application process may input a request to capture a memory image, for example, as part of a failure recovery operation. As another example, an operating system of one computer system may input a request to capture a memory image, for example, as part of a procedure for migrating the application process to another computer system. In some embodiments, such an input may be received periodically at regular or irregular intervals. For example, to periodically capture memory images at regular intervals, an entity (e.g., the executing application) may periodically provide an input to capture a memory image, for example, as part of a failure recovery routine.

In some embodiments, the input received at operation 804 may represent an event or other information that satisfies a specified memory image capture criterion. For example, the memory object service 520 (or memory image capture module 526) may monitor various events to detect events that satisfy a specified memory image capture criterion. As an illustrative example, the memory object service 520 may receive an event indicative of a processing failure (by the executing application, or otherwise) and determine that the processing failure satisfies a specified criterion to capture a memory image.

Example process 800 concludes at operation 806 with capturing the memory image (e.g., as described with respect to example processes 600 and/or 700) in response to receiving the input. Where the input is an event, operation 806 may include capturing the memory image in response to determining that the event satisfies a specified capture criterion.

2.3 Image Capture Using Volatile Memory

Figure 9:
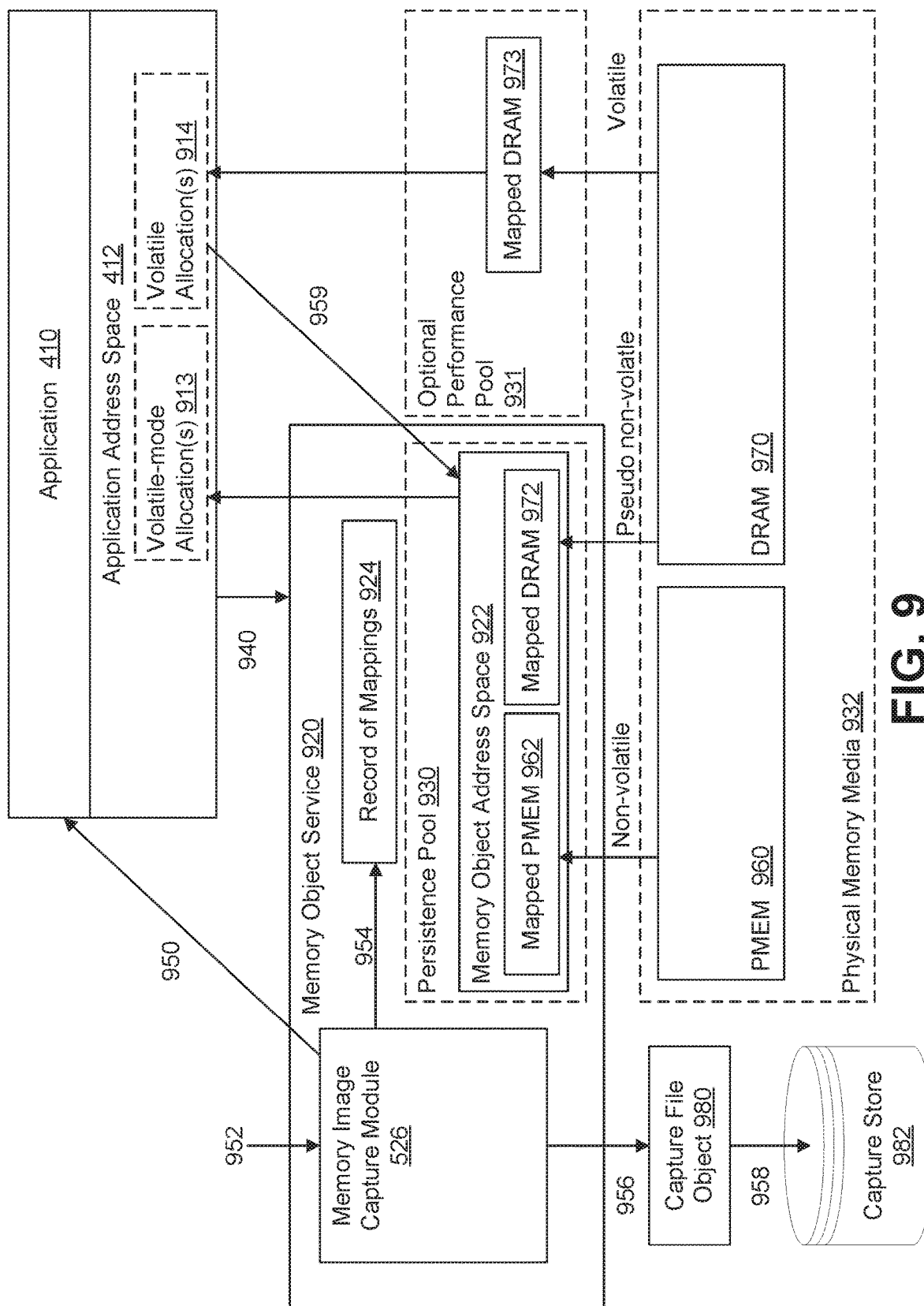
FIG. 9 shows a diagram illustrating an example process for capturing a memory image based on data in PMEM and volatile memory, according to an embodiment of the introduced technique.

The introduced technique for memory image capture can also be applied in computer systems that include volatile memory. In some embodiments, some or all of this volatile memory may be externally managed (e.g., by a memory object service) as if it were persistent memory. FIG. 9 shows an architecture flow diagram that illustrates an example process for capturing a memory image in a computer system that includes volatile memory. Specifically, FIG. 9 illustrates implementation of the introduced image capture technique in a system that includes PMEM and volatile memory (e.g., DRAM). The system depicted in FIG. 9 is similar to that depicted in FIG. 5, except that the memory object service 920 (analogous to memory object service 520) is configured to also use volatile memory such as DRAM 970 in addition to PMEM 960. In other words, a memory object provided by memory object service 920 to application 410 may utilize a persistence pool 930 that includes PMEM 960 and/or DRAM 970. As with PMEM 960 (analogous to PMEM 560), DRAM 970 may represent one or more physical volatile memory modules. At least some of DRAM 970 may be mapped into an address space 922 of a memory object (e.g., mapped DRAM 972) via the persistence pool 930. Similarly, at least some of the PMEM 960 may be mapped into the address space 922 of the memory object (e.g., mapped PMEM 962) via the persistence pool 930. Accordingly, in some embodiments, the maintained record of mappings 924 (analogous to record 524) may reflect both mappings in PMEM 960 and in DRAM 970.

As indicated in FIG. 9, the PMEM 960 may operate as non-volatile memory media within the persistence pool 930. In contrast, DRAM 970 may either operate as pseudo non-volatile memory media within the persistence pool 930 or may operate as volatile memory media within an optional performance pool 931 that only includes volatile memory media (e.g., DRAM). In this case, "pseudo non-volatile" means that the DRAM 970 is used in place of, or in addition to, PMEM 960 to implement a persistent memory object that is accessible to the application 410 as byte-addressable memory (e.g., through volatile mode allocations 913). Although the DRAM 970 is, by its nature, volatile memory, the way in which it is implemented can be conceptualized as pseudo non-volatile since the operation of the introduced memory image capture technique enables a particular state of the in-memory data to be held in the DRAM 970 in a quasi-persistent state indefinitely or up until a release condition is satisfied, provided that power remains available.

The optional performance pool 931 can be implemented to provide higher performance (e.g., lower latency, faster access, etc.) memory allocations to application 410 than can be achieved via the persistence pool 930. For example, FIG. 9 shows two classes of memory allocations in the application address space 412 of application 410, namely volatile mode allocations 913 which are made via the persistence pool 930, and volatile allocations 914 which are made via the optional performance pool 931. In some embodiments, volatile mode allocations 913 are made using a first memory function associated with the memory object service 920, while volatile allocations 14 are made using a second memory function that is, for example, associated with an operating system of a computer executing the application 410. In some embodiments, allocations may be made as volatile-mode allocations 913 or volatile allocations on a per-task basis. For example, certain tasks executed by application 410 may require the higher performance of memory in the optional performance pool 931, while other tasks can effectively be executed using memory from the persistence pool 930.

FIG. 9 depicts DRAM 970 mapped to both the persistence pool (i.e., mapped DRAM 972) and the optional performance pool 931 (i.e., mapped DRAM 973) to illustrate two different pools of memory that can include DRAM; however, in most cases a given portion of volatile memory media will only be mapped to one or the other pool. In other words, the performance pool 931 will not be used when the DRAM 970 is used for the persistence pool 930. Conversely, a system may be implemented in which a first volatile memory media (e.g., DRAM 970) is used for the persistence pool 930, while a second volatile memory media (*not shown in FIG. 9) is used for a performance pool 931.

The process for capturing a memory image using the system described in FIG. 9 can be similar to the process described with respect to the system of FIG. 5. For example, to execute an application process, the application 410 can call (operation 940) one or more memory functions to allocate memory as described with respect to operation 440 of FIG. 4. In some embodiments, the application 410 may be configured to make a call to a first memory function to receive volatile-mode allocations 913 and to make a call to a second memory function to receive volatile allocations 914 (i.e., through a separate performance pool 931). Alternatively, in some embodiments, a call from the application 410 to a memory function (e.g., malloc( )) can be intercepted by the memory object service 920 and either captured to make a volatile mode allocation 913 via the persistence pool 930 or ignored to allow for a volatile allocation 914 via the performance pool. For example, if the call from application 410 meets a specified capture criterion, the memory object service 920 may process the call using a first memory function (or API) to make a volatile-mode allocation 913 based on the memory media (PMEM 960 and/or DRAM 970) in the persistence pool 930. In contrast, if the call does not meet the specified capture criterion, the memory object service 920 may ignore the call and allow the call to be processed using a second memory function (e.g., malloc( )) associated with an operating system of the computer in which the application 410 is executing. The capture criterion may be based, for example, on the type of call, type of application, type of task or process to be executed, available memory resources when the call was received, or any other suitable criterion.

At any point during execution of the application process, the memory image capture module 526 may initiate an image capture procedure by, at operation 950, causing the application 410 to freeze execution of an ongoing process, for example, as described with respect to operation 550 of FIG. 5. In some embodiments, the memory image capture module 926 initiates the image capture procedure in response to an input received at operation 952, for example, as described with respect to operation 552 of FIG. 5.

To capture the memory image, the memory image capture module may, at operation 954, access the record of mappings 924, to generate, identify, change, record, or otherwise obtain data indicative of the memory region descriptions associated with the application process, for example, as described with respect to operation 554 of FIG. 5. In some embodiments, the memory image capture module 926 may optionally communicate with a computer operating system to obtain descriptions of memory regions in DRAM 970 associated with the application process (e.g., if those regions were allocated via the performance pool 931).

Once the metadata of the memory image is finalized, the memory image can be persisted by creating, at operation 956, a capture file object 980 (analogous to capture file object 580) based on the metadata and storing, at operation 958, the capture file object in a capture store 982 (analogous to capture store 582), for example, as described with respect to operations 556 and 668 of FIG. 5.

In some embodiments, any in-memory data associated with an application process that is not persistently stored or quasi-persistently retained (e.g., data in DRAM 970 that is mapped to a volatile allocation 914) may be copied into persistent storage to capture the entire memory state associated with the application process. For example, as depicted in FIG. 9, data in DRAM 970 may, at operation 958, be copied into the memory object and persistently stored in PMEM 960. Alternatively, or in addition, data in DRAM 970 may be copied into a separate non-volatile storage device such as an HDD. In some embodiments, this copying is performed and completed before unfreezing execution of the application process, or is performed and completed after establishing CoW protection and unfreezing execution of the application process.

Figure 10:
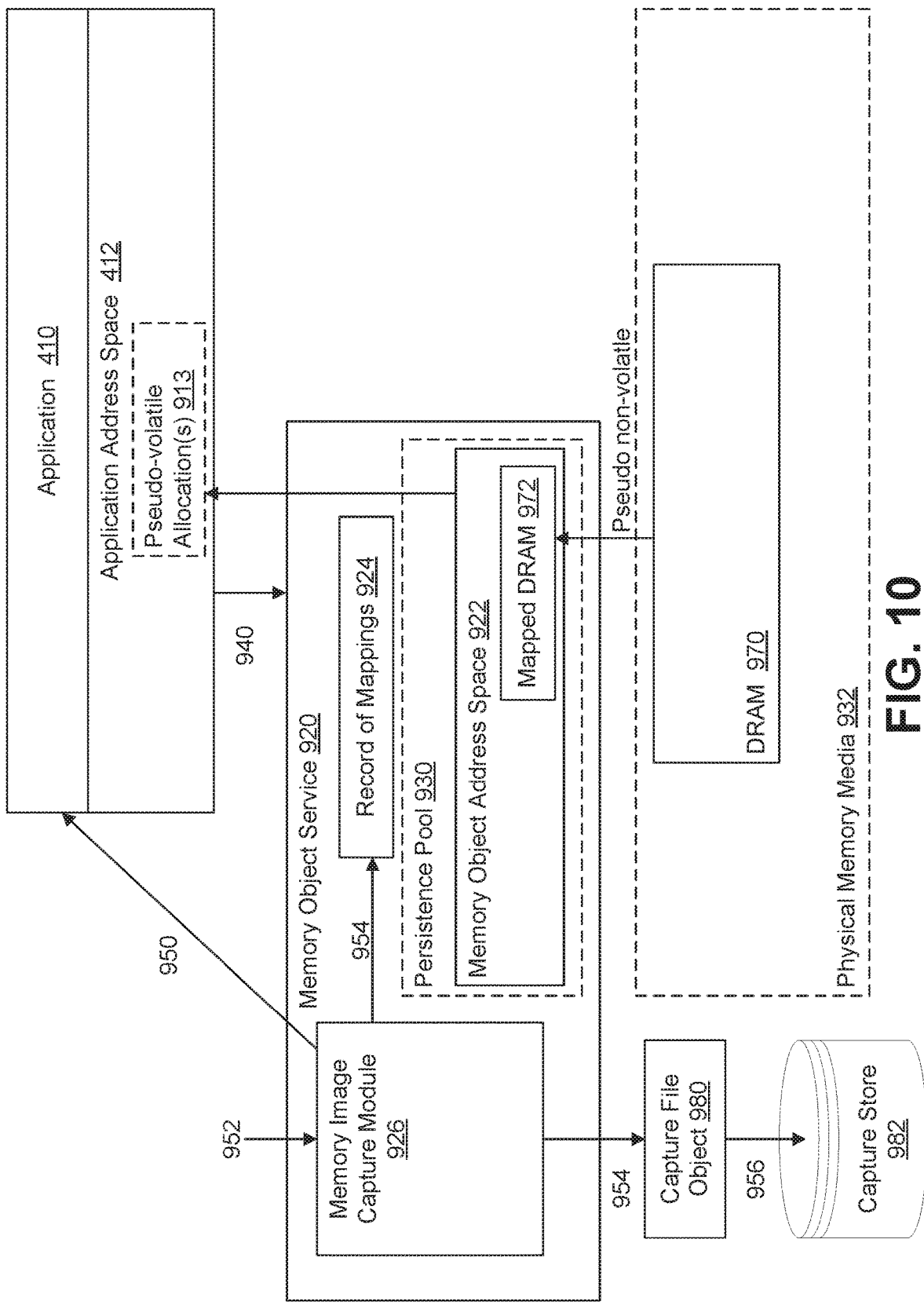
FIG. 10 shows a diagram illustrating an example process for capturing a memory image based on data in volatile memory, according to an embodiment of the introduced technique.

In some embodiments, the introduced technique can be implemented in a system that does not include any PMEM or similar non-volatile memory. For example, FIG. 10 shows a diagram of a scenario similar to that depicted in FIG. 9 except that the memory object service 920 is configured to use volatile memory such as DRAM 970 instead of PMEM. In other words, a memory object provided by memory object service 920 to application 410 may include DRAM 970. At least some of DRAM 970 may be mapped into an address space 922 of a memory object (e.g., mapped DRAM 972). The application 412 can then write to and access data stored in DRAM 970 using the associated mapped pages in volatile-mode allocations 913 of the application address space 412. The maintained record of mappings 924 may reflect such mappings in the DRAM 970. The example system of FIG. 10 only depicts DRAM 970 that is accessed via the persistence pool 930; however, this is not to be construed as limiting. Other embodiments may include additional DRAM (or other volatile memory) that is accessed via an optional performance pool such as performance pool 931 described with respect to FIG. 9.

The diagrams in FIGS. 9-10 illustrate example systems and are not to be construed as limiting. Other embodiments may include more or fewer components than are depicted in FIGS. 9-10. For example, in some embodiments, PMEM 960 may represent a single physical PMEM module (e.g., a single NVDIMM). Alternatively, in other embodiments, PMEM 960 may represent a pool of multiple physical PMEM modules located in a single location or distributed across multiple locations. Similarly, DRAM 970 may represent a single physical volatile memory module (e.g., a single DIMM) or may represent a pool of multiple physical volatile memory modules in a single location or distributed across multiple locations. In some embodiments, the persistent memory object may be a distributed memory object (DMO) as described with respect to FIGS. 33-41. In such an embodiment, the memory object service 920 may correspond to a DMO service (e.g., DMO service 3610 in FIG. 36).

Figure 11:
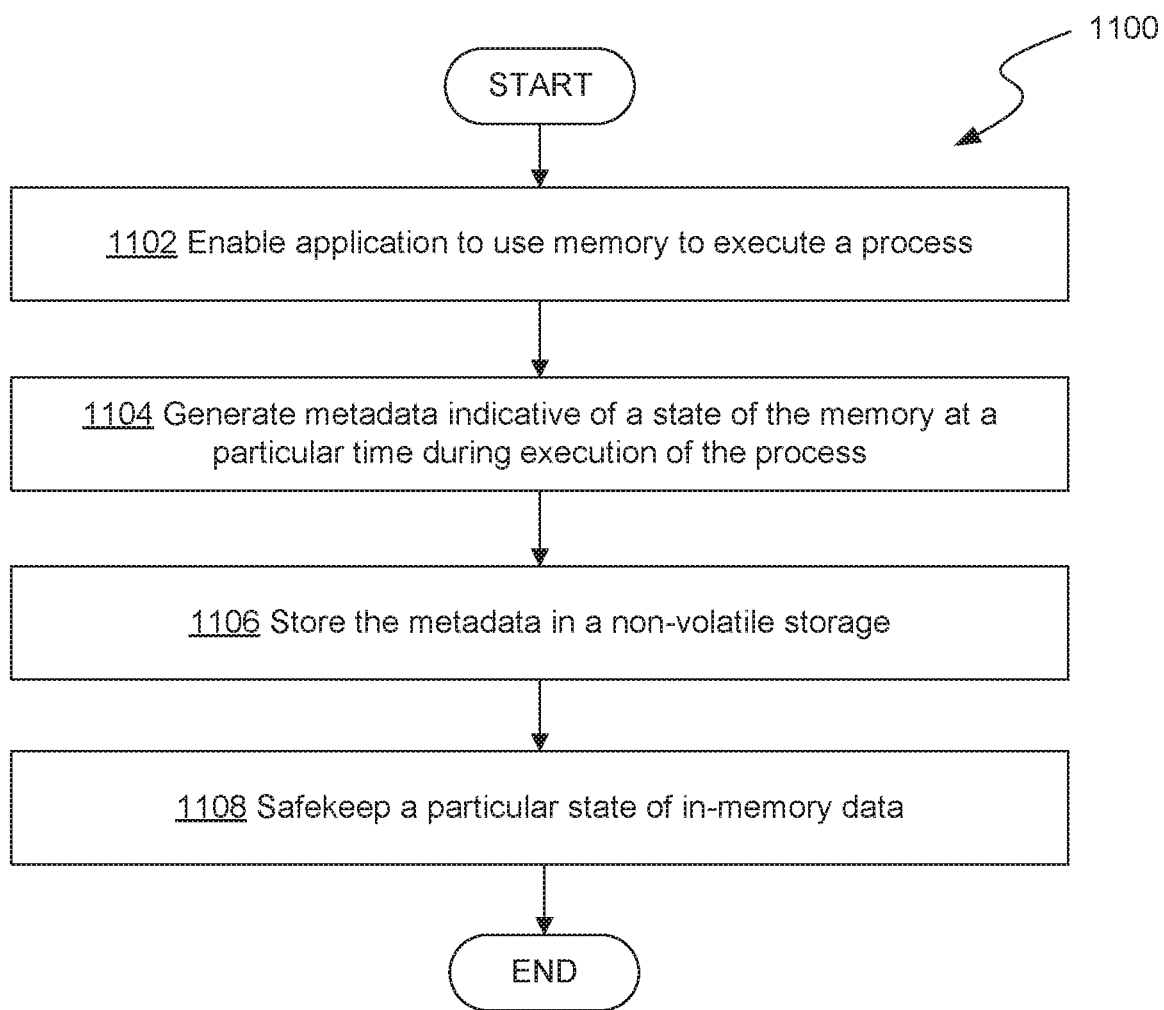
FIG. 11 shows a flow diagram of an example process for capturing a memory image using volatile memory, according to an embodiment of the introduced technique.
Figure 12:
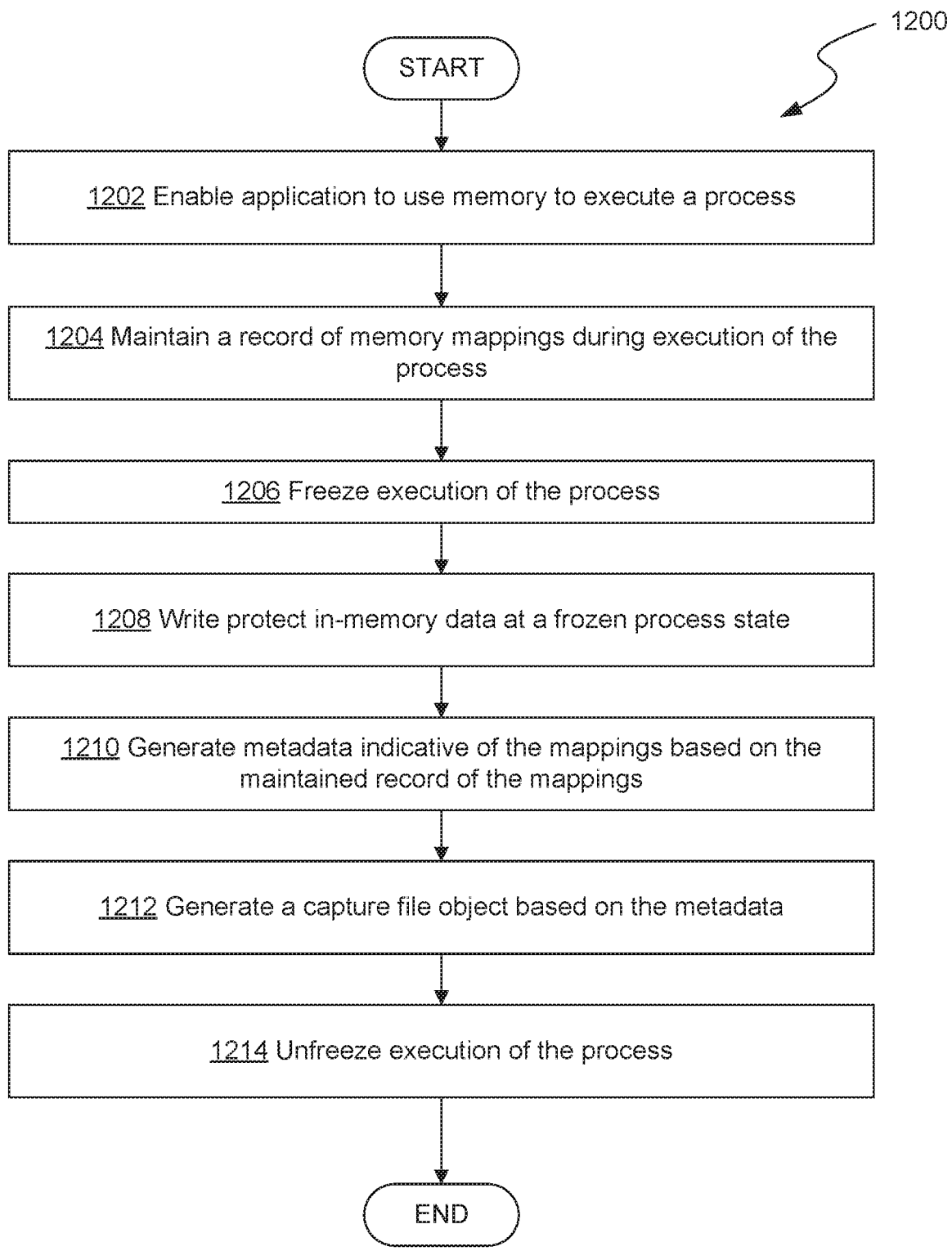
FIG. 12 shows a flow diagram of another example process for capturing a memory image using volatile memory, according to an embodiment of the introduced technique.
Figure 13:
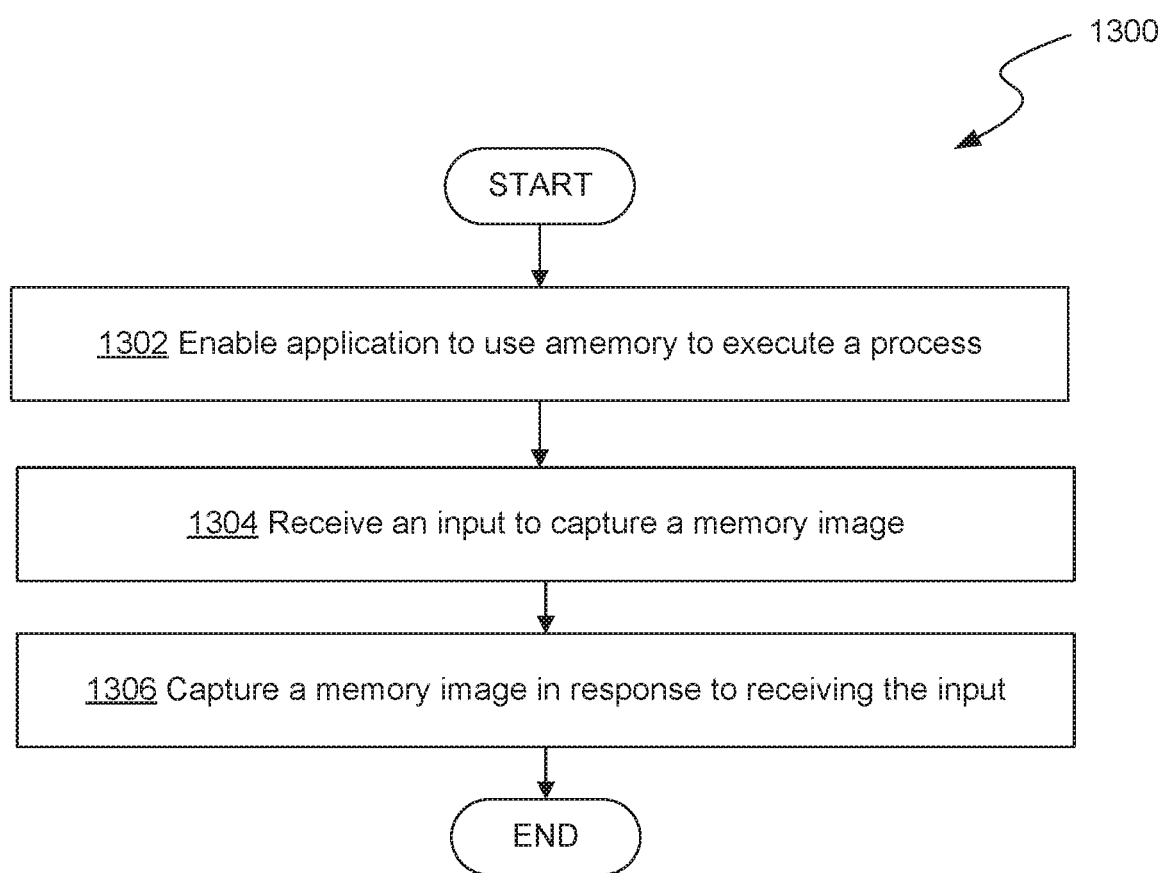
FIG. 13 shows a flow diagram of an example process for capturing a memory image using volatile memory in response to an input, according to an embodiment of the introduced technique.

FIGS. 11-13 show flow diagrams of example processes 1100-1300 for capturing memory images using DRAM, according to embodiments of the introduced technique. Certain operations of the example processes 1100-1300 are described with reference to components described with respect to FIGS. 9-10. Example processes 1100-1300 can be executed by one or more of the components of a computer system such as the example processing system 4200 described with respect to FIG. 42. For example, in some embodiments, example processes 1100-1300 may be represented in instructions stored in memory that are then executed by a processor. Alternatively, or in addition, certain operations associated with example processes 1100-1300 may be implemented in hardware such as a memory controller. In this context, a memory controller may include one or more digital circuits. The digital circuitry of the memory controller may include programmable circuitry such FPGAs, PLDs, etc., special-purpose hardwired (i.e., non-programmable) circuitry such as ASICs, or a combination of such forms, that are programmed or otherwise configured to perform one or more memory management operations. Such a memory controller may be a standalone memory controller or may be integrated into another component such as CPU or a memory module (e.g., an NVDIMM). The processes 1100-1300 described with respect to FIGS. 11-13 are examples provided for illustrative purposes and are not to be construed as limiting. Other processes may include more or fewer operations than depicted, while remaining within the scope of the present disclosure. Further, the operations depicted in example processes 1100-1300 may be performed in a different order than is shown.

FIG. 11 shows a flow diagram of an example process 1100 for capturing a memory image, according to an embodiment of the introduced technique.

Example process 1100 begins at operation 1102 with enabling an application (e.g., application 410) to use memory media to execute an application process. In some embodiments, operation 502 includes enabling the application to use the memory to store and access in-memory data during execution of the application process.

Memory media used by the application at operation 1102 can include non-volatile memory such as PMEM (e.g., PMEM 960) and/or volatile memory such as DRAM (e.g., DRAM 970). In some embodiments, volatile-mode allocations 913 may be made via a persistence pool 930 that include PMEM 960 and/or DRAM 970. Optionally, in some embodiments, volatile allocations 914 may be made through a performance pool 931 that includes DRAM 970. In some embodiments, volatile memory may be externally managed (e.g., by the memory object service 920) as it were persistent memory.

In some embodiments, enabling the application to access the memory may include virtualizing or otherwise providing (e.g., using a memory object service 920) a memory object as anonymous byte-addressable memory for use by the application. The memory object may represent a virtual layer between a logical address space associated with the application and a physical address space of one or more memory media modules (e.g., PMEM 960 and/or DRAM 970). In some embodiments, the memory object may include volatile memory (e.g., DRAM), non-volatile memory (e.g., PMEM), or any combination thereof. In some embodiments, the memory object is configured as a persistent memory object with power failover mechanism. For example, even where implemented with volatile memory, a persistent memory object may utilize non-volatile resources (e.g., PMEM and/or non-volatile storage to store data in a persistent state to survive power failure. In some embodiments, the memory object is a shared memory object that is shared between the application process and other processes by the same application or other applications. In some embodiments, the memory object is a DMO, for example, as described with respect to FIGS. 33-41. In such embodiments, the DMO can be implemented using a DMO service (e.g., DMO service 3610 in FIG. 36).

Example process 1100 continues at operation 1104 with generating, gathering, identifying, changing, recording, or otherwise obtaining metadata that is indicative of a state of the memory media (e.g., PMEM 960 and/or DRAM 970) at a particular time during execution of the process. In other words, as the process is executed, the in-memory data is manipulated which changes the state of the data in memory over time.

The metadata generated at operation 1104 may indicate a particular state of the PMEM and/or DRAM at a particular point in time. In some embodiments, such metadata is indicative of mappings between a logical address space associated with the application (or application process) and a physical address space associated with the PMEM and/or DRAM. In other words, the metadata may indicate a state of the data in PMEM and/or DRAM associated with the application process (i.e., the in-memory data) but does not include that in-memory data. The memory mappings indicated in the metadata may include multiple mappings between various logical and physical address spaces. For example, in some embodiments, the metadata includes: 1) first metadata indicative of a first mapping, at the particular time, from a logical address space associated with the application (or application process) to a file offset, and 2) second metadata indicative of a second mapping, at the particular time, from the file offset to a physical address space associated with the PMEM and/or DRAM.

In some embodiments, example process 1100 may include monitoring a state of the PMEM and/or DRAM during execution of the application process in which case the metadata generated at operation 1104 may be based on this monitored state. In other words, instead of waiting until initiating a capture procedure to collect certain information indicative of a state of the PMEM and/or DRAM (e.g., memory region descriptions), example process 1100 may include monitoring and continually updating data indicative of the changing state of the PMEM and/or DRAM (e.g., data indicative of memory mappings associated with the PMEM and/or DRAM). The metadata indicative of a particular state at a particular time can then be generated based on this monitored state or pulled directly from continually updated data indicative of the monitored state. In some embodiments, monitoring the state of the PMEM and/or DRAM may include maintaining a record of memory mappings during execution of the application process. This is described in more detail with respect to example process 1200 in FIG. 12.

Example process 1100 continues at operation 1106 with storing the metadata generated at operation 1104 in a non-volatile storage. This non-volatile storage may include, for example, the PMEM utilized to store the in-memory data associated with the application process (e.g. PMEM 960), a storage-mode portion of the PMEM, or another non-volatile storage device such as an HDD or SSD. In some embodiments, the metadata is stored as a capture file object, or capture file object is generated based on the metadata and then stored. In any case the capture file object may be configured according to any data structure appropriate for the system in which the capture process is implemented. Some example data structures that can be applied for storing and managing time-evolved memory images (i.e., multiple memory images captured over time) are described in greater detail with respect to FIGS. 14-16.

Example process 1100 concludes at operation 1108 with safekeeping retaining, preserving, or otherwise persisting a particular state of the in-memory data as it exists at the particular time (when the memory image is captured). In this context, safekeeping, retaining, preserving, or otherwise persisting the in-memory data may include preventing modification of the in-memory data from a particular state at a particular time (when the memory image is captured) to a new state at a later time. In some embodiments, such modification of the particular state of the in-memory data may be prevented indefinitely as long as power is supplied or at least until some release condition is satisfied. The release condition may differ in various embodiments. For example, in some embodiments, the release condition is satisfied when the application has completed execution of the application process. In other embodiments, the release condition is satisfied when the in-memory data has successfully been offloaded to a backup non-volatile storage (e.g., HDD or SSD). In some embodiments, the release condition is satisfied when a particular period of time has elapsed (e.g., 24 hours). In some embodiments, the release condition is satisfied when available memory falls below a specified threshold. These are example release conditions that may dictate how long the in-memory data is preserved in the PMEM and/or DRAM. Other embodiments may implement different release conditions. In embodiments, safekeeping, retaining, preserving, or otherwise persisting a particular state of the in-memory data may include write protecting the in-memory data at the particular state to set up a CoW operation. Execution of the application process can then proceed based on copies of portions of the data in memory (e.g., using CoW operations), thereby safekeeping, retaining, preserving, or otherwise persisting the state of the in-memory data in the memory at the capture point.

In embodiments implementing PMEM as volatile-mode memory, capturing a persistent memory image may not require copying the in-memory data associated with the application process into a separate non-volatile storage, as is required in existing capture techniques. This is because any in-memory data stored in the PMEM is already persistently stored (from a power failure standpoint) since the PMEM is persistent by nature. Accordingly, instead of safekeeping the data in a separate non-volatile storage, the in-memory data can be kept safely in the PMEM itself thereby reducing the I/O overhead.

In use cases that do not require failover in the event of power failure, in-memory data can effectively be kept safely in volatile memory such as DRAM using the same technique. For example, to support resume/restore functionality, operation 1108 may include safekeeping any in-memory data in volatile memory (e.g., DRAM), for example, by write protecting such memory to prevent modification of the data. Such modification of the particular state of the in-memory data may be prevented indefinitely (as long as power is supplied) or at least until some release condition is satisfied. In such a case, the particular state of the in-memory data may be held in a quasi-persistent state in the sense that it is retained until the release condition is satisfied, but may be lost in the event of power failure. If true persistence through power failure is required, any in-memory data that is held in volatile memory (e.g., DRAM or a CPU cache) may be flushed (i.e., copied) into non-volatile storage such as the PMEM or a separate non-volatile storage such as an HDD or SSD.

In some embodiments, one or more operations of example process 1100 may be performed at multiple different times during execution of the application process to capture memory images indicative of the states of the PMEM and/or DRAM at the multiple different times. For example, process 1100 may additionally include capturing a second memory image after capturing a first memory image by repeating, for example, operations 1104, 1106 and 1108. In some embodiments, the metadata associated with the multiple memory images may be arranged according to a linked data structure such as a linked difference-only index or linked full index, which are described in more detail with respect to FIGS. 14-16.

FIG. 12 shows a flow diagram of another example process 1200 for capturing a memory image, according to another embodiment of the introduced technique.

Example process 1200 begins at operation 1202 with enabling an application to use memory to execute an application process, for example, as described with respect to operation 1102 of example process 1100. As with example operation 1102, the memory media in this case may include volatile memory (e.g., DRAM 970) and/or volatile-mode PMEM (e.g., PMEM 960).

Example process 1200 continues at operation 1204 with maintaining a record of mappings associated with the PMEM and/or DRAM. In some embodiments, a memory object service (e.g., memory object service 920) may maintain such a record of the mappings (e.g., record of mappings 924). The record of mappings may include data indicative of mappings between a logical address space associated with the application (or application process) and the physical address space of the PMEM and/or DRAM.

The memory object service can maintain the record of mappings since it handles allocations of portions of PMEM and/or DRAM to applications. For example, before initiating execution, the application may call a memory function or utilize an API to request byte-addressable memory to execute an application process. In response to receiving the call from the application, the memory object service may allocate a portion of PMEM and/or DRAM (e.g., as a volatile-mode allocation 913) for use by the application (or application process). In some embodiments, allocating the portion of PMEM and/or DRAM may include causing a portion of PMEM and/or DRAM to be mapped into a logical address space associated with the application (or application process). This may include mapping a portion of physical PMEM and/or DRAM into a logical address space of a memory object and mapping that logical address space associated with the memory object to a logical address space of the application (or application process) (e.g., volatile-mode allocation 913). As portions of PMEM and/or DRAM are mapped and/or existing mapped portions are modified, the memory object service may continually update the record of mappings to reflect such changes. For example, in the case of a mapped portion of DRAM, the record of mappings can be updated to reflect the mapped portion of DRAM.

The call from the application may be intended for the memory object service (e.g., through a dedicated API) or may be intended for another memory function (e.g., malloc( )) and intercepted by the memory object service. For example, the memory object service may implement a capture library that is configured for intercepting and capturing memory calls from applications. Notably, the call from the application need not be specifically for PMEM or DRAM. In other words, in some embodiments, the memory object service may handle the call and determine how to allocate memory for the application (e.g., based on capacity and availability of memory resources, characteristics of the application, characteristics of the memory call, etc.). In this way, the application does not need to be specifically modified or otherwise configured to specifically utilize PMEM for certain processes and DRAM for other processes.

Example process 1200 continues at operation 1206 with freezing (i.e., suspending) execution of the application process. In other words, at a particular time during execution of the application process, the system may cause execution of the application process to freeze to a frozen process state.

After the application process is frozen, example process 1200 continues at operation 1208 with write protecting the in-memory data as it exists at the frozen process state. In some embodiments, write protecting the in-memory data may include setting write protections in the memory mappings associated with the application process. In some embodiments, write protecting the in-memory data may set up a CoW operation. The CoW operation may be automatically triggered when the application process or another application process attempts to modify any in-memory data (i.e., modify the memory mappings to PMEM and/or DRAM), for example, by deleting or writing data to the PMEM and/or DRAM.

Example process 1200 continues at operation 1210 with generating, identifying, changing, recording, or otherwise obtaining, based on the record of the mappings, metadata indicative of a state of the mappings associated with the application process at the frozen process state. In other words, the metadata generated at operation 1210 indicates a state of the PMEM and/or DRAM when execution of the application process was frozen at operation 1206.

In some embodiments, the maintained record of the mappings may already indicate a relatively complete image of a state of the PMEM and/or DRAM at a given time. Accordingly, in some embodiments, operation 1210 may involve finalizing a minimal amount of metadata that is already in place in the record of mappings instead of accessing the operating system or other relevant subsystems for details on memory region descriptions (e.g., address ranges, access rights, backing images, etc.).

In some embodiments, the metadata generated at operation 1210 may include: 1) first metadata indicative of first mapping, at the frozen process state, from a logical address space associated with the application (or application process) (e.g., application address space 412) to a file offset associated with a persistent memory object, and 2) second metadata indicative of a second mapping, at the frozen process state, from the file offset to the overall physical media space of the byte-addressable PMEM (or some sub module thereof such as a specific NVDIMM) and/or the DRAM (or some sub module thereof such as a specific DIMM).

Example process 1200 continues at operation 1212 with persisting a memory image by generating a capture file object based on the metadata generated at operation 1210. The capture file object may include, or be generated based on, the metadata generated at operation 1210 as well as any other metadata indicative of the state of the application process when execution was frozen. This additional metadata may include data obtained from the operating system such as information indicative of external connections associated with the process (e.g., file descriptors, inter-process communication channel, network connections, etc.), information indicative of the execution state of the process (e.g., CPU registers for each execution thread), information indicative of credentials associated with the process, or any other relevant information associated with the application process.

In some embodiments, the resulting memory image may include the capture file object (which may be stored in a non-volatile storage) as well as the in-memory data as it existed at the frozen process state (i.e., at the point of image capture). This in-memory data associated with the memory image (i.e., the memory contents) may be retained in the physical memory media (whether volatile memory or PMEM) for safekeeping. Thus, in contrast with traditional memory image capture techniques, operation 1212 does not involve copying in-memory data into the capture file object or to a separate storage to persist the memory image. In the case of PMEM, which is persistent by nature, the in-memory data is already effectively stored in a persistent state and the implemented write protections prevent modification of the data from the point of image capture. Further, even in the case of volatile memory such as DRAM, the in-memory data can be effectively stored in a quasi-persistent state through the use of write protections to prevent modification of the data. As previously discussed, in-memory data in DRAM can be held in such a quasi-persistent state indefinitely or until some release condition is satisfied, provided that power is not lost.

Example process 1200 concludes at operation 1214 with unfreezing (i.e., resuming) execution of the application process. Although depicted as a last operation in example process 1200, in some embodiments, operation 1214 may be performed earlier. For example, since the PMEM and/or DRAM mappings are already known to a memory object service (e.g., memory object service 920), execution of the application process can resume before the metadata indicative of such mappings are finalized as long as the mappings are write-protected. Accordingly, in some embodiments, execution of the application process is unfrozen (i.e., resumed) immediately after setting write protections in the mappings (i.e., at operation 1208). The later operations to capture and persist the memory image (e.g., operations 1210 and 1212) may be performed fully or in part after the application process has resumed execution. For example, at least some of the metadata generated at operation 1210 may be generated after resuming execution of the application process. If after resuming execution, the application process modifies any of the mappings (e.g., by writing data to a mapped page), a CoW operation is automatically performed to create a new copy of the modified page(s). The new copies are used by the executing application process while the original copies persist as part of the captured memory image. Resuming execution before the metadata is finalized can further reduce the amount of time the application must remain in a frozen state to effectively capture the memory image.

In some embodiments, one or more operations of example process 1200 may be performed at multiple different times during execution of the application process to capture memory images indicative of the states of the memory at the multiple different times. For example, process 1200 may additionally include capturing and persisting a second memory image after capturing and persisting a first memory image by repeating, for example, operations 1206 through 1214. In some embodiments, the metadata associated with the multiple memory images may be arranged according to a linked data structure such as a linked difference-only index or linked full index, which are described in more detail with respect to FIGS. 14-16.

In some embodiments, certain operations of example processes 1100 or 1200 are performed in response to receiving an input to capture a memory image. FIG. 13 shows a flow diagram of an example process 1300 for capturing a memory image in response to an input, according to an embodiment of the introduced technique.

Example process 1300 begins at operation 1302 with enabling an application (e.g., application 410) to use memory to execute an application process, for example, as described with respect to operation 1102 of example process 1100.

Example process 1300 continues at operation 1304 with receiving an input to capture a memory image during execution of the application process.

In some embodiments, the input received at operation 1304 may be based on an input from another entity (e.g., a user, a device, another process, etc.) that is indicative of a request to capture a memory image. For example, a user may provide an input, via a user interface, during execution of an application process, to capture a memory image associated with application process. As another example, the application executing the application process may input a request to capture a memory image, for example, as part of a failure recovery operation. As yet another example, an operating system of one computer system may input a request to capture a memory image, for example, as part of a procedure for migrating the application process to another computer system. In some embodiments, such an input may be received periodically at regular or irregular intervals. For example, to periodically capture memory images at regular intervals, an entity (e.g., the executing application) may periodically provide an input to capture a memory image, for example, as part of a failure recovery routine.

In some embodiments, the input received at operation 1304 may represent an event or other information that satisfies a specified memory image capture criterion. For example, the memory object service 920 (or memory image capture module 926) may monitor various events to detect events that satisfy a specified memory image capture criterion. As an illustrative example, the memory object service 920 may receive an event indicative of a processing failure (by the executing application, or otherwise) and determine that the processing failure satisfies a specified criterion to capture a memory image.

Example process 1300 concludes at operation 1306 with capturing the memory image (e.g., as described with respect to example processes 1100 and/or 1200) in response to receiving the input. Where the input is an event, operation 1306 may include capturing the memory image in response to determining that the event satisfies a specified capture criterion.

3. Structure and Management of Time-Evolved Memory Images

Images captured using the introduced technique can be stored and managed using various different data structures. This section describes example embodiments for structuring and managing time-evolved memory images. The data structures and management techniques described in this section are provided for illustrative purposes, but are not to be construed as limiting. Other types of data structures can also be applied to manage memory images captured according to the introduced technique.

In this context, "time-evolved memory images" generally refers to related memory images captured at different times. For example, a first memory image captured at a first time may be indicative of a first memory state (e.g., a first state of in-memory data for an application process), while a second memory image captured at a second time after the first time may be indicative of a second memory state (e.g., a second state of in-memory data for the application process). In this example, the first memory image and second memory image may be collectively referred to as time-evolved memory images.

Time-evolved memory images can be represented in an image evolution tree to indicate dependency relationships between memory images. It may be preferable to represent such memory images in an image evolution tree to retain understanding of how certain memory images relate to each other (e.g., dependency relationships), what is shared between the images (e.g., common chunks of data), how differences in the images apply, etc. Such relationships can be represented with a set of "family" links per image (e.g., parent, child, sibling). The links may be represented using the name-strings of the capture file objects associated with the memory images. Alternatively, or in addition, some unique invariant object-id integer can be used. Unique invariant object-id integers may be preferable, in some embodiments, since such data require less space in the metadata structures. Further, using unique invariant object-id integers may prevent the need to find and update multiple metadata structures each time the name-string of a memory image is changed. In some embodiments, the name-string for each memory image can be retained for human user interface purposes and can be mapped to unique invariant object-id integers using a mapping structure. Such a mapping structure can be configured to support grouping or otherwise organizing sets of capture file objects associated with the memory images.

In a linked difference scheme, each memory image contains a link (e.g., a name or Object-id) to its parent image and a data structure associating the linear index and physical chunk pointer for each chunk that is different from the parent image. A new chunk pointer can be a null pointer if that chunk space was removed (deleted) from the new memory image. Locating a given chunk may therefore include sequentially probing from the most recent difference image back along its ancestor chain until that chunk index is first found (i.e., the most recent version of that chunk).

Reference counting can be applied to manage references to shared objects. Reference counting may involve a counter associated with a given object that is incremented for each other object that references the given object. The counter is decremented when another object stops referencing the given object. If the counter transitions to zero, the given object is no longer being used and can therefore be freed or deleted. To understand sharing between objects at a finer granularity, individual chunks in a given object can be reference counted; however, this may be time consuming and/or computationally expensive in certain scenarios. Alternatively, a capture file object associated with a memory image can be reference counted and family pointers can be relied upon to understand whether a given object is not shared by any other object (e.g., has no child).

A linked difference scheme can be implemented in various different ways. Described herein are at least two illustrative implementations: 1) a difference-only index, and 2) a full index. For this discussion, it can be assumed that each memory image is composed of fixed-size chunks of space; however, this is not intended to be limiting. A full index for a given memory image may therefore include a linear array of pointers to physical chunks allocated to sequential chunks of an address space associated with the memory image. The address space associated with the memory image may be a memory object address space. In contrast, a difference-only index for a given memory image may include a set of chunk pairs (index, pointer) that represent a difference in the memory image from that of its parent image.

Figure 14:
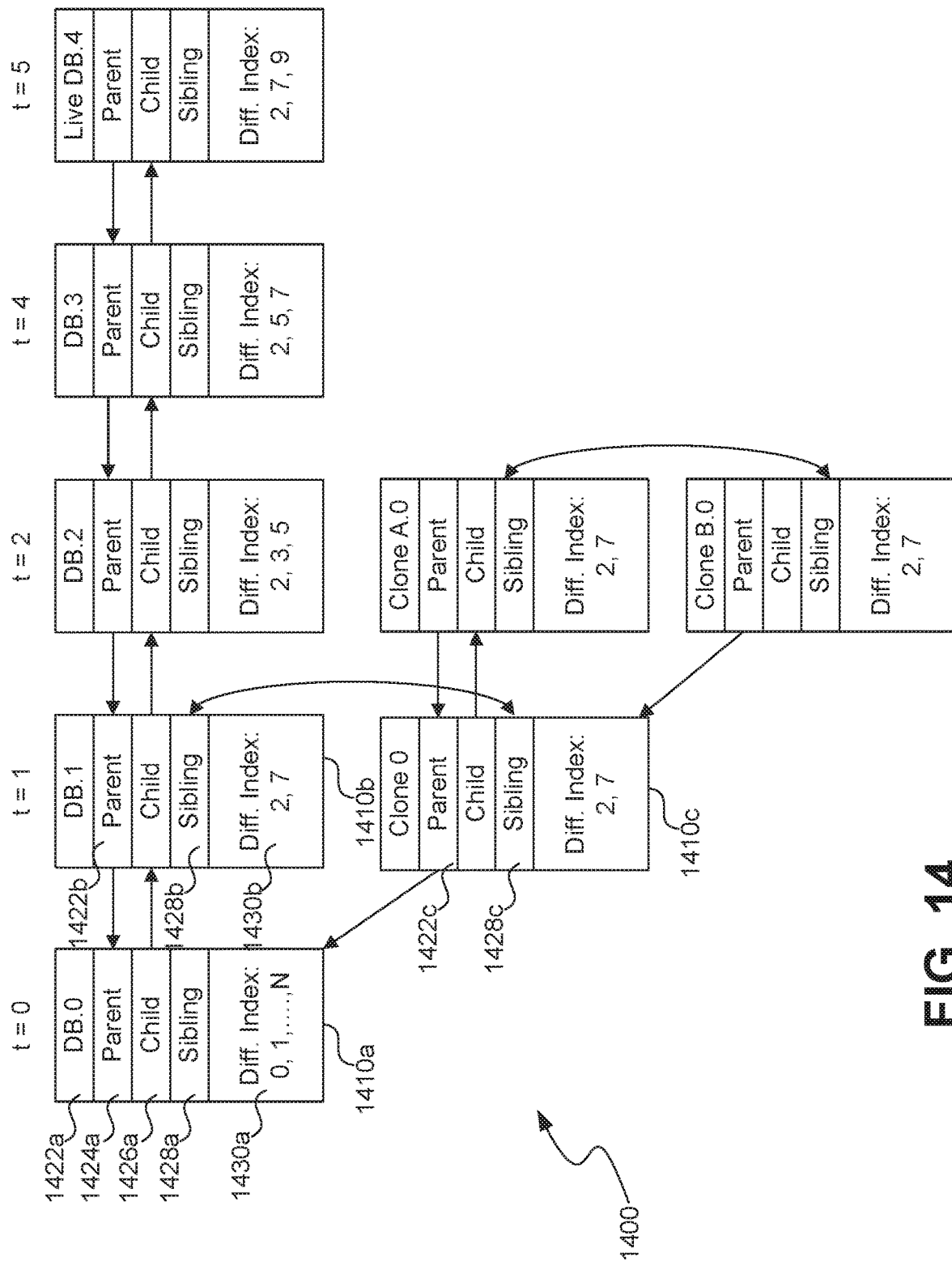
FIG. 14 shows a diagram of an example linked difference-only index associated with multiple memory images, according to an embodiment of the introduced technique.

FIG. 14 shows a diagram of an example difference-only index 1400, according to an embodiment of the introduced technique. As shown in FIG. 14, the example difference-only index 1400 includes multiple objects representative of memory images captured at different times t and that are related to each other as indicated by the links represented by arrows. Each of the objects in the example difference-only index 1400 may represent a capture file object and may include various metadata such as family pointers (e.g., parent pointers, child pointers, sibling pointers, etc.) to related family members and a chunk index including a set of the chunk indices with chunk images that differ from a given parent. Note, for illustrative clarity, the diagram in FIG. 14 does not show the chunk pointers associated with each of the chunk indices. In some embodiments, the difference-only index 1400 may represent data stored in a capture store such as capture store 582 in FIG. 5 and/or capture store 982 in FIGS. 9-10.

In the example difference-only index 1400 depicted in FIG. 14, object 1410*a* represents a first memory image captured at time t=0, object 1410*b* represents a second memory image captured at time t=1 (after time t=0), and object 1410*c* represents a third memory image that is an evolved copy of the first memory image. Each object includes an identifier. For example, object 1410*a* includes identifier 1422*a* ("DB.0"). As previously discussed, the identifier may be a unique invariant object-id integer.

Each object also includes a parent pointer that points to a parent of the object. For example, object 1410*a* includes parent pointer 1424*a*, object 1410*b* includes parent pointer 1424*b*, and object 1410*c* includes parent pointer 1424*c*. In this example, parent pointer 1422*a* may be a null value indicating that object 1410*a* represents a memory image with no parent. Such a memory image may, for example, be an initial memory image captured at time t=0 during an application process. Parent pointer 1424*b* of object 1410*b* points to object 1410*a* which indicates that the memory image associated with object 1410*a* is a parent to the memory image associated with object 1410*b*. Similarly, parent pointer 1424*c* of object 1410*c* points to object 1410*a* which indicates that the memory image associated with object 1410*a* is a parent to the memory image associated with object 1410*c*. Parent pointers for the other objects in difference-only index 1400 are not expressly called out in FIG. 14 for illustrative clarity; however, the values of such pointers are indicated by arrows.

Each object also includes a child pointer that points to a child of the object. For example, object 1410*a* includes child pointer 1426*a*. In this example, child pointer 1426*a* points to object 1410*b* which indicates that the memory image associated with object 1410*b* is a child to the memory image associated with object 1410*a*. Child pointers for objects 1410*b* and 1410*c* and other objects in difference-only index 1400 are not expressly called out in FIG. 14 for illustrative clarity; however, the values of the pointers are indicated by arrows.

Each object also includes a sibling pointer that points to a sibling of the object. In this context, a sibling of a given object may represent a clone or restore of the parent image. A sibling pointer enables a parent to track more than one child. For example, instead of needing a variable number of child pointers in its own data, a parent object can use a sibling pointer in its child data structure to link together all of its children such that the parent's child pointer can be used to find the rest of the children via their associated sibling pointers. In this example, sibling pointer 1428*a* of object 1410*a* may be a null value which indicates that the parent image, if any, associated with object 1410*a* has no additional children. In contrast, sibling pointer 1428*b* of object 1410*b* points to object 1410*c* and sibling pointer 1428*c* of object 1410*c* points to object 1410*b* which indicates that memory images associated with objects 1410*b* and 1410*c* are the only children of object 1410*a*. Sibling pointers for other objects in difference-only index 1400 are not expressly called out in FIG. 14 for illustrative clarity; however, the values of the pointers are indicated by arrows.

Each object also includes a chunk index with chunk images that differ from a given parent. Chunks may be referred to herein as "owned" by a memory image where the chunk is different than the parent whereas other chunks of the full memory image may be referred to as "borrowed" from one of its ancestors. In other words, in a difference-only index 1400, the chunk index for each object may be an owned chunk index since each object's chunk index only includes pointers to owned chunks. In some embodiments, the owned chunks are represented using sets of one or more tuples. For example, a tuple for a particular owned chunk may be represented as (1, a), wherein "1" represents a chunk index identifier and "a" represents a pointer to a location in the physical memory media (e.g., PMEM or DRAM) allocated to that chunk. The data structure which holds the owned-chunk tuples that may have some type of key-value data structure (e.g., (index, pointer)); a hash-map data structure, a tree data structure, or any other suitable data structure.

In this example, object 1410*a* includes owned chunk index 1430*a*, object 1410*b* includes owned chunk index 1430*b*, and object 1410*c* includes owned chunk index 1430*c*. For example, since object 1410*a* is associated with a memory image with no parent (i.e., an initial memory image at time t=0), the owned chunk index 1430*a* includes pointers to all the chunks 0 through N associated with the memory image. Conversely, owned chunk index 1430*b* of object 1410*b* and owned chunk index 1430*c* of object 1410*c* only include pointers to chunks that are different than in the respective parent (in both cases object 1410*a*). For example, owned chunk index 1430*b* includes pointers to chunks 2 and 7 since those chunks have changed relative to the parent. In other words, at time t=1, chunks 2 and 7 are owned by object 1410*b* (at time t=1) whereas the other chunks of the full memory image are borrowed from the ancestors (in this case immediate parent object 1410*a*).

Figure 15:
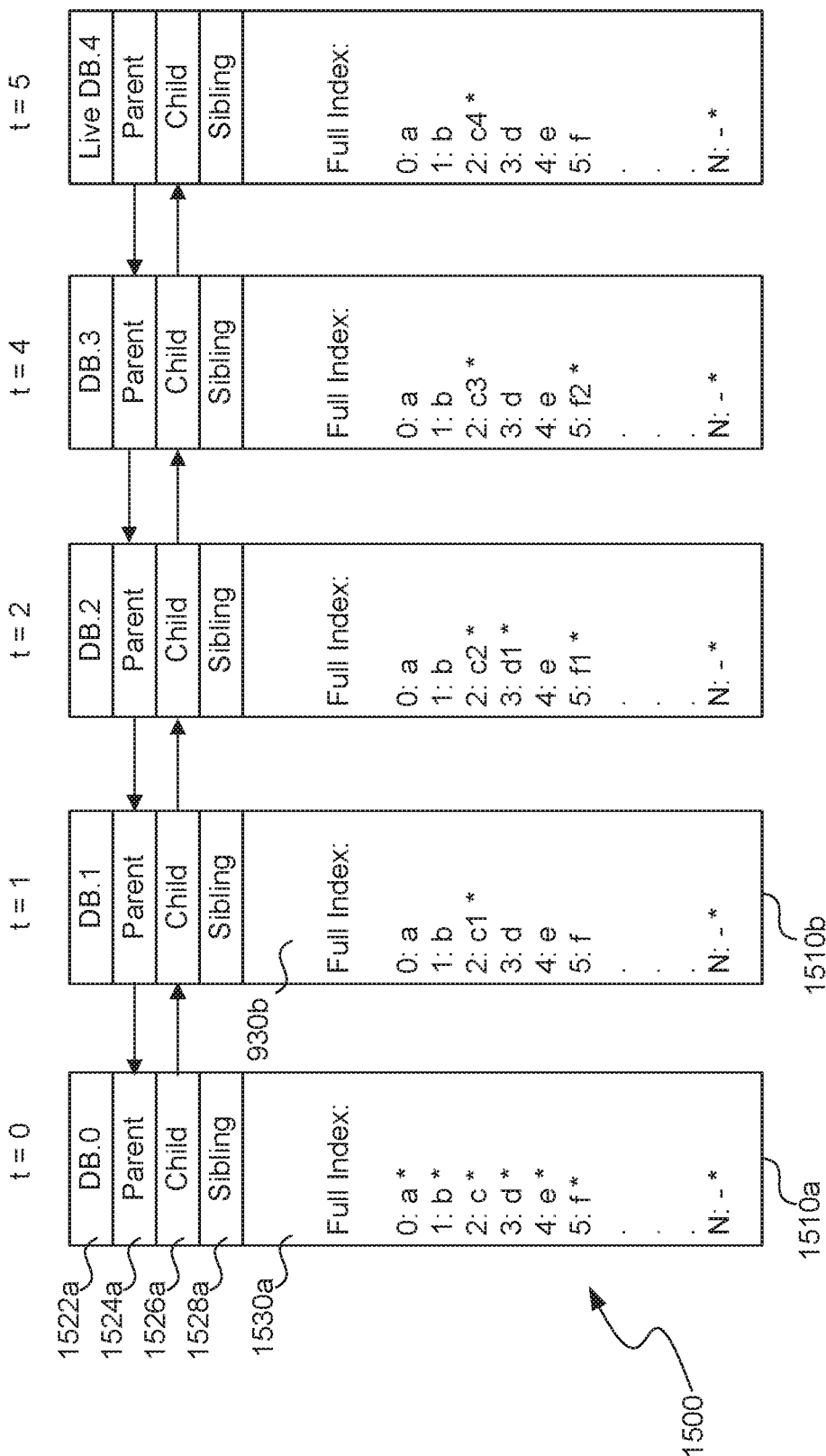
FIG. 15 shows a diagram of an example linked full index associated with multiple memory images, according to an embodiment of the introduced technique.

FIG. 15 shows a diagram of an example full index 1500, according to an embodiment of the introduced technique. The full index 1500 depicted in FIG. 15 represents the same set of memory images that are represented in the difference-only index 1400 of FIG. 14. As with the difference-only index 1400, full index 1500 includes multiple objects representative of memory images captured at different times t and that are related to each other as indicated by the links represented by arrows. Each of the objects in the example full index 1500 may represent a capture file object and may include various metadata such as pointers to related family members and a set of the chunk indices with chunk images. In some embodiments, the full index 1500 may represent data stored in a capture store such as capture store 582 in FIG. 5 and/or capture store 982 in FIGS. 9-10.

Similar to difference-only index 1400, each object in the full index 1500 includes an identifier, a parent pointer, a child pointer, a sibling pointer, and a chunk index. For example, object 1510*a* includes identifier 1522*a*, parent pointer 1524*a*, child pointer 1526*a*, sibling pointer 1528*a*, and chunk index 1530*a*. The full index 1500 differs from the difference-only index 1400 in that the chunk index of each object includes a chunk pointer for each chunk associated with the memory image regardless of whether the chunk is "owned" by a given object or is "borrowed" from an ancestor. Still, in some embodiments, it may be preferable to track whether a given chunk pointer in a chunk index points to an owned chunk or a borrowed chunk. In the diagram of FIG. 15, owned chunks are indicated by an asterisk next to certain pointers in the chunk index of each object. For example, the chunk index 1530*a* for object 1510*a* includes pointers for chunks 0 through N. Since the memory image associated with object 1510*a* has no parent, all of the chunks are owned by object 1510*a*, as indicated by the asterisks. Conversely, while chunk index 1530*b* of object 1510*b* also includes pointers for all chunks 0 through N, only the pointer "c1" for chunk "2" is indicated as owned since it differs from the pointer "c" of the same chunk "2" in the parent object. The owned status indicators (i.e., the asterisks in FIG. 15) may be stored with each pointer in each chunk index or may be stored separately (e.g., in a bitmap).

The difference-only index and full index approaches have various advantages and drawbacks, therefore the type of index implemented will depend on various factors associated with implementation environment. For example, due to the reduced amount of metadata needed, a difference-only index will generally be more space efficient than a full index. However, while a full index can directly index to a chunk pointer, a difference-only index may require traversing earlier ancestors in an ancestry chain when searching for a chunk pointer, which may impact performance. Further, when creating a new memory capture, an existing index is captured, and a new index is created to facilitate the on-going execution of the application process. When using a full index approach, creating a new object in the ancestry chain includes copying the entire previous object in the ancestry chain and clearing data indicative of owned status. In contrast, in a difference-only index approach, a new object is empty (until a difference is detected) so no copying is required.

Figure 16:
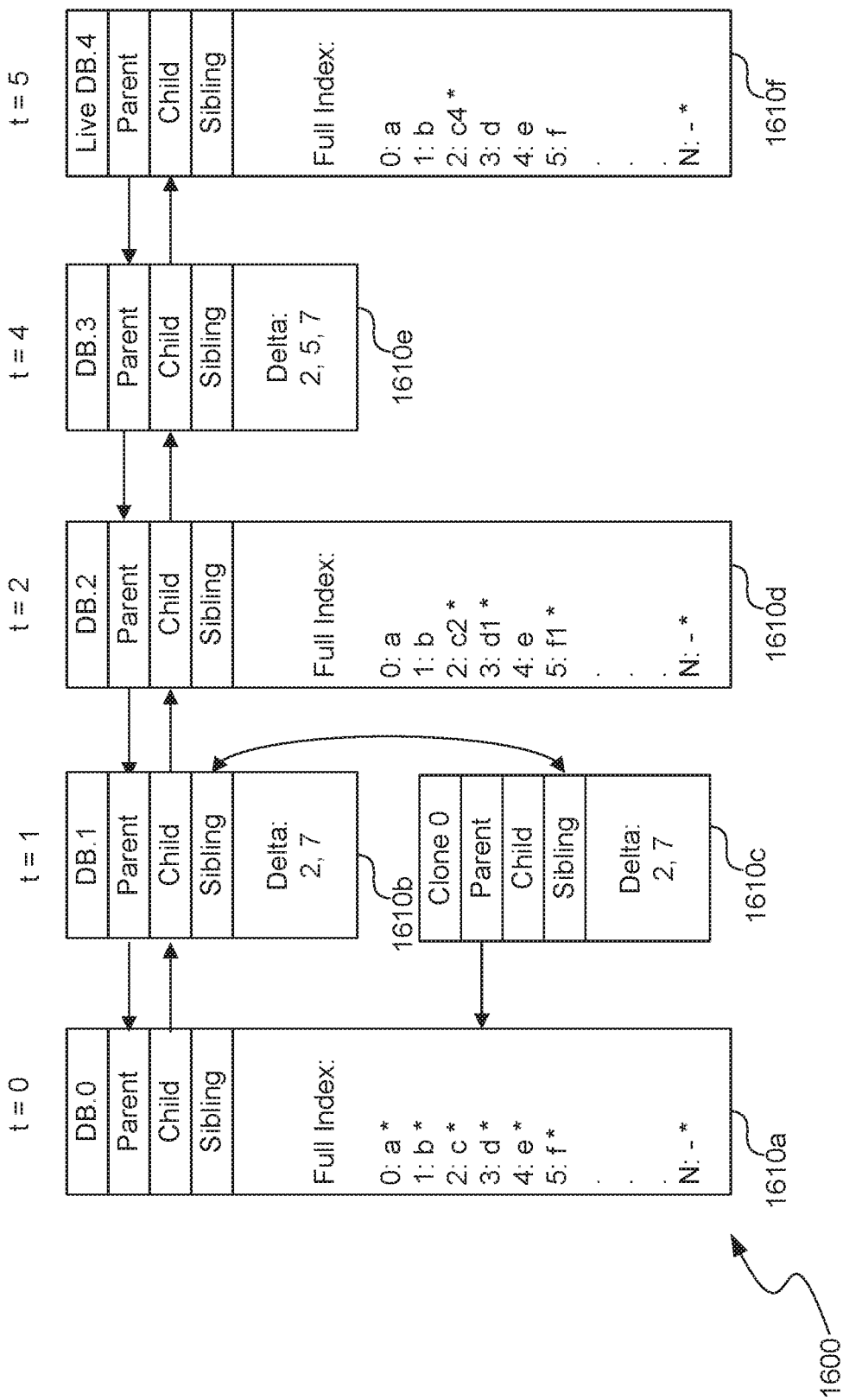
FIG. 16 shows a diagram of an example linked hybrid index, according to an embodiment of the introduced technique.

In some embodiments, a combination of full index and difference-only index objects may be used to manage time-evolved memory images. FIG. 16 shows a diagram of an example hybrid index 1600, according to an embodiment of the introduced technique. As shown in FIG. 16, the example hybrid index 1600 includes multiple objects 1610*a*-1610*f* representing various memory images captured at various times. Some of the objects in the ancestry chain (e.g., objects 1610*b*, 1610*c*, and 1610*e*) are configured according to a difference-only index technique (as described with respect to FIG. 14) while other objects in the ancestry chain (e.g., objects 1610*a*, 1610*d*, and 1610*f*) are configured according to a full index technique (as described with respect to FIG. 15). The decision to configure a given object one way or another may be based on various factors taking into consideration the relative advantages and drawbacks of each approach. Such factors may include, for example, available storage space, number of different chunks, length of ancestry chain, status of application process, application process requirements, etc.

In some embodiments, a system may dynamically select which type of indexing approach to apply for each memory capture. For example, a system may apply a rule that specifies that objects are by default configured as difference-only index objects (e.g., to save space) but that every few objects (e.g., every five objects) in the ancestry chain is configured as a full index to reduce the number of objects that must be traversed when searching for a chunk pointer. As another illustrative example, a system may apply a rule that specifies that objects are by default configured as full index objects (e.g., to improve access performance) and are only configured as difference-only objects in response to determining that available storage space has fallen below a threshold level.

In some embodiments, an ancestry chain of capture file objects may retroactively change configuration over time. For example, an ancestry chain may initially be configured according to a full index approach (e.g., to improve access performance) and may dynamically and retroactively change configuration into a difference-only index, for example, in response to determining that available storage has fallen below a threshold level. In such a situation, this may involve traversing the ancestry chain and reconfiguring objects, for example, by deleting chunk pointers that are not "owned" by a given full index object.

Figure 17:
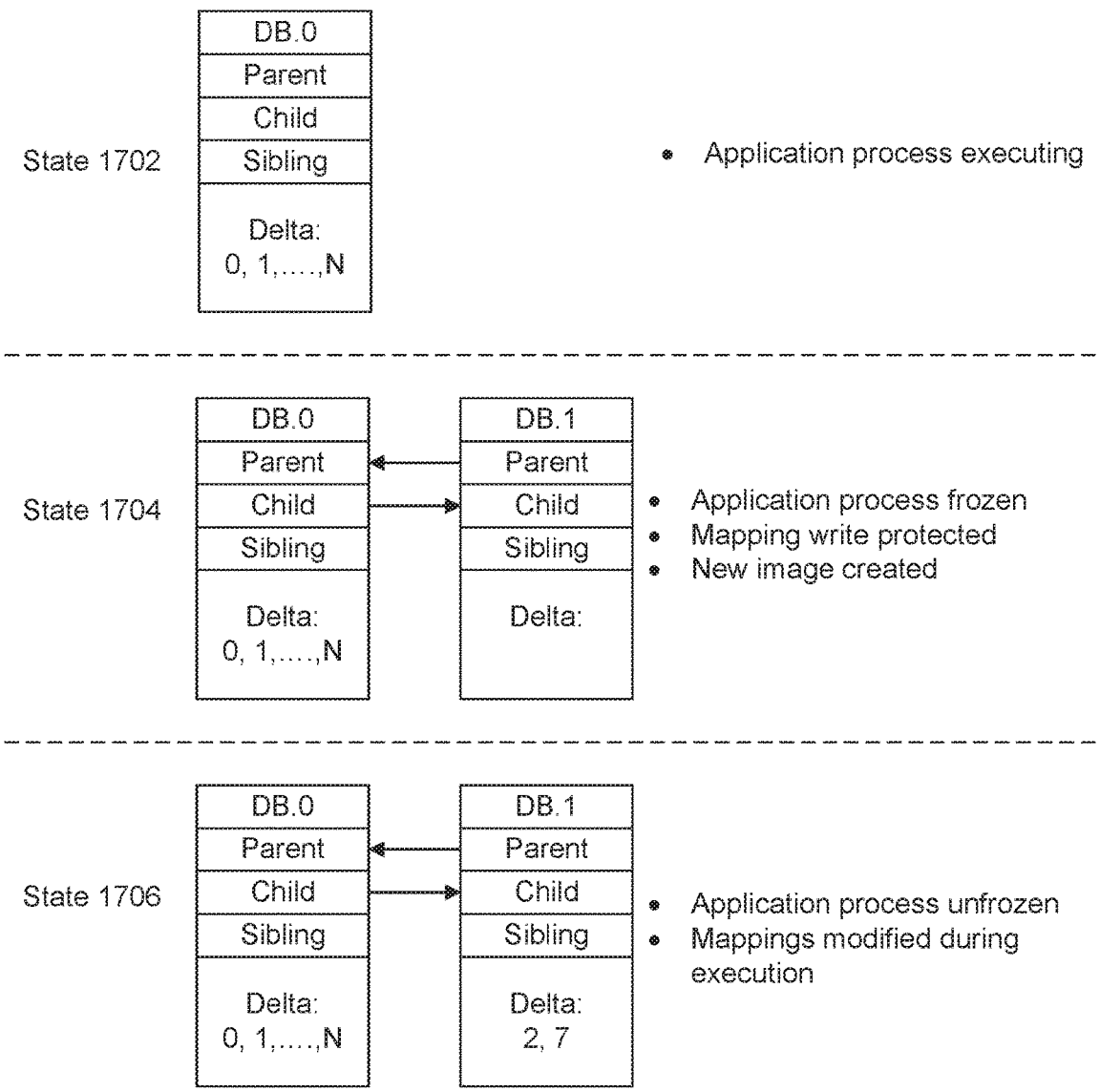
FIG. 17 shows a diagram that illustrates an example process for updating a linked index when capturing a memory image, according to an embodiment of the introduced technique.

FIG. 17 shows a diagram that illustrates an example process for updating a linked index when capturing a new memory image. As shown in FIG. 17, an initial state 1702 of an example ancestry chain depicts a single object associated with a first memory image. The example object is depicted as a difference-only index (e.g., similar to object 1410*a* of FIG. 14); however, this process can similarly be applied using a full index approach.

At state 1702, an application process is executing, for example, using an allocated portion of memory (e.g., PMEM and/or DRAM), for example, as described with respect to FIGS. 6 and 12. In other words, this first memory image at state 1702 may be referred to as a current memory image. The current memory image may represent an ephemeral state of the memory in the sense that the state is evolving, and a memory image indicative of a particular state has not been captured and persisted.

Next, at state 1704, the execution of the application process is frozen, the current image metadata is saved, mappings are write-protected, and a new second memory image is created, for example, as described with respect to FIGS. 6 and 12. As shown in FIG. 17, the new second memory image (corresponding to object DB.1) is created with no owned chunks since the chunks have not yet been modified by execution of the application process.

Next, at state 1706, the application process is unfrozen. The new second memory image (corresponding to object DB.1) created at state 1704 is now the current memory image and is therefore representative of an ephemeral state of the memory. As mappings are modified by the application process after resuming execution, the chunk index associated with current memory image is updated to reflect new owned chunks (i.e., chunk mappings that are different than the previous memory image). In contrast, the previous memory image (corresponding to object DB.0) is representative of a persistent state of the memory at a previous time. This previous memory image will not change due to the ongoing execution of the application process.

Figure 18:
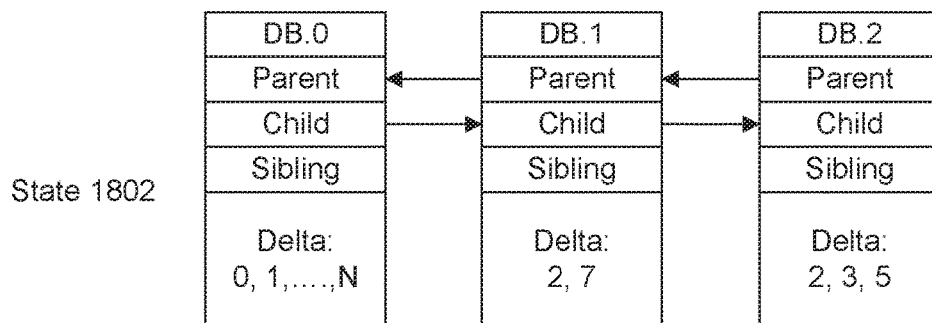
FIG. 18 shows a diagram that illustrates an example process for updating a linked index when deleting a memory image that does not have any children, according to an embodiment of the introduced technique.
Figure 18:
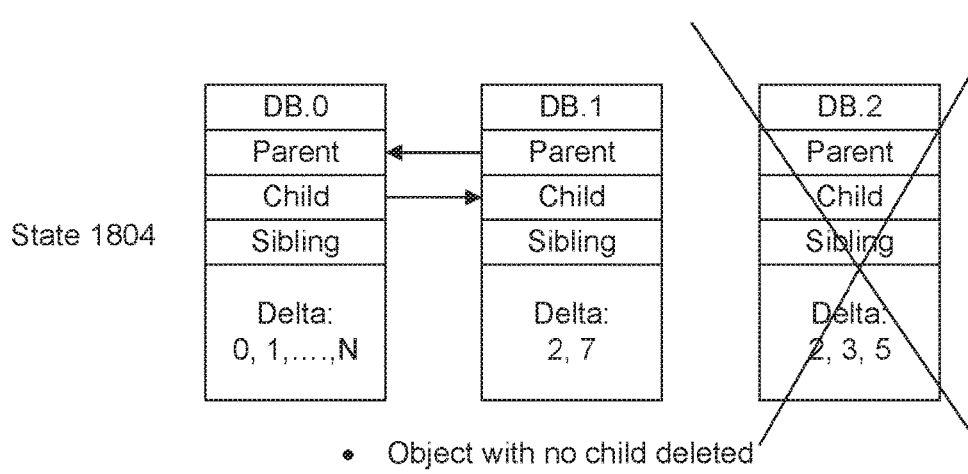
Figure 18:
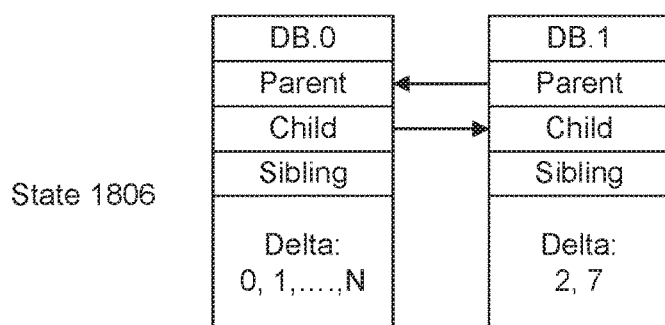

How a given memory image is deleted may depend on where the memory image resides in an ancestry chain. FIG. 18 shows a diagram that illustrates an example process for updating a linked index when deleting a memory image that does not have any children. As shown in FIG. 18, an initial state 1802 of an example ancestry chain includes three objects corresponding to three memory images captured at different times. The last (most recent) memory image (corresponding to object DB.2) does not have any associated child images, as indicated by the arrows. The example objects are depicted as difference-only index objects (e.g., similar to object 1410a of FIG. 14); however, this process can similarly be applied using a full index approach.

At state 1804, the last (most recent) memory image (corresponding to object DB.2) is deleted from the ancestry chain. Since this most recent memory image does not include any child images, the memory image can simply be deleted by freeing any owned chunks.

A resulting ancestry chain after deletion of the most recent memory image is depicted at state 1806.

Figure 19:
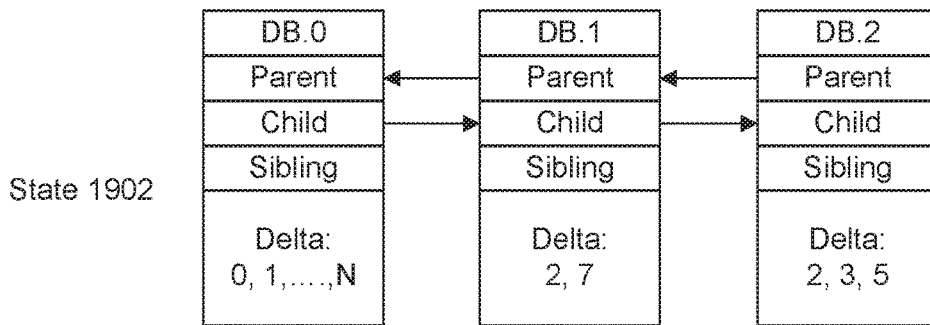
FIG. 19 shows a diagram that illustrates an example process for updating a linked index when deleting a memory image that includes at least one child, according to an embodiment of the introduced technique.
Figure 19:
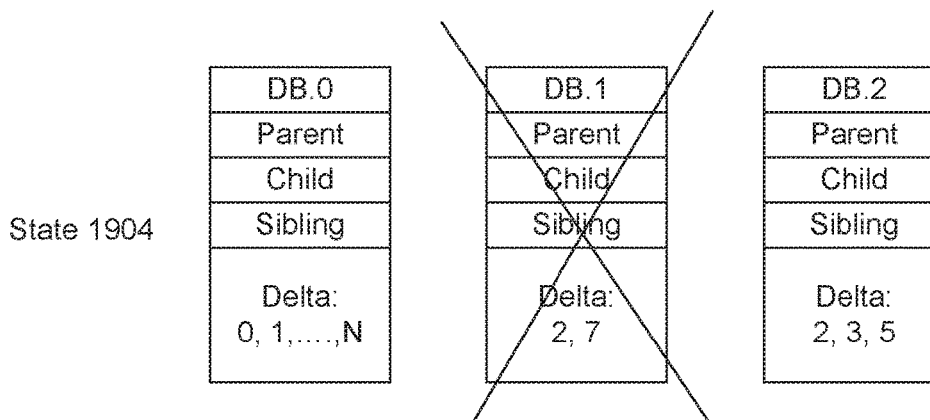
Figure 19:
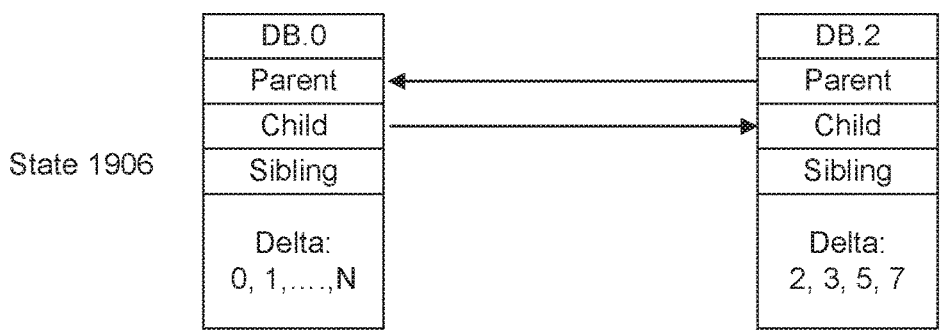

FIG. 19 shows a diagram that illustrated an example process for updating a linked index when deleting a memory image that includes at least one child. As shown in FIG. 19, an initial state 1902 of an example ancestry chain includes three objects corresponding to three memory images captured at different times. The middle memory image (corresponding to object DB.1) includes one child memory image (namely object DB.2), as indicated by the arrows. The example objects are depicted as difference-only index objects (e.g., similar to object 1410a of FIG. 14); however, this process can similarly be applied using a full index approach.

At state 1904, the middle memory image (corresponding to object DB.1) is deleted from the ancestry chain.

Since this middle memory image includes one child, deleting the memory image includes freeing any owned chunks that are also owned in the child and merging any unique owned chunks into the child, for example, as depicted at state 1906.

In some cases, deleting a memory image with more than one child may involve a determination of unique (merged) chunks per child. Further, if a chunk has been merged to a previously examined child, that chunk may copied to a uniquely owned instance so that the chunk is uniquely owned by the receiving child. All of this process may use up more computing resources that are saved by deleting such a memory image. Accordingly, in some embodiments, a memory image may not be deleted if the memory image includes more than one child.

Figure 20:
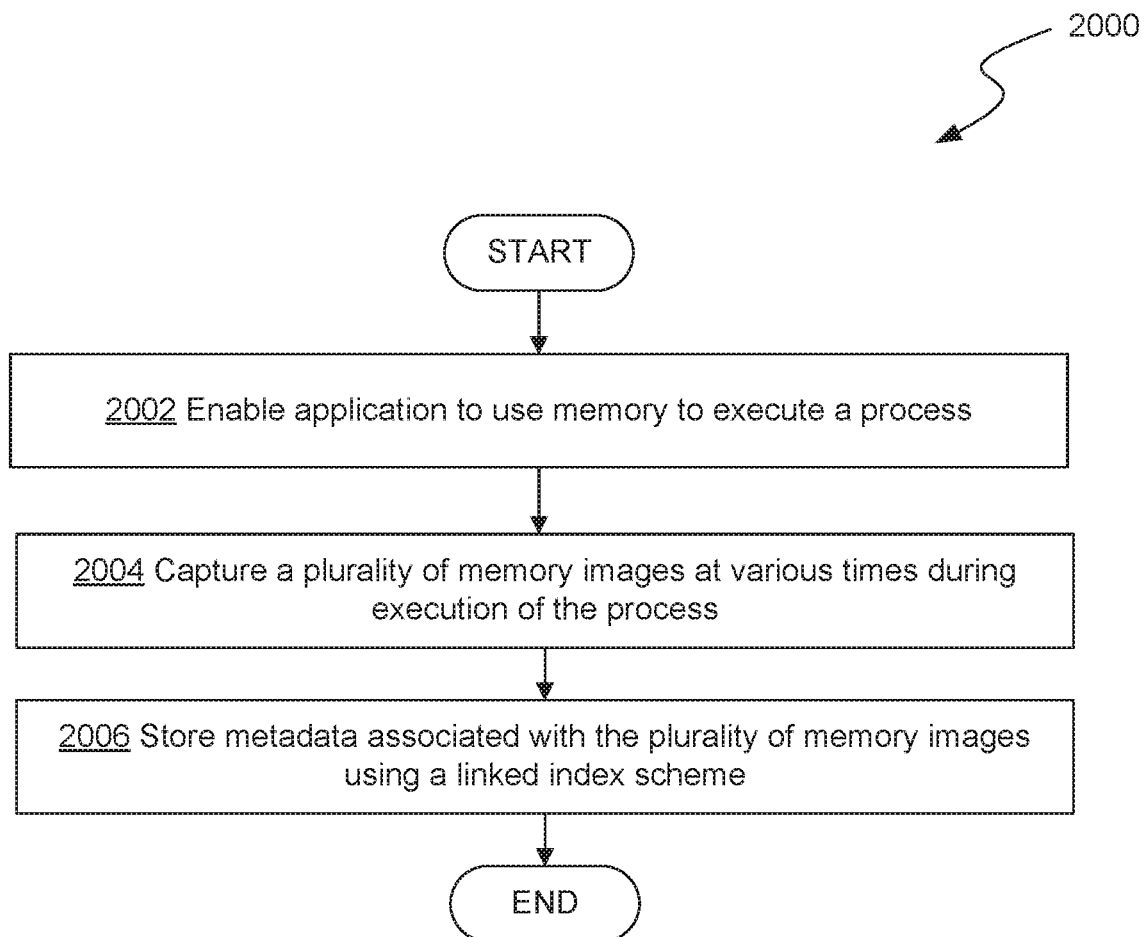
FIG. 20 shows a flow diagram of an example process for storing multiple memory images using a linked index, according to an embodiment of the introduced technique.
Figure 21:
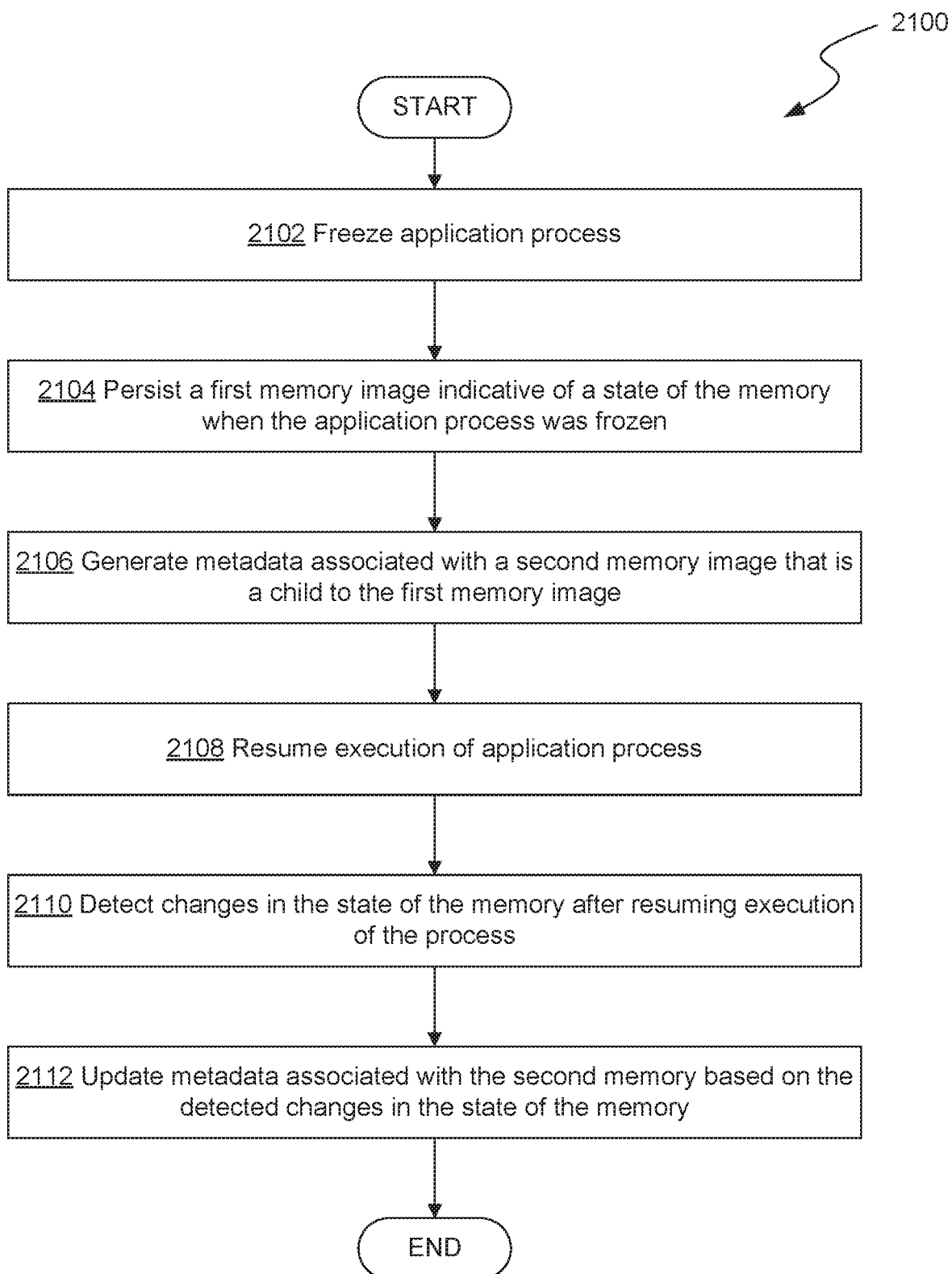
FIG. 21 shows a flow diagram of an example process for updating a linked index when capturing a memory image, according to an embodiment of the introduced technique.
Figure 22:
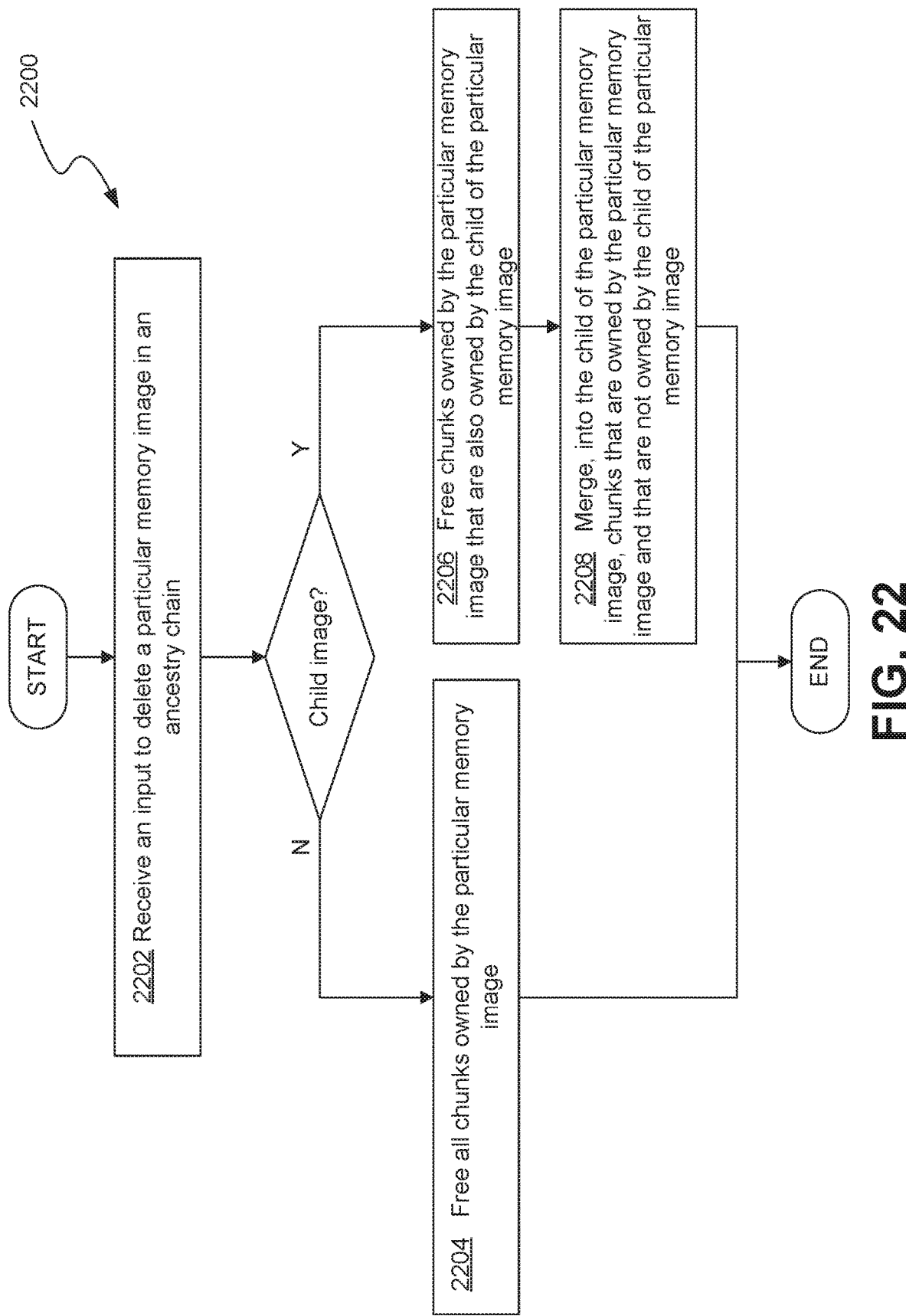
FIG. 22 shows a flow diagram of an example process for updating a linked index when deleting a memory image, according to an embodiment of the introduced technique.

FIGS. 20-22 show flow diagrams of example processes 2000-2200 for managing associated with embodiments of the introduced technique. Certain operations of the example processes 2000-2200 are described with reference to FIGS. 14-19. Example processes 2000-2200 can be executed by one or more of the components of a computer system such as the example processing system 4200 described with respect to FIG. 42. For example, in some embodiments, the example processes 2000-2200 may be represented in instructions stored in memory that are then executed by a processor. Alternatively, or in addition, certain operations associated with example processes 2000-2200 may be implemented in hardware such as a memory controller. In this context, a memory controller may include one or more digital circuits. The digital circuitry of the memory controller may include programmable circuitry such FPGAs, PLDs, etc., special-purpose hardwired (i.e., non-programmable) circuitry such as ASICs, or a combination of such forms, that are programmed or otherwise configured to perform one or more memory management operations. Such a memory controller may be a standalone memory controller or may be integrated into another component such as CPU or a memory module (e.g., an NVDIMM). The processes 2000-2200 described with respect to FIGS. 20-22 are examples provided for illustrative purposes and are not to be construed as limiting. Other processes may include more or fewer operations than depicted, while remaining within the scope of the present disclosure. Further, the operations depicted in example processes 2000-2200 may be performed in a different order than is shown.

FIG. 20 shows a flow diagram of an example process 2000 for storing memory images using a linked index, according to an embodiment of the introduced technique.

Example process 2000 begins at operation 2002 with enabling an application to use memory to execute an application process, for example, as described with respect to operation 602 of example process 600 depicted in FIG. 6 or operation 1202 of example process 1200 depicted in FIG. 12.

Example process 2000 continues at operation 2004 with capturing multiple memory images at various times during execution of the application process. Example processes for capturing memory images are described with respect to FIGS. 6-8 and 11-13.

Example process 2000 continues at operation 2006 with storing metadata associated with the plurality of memory images using a linked index scheme. Note, although depicted in FIG. 20 as two operations, operations 2004 and 2006 may include multiple operations performed at different times. For example, each time a memory image is captured, metadata specifically associated with that memory image may be stored. This may be repeated multiple times during the execution of the application process to capture the multiple memory images and store metadata associated with the multiple memory images using a linked index scheme.

A particular memory image of the multiple memory images may be indicative of a particular state of the memory at a particular time during execution of the application process. In some embodiments, the particular state of the memory may include a particular state of mappings associated with the memory.

The stored metadata associated with a particular memory object may include a chunk index data structure, for example, as described with respect to FIGS. 14 and 15. Specifically, the chunk index data structure may be indicative of chunks that are owned by the particular memory images. As previously discussed, chunks that are owned by a particular memory image may include one or more chunks, of an overall set of multiple chunks, that differ from a parent of the particular memory image. In this case, each chunk may represent a portion of the memory that is mapped into an address space associated with the application (or application process). In some embodiments, such chunks are of a fixed size (e.g., 2 MB). The parent to the particular memory image may be another one of the multiple memory images that was captured before the particular memory image. In other words, the parent to the particular memory image may be indicative of a state of the memory at a time before the particular time associated with the particular memory image.

In some embodiments, the chunk index data structure associated with a particular memory image may be configured as a difference-only index, for example, as described with respect to FIG. 14. An example chunk index data structure in a difference-only index configuration is depicted as owned chunk index 1430b in FIG. 14. In a difference-only index configuration, the chunk index data structure may include pointers to only the chunks that are owned by the particular memory image (i.e., that are different than the parent). Each chunk pointer may indicate a location in the physical memory media (e.g., PMEM and/or DRAM) that is mapped to the address space associated with the application (or application process). Each chunk pointer included in the chunk index data structure may be stored as a tuple in a key-value data structure (e.g., chunk index, chunk pointer)), a hash-map data structure, a tree data structure, or any other suitable data structure.

In some embodiments, the chunk index data structure associated with a particular memory image may be configured as a full index, for example, as described with respect to FIG. 15. An example chunk index data structure in a full index configuration is depicted as owned chunk index 1530b in FIG. 15. In a full index configuration, the chunk index data structure may include pointers to all of the multiple chunks associated with the application process, including chunks owned by memory images captured at earlier times. In some embodiments, the full chunk index may still indicate which chunks are owned by a particular memory image by using chunk status indicators that are indicative of the chunks that are owned by the particular memory image. Examples of such indicators are depicted as asterisks in FIG. 15. In some embodiments, each chunk status indicator is stored with an associated chunk pointer in the chunk index data structure. In other embodiments, the chunk status indicators are stored separately from the chunk index data structure (e.g., in a bitmap).

In some embodiments, the chunk index data structure of the particular memory object can be reconfigured after persisting the memory image. For example, if the chunk index data structure was originally configured as full index, the chunk index data structure can later be reconfigured as a difference-only index, for example, to reduce the storage footprint of the metadata associated with the particular memory image. Similarly, if the chunk index data structure was originally configured as a difference-only index, the chunk index data structure can later be reconfigured as a full index, for example, to improve performance when searching for a chunk pointer in an ancestry chain including multiple memory images. In some embodiments, reconfiguring the chunk index data structure as a full index may include obtaining, from one or more of the other multiple memory images in the ancestry chain (e.g., ancestors to the particular memory image), chunk pointers to chunks that are not owned by the particular memory image. The chunk index data structure can then be updated to include these chunk pointers to chunks that are not owned by the particular memory image.

FIG. 21 shows a flow diagram of an example process 2100 for updating a linked index when capturing a memory image, according to an embodiment of the introduced technique.

Example process 2100 begins at operation 2102 with initiating an image capture by freezing the application process, for example, as described with respect to example process 600 in FIG. 6 and example process 1200 in FIG. 12.

Example process 2100 continues at operation 214 with persisting a first memory image that is indicative of a state of the memory when the application process was frozen. Persisting the first memory image may include, write protecting the in-memory data, and generating and/or updating the metadata associated with the first memory image to reflect the state of the memory when the application process was frozen. In some embodiments, the metadata associated with the first memory image includes a first chunk index data structure.

Example process 2100 continues at operation 2106 with generating metadata associated with a second memory image that is a child to the first memory image. In some embodiments, this can include creating a new object in an ancestry chain of multiple objects associated with multiple captured memory images, for example, as described with respect to FIG. 17. In some embodiments, the metadata associated with the second memory image includes a second chunk index data structure. If configured as a difference-only index, the second chunk index data structure may be empty upon creation since the second memory image does not yet own any chunks. If configured as a full index, the second chunk index data structure may include a copy of all the pointers in the first chunk index data structure except that any owned chunk status indicators may be reset.

Example process 2100 continues at operation 2108 with unfreezing (i.e., resuming) execution of the application process. When the application process resumes, the second memory image is considered the current memory image since the first memory image is persisted to reflect a state of the memory when the application process was frozen.

Example process 2100 continues at operation 2110 with detecting changes in the state of the memory after resuming execution of the application process. For example, as one or more mappings associated with the memory may be modified after resuming execution of the application process. Such modifications to the mappings may be detected, for example, by monitoring a record of the mappings that is continually updated by a memory object service.

Example process 2100 continues at operation 2112 with updating the metadata associated with the second memory image based on the detected changes in the state of the memory. For example, the second chunk index data structure may be updated to be indicative of one or more chunks that are owned by the second memory image. In other words, the second chunk index data structure may be updated to be indicative of one or more chunks that differ from the first memory image.

FIG. 22 shows a flow diagram of an example process 2200 for updating a linked index when deleting a memory image.

Example process 2200 begins at operation 2202 with receiving an input to delete a particular memory image in an ancestry chain.

Example process 2200 continues with determining if the particular memory image is associated with a child image (i.e., a later capture). This can be determined, for example, by inspecting a child pointer included in the metadata associated with the particular memory image.

If the particular memory image does not have a child, example process 2200 may continue at operation 2204 with freeing all the chunks that are owned by the particular memory image. Again, the owned chunks may be indicated in a chunk index data structure included in the metadata associated with the particular memory image.

If the particular memory image does have a child, example process 2200 may continue at operation 2206 with freeing any chunks that are both owned by the particular memory image and owned by the child memory image. Next, at operation 2208, the chunks that are owned by the particular memory image but not owned by the child memory image (i.e., chunks uniquely owned by the particular memory image) are merged into the child memory image.

4. Use Cases for Captured Memory Images

Captured memory images of an application process can be used for various purposes including suspending and later resuming execution of the application process (e.g., to conserve and/or load balance computing resources or to migrate to another environment), restoring a failed application to a previous point in time, cloning an application (e.g., to scale out appropriate workloads or to facilitate parallel testing and/or debugging), and recovering an application process to a most recent state in an application log. Various example use cases are described below in detail. The example use case procedures are provided for illustrative purposes and are not to be construed as limiting. Memory images captured using the introduced technique can be used in other ways that are described below.

4.1 Resuming and Restoring an Application Process

Figure 23:
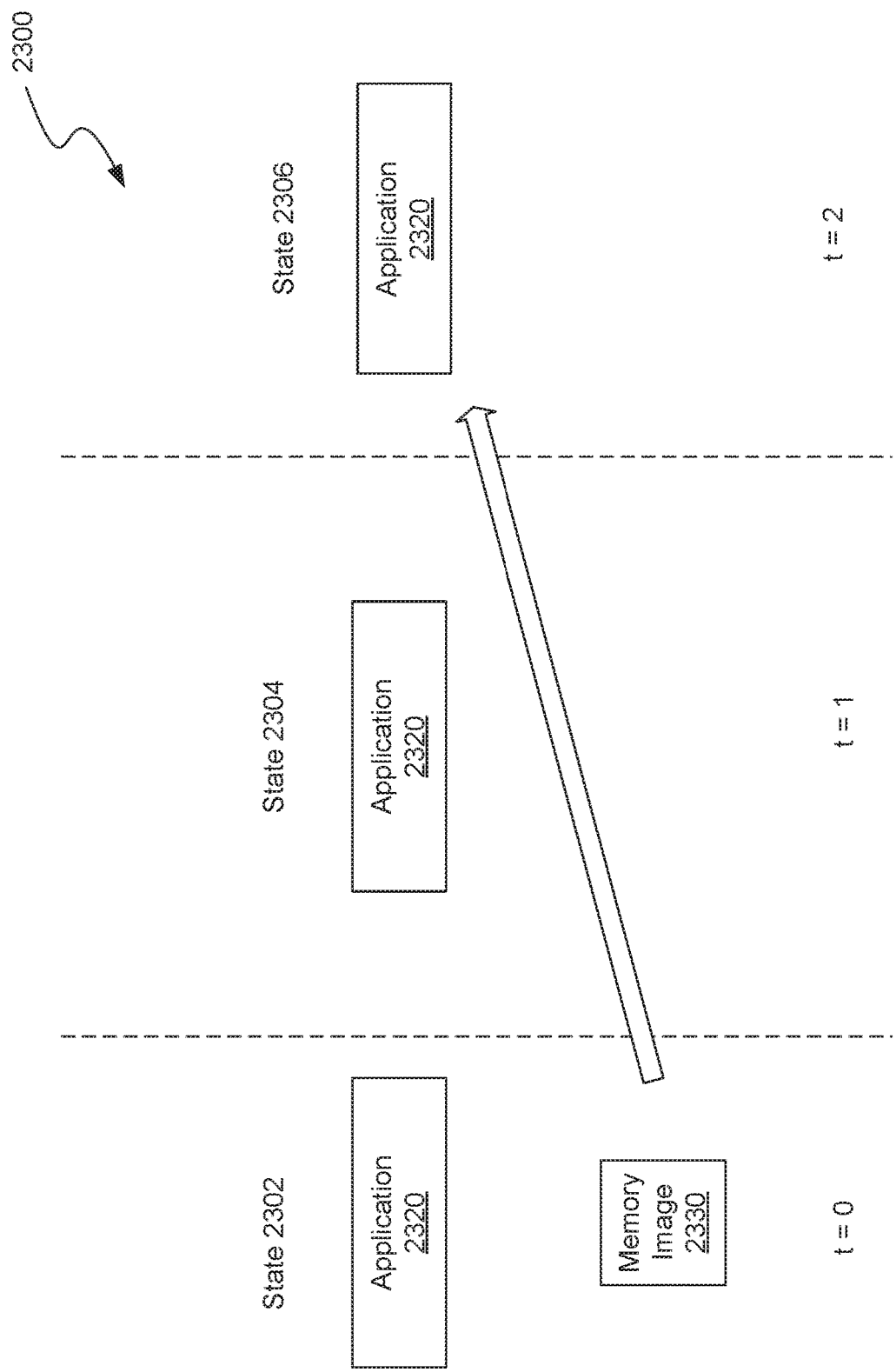
FIG. 23 shows a diagram that illustrates the use of a memory image to restore and/or resume an application process.

FIG. 23 shows a diagram 2300 that illustrates an example process for restoring an application process to a previous time and or resuming execution after suspension. In some embodiments, the operations associated with resuming an application process are the same as the operations associated with restoring an application process to a previous time. In both cases, the application instance is not running (i.e., the application process is not executing) when the operations are initiated (e.g., because the application process was suspended, crashed, or otherwise killed after an image capture). Execution of the application process is then resumed following successful completion of a resume or restore operation.

As shown in FIG. 23, an application 2320 progresses through multiple states 2302, 2304, and 2306 over time t=0, t=1, and t=2 (respectively). In the example depicted in FIG. 23, at state 2302 application 2320 is executing an application process when at time t=0, a memory image 2330 is captured. As previously discussed, the memory image 2330 captured at time t=0 is indicative of a state of the memory utilized by application 2320 at time t=0. The memory image 2330 may be captured using any embodiment of the introduced technique for capturing memory images described in previous sections or may be captured using an existing technique for capturing memory images.

In a resume operational scenario, the application 2320 suspends execution of the application process (e.g., to capture the memory image 2330) and then resumes execution using the memory image at a later time. For example, in FIG. 23, state 2304 at time t=1 may represent a suspended state and state 2306 at a later time t=2 may represent a resume state at which point the application 2320 resumes execution of the previously suspended application process based on the memory image 2330 captured at time t=0.

In a restore operational scenario, the application 2320 may have continued execution beyond the point of image capture. For example, in a restore scenario, state 2304 at time t=1 may represent continued execution by the application 2320 before the application attempts to restore at time t=2 (e.g., due to a crash) using the memory image 2330 captured at time t=0. Since the execution progressed past time t=0, any changes made to the in-memory data after time t=0 may be lost even with a successful restore without performing additional recovery operations (described in more detail below).

Figure 24:
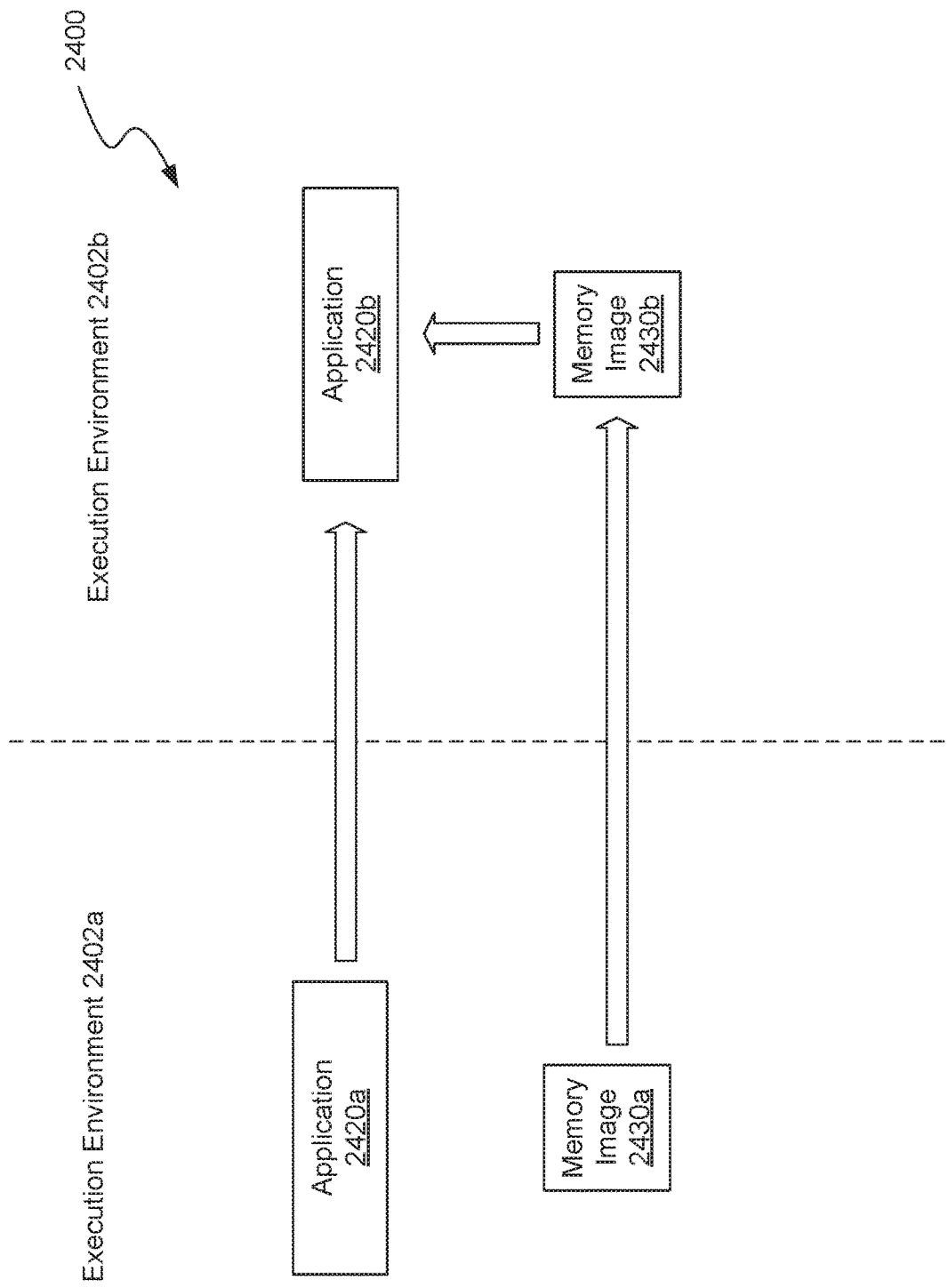
FIG. 24 shows a diagram that illustrates the use of a memory image to migrate an application process to a different execution environment.

FIG. 24 shows a diagram 2400 that illustrates an example process for migrating an application process to a different environment using a resume/restore as described with respect to FIG. 23. As shown in FIG. 24, a first application instance 2420a may execute an application process in a first execution environment 2402a. At some point during execution, it may be necessary to migrate the application process to a different execution environment (e.g., due to a failure in the execution environment 2402a, load balancing concerns, or any other reason).

To perform such a migration, a memory image 2430a can be captured based on the execution of the application process by the first application instance 2420a and transferred, copied, or otherwise made available in a target second execution environment 2402b. For example, memory image 2430b may represent a copy of the memory image 2430a captured in the first execution environment 2402a. The memory image 2430a may be captured using any embodiment of the introduced technique for capturing memory images described in previous sections or may be captured using an existing technique for capturing memory images. A second application instance 2420b (e.g., a clone of application instance 2420a) can then resume execution of the application process in the second execution environment 2402b using the memory image 2430b (e.g., using a process similar to resume/restore described with respect to FIG. 23).

The two execution environments 2402a-b may represent two different physical machines (e.g., connected via a network), may represent two different virtual machines instantiated at one or more physical machines, may represent two different modules in a single machine, or may represent any other physical or logical separation of execution environments.

4.2 Cloning an Application Instance

Figure 25:
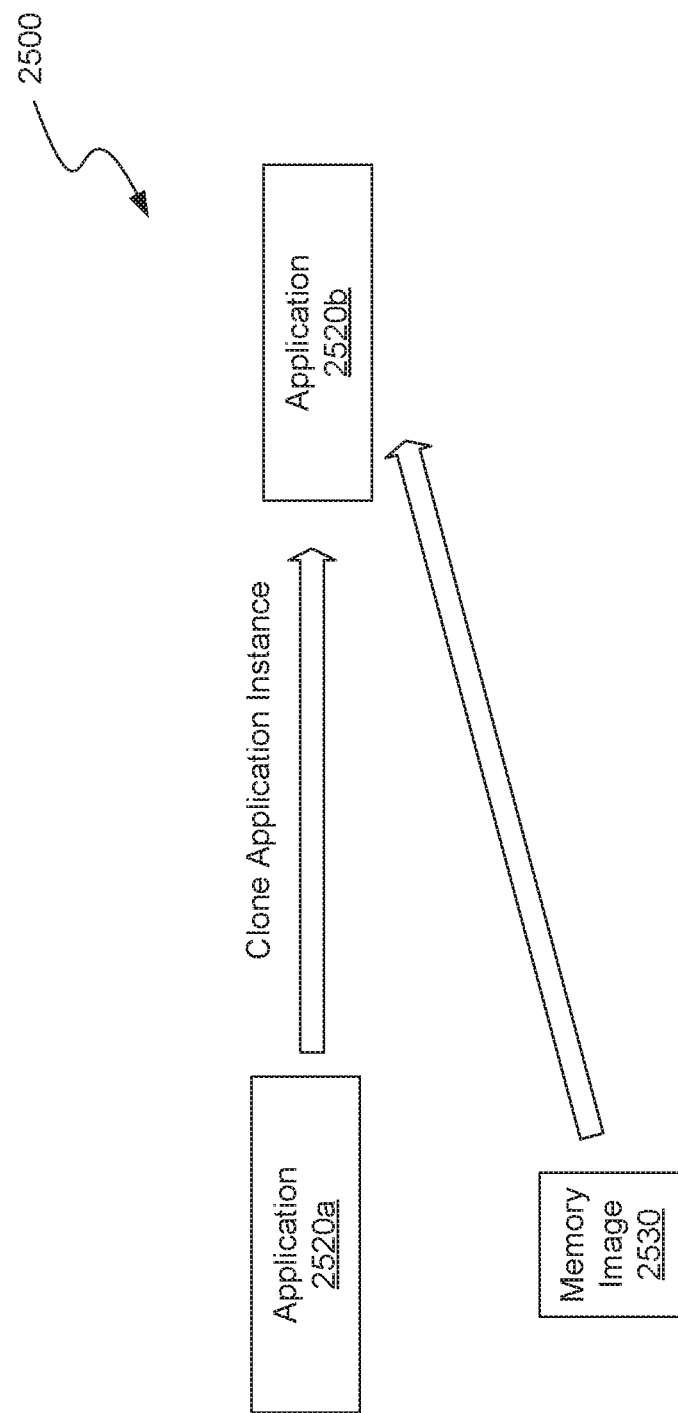
FIG. 25 shows a diagram that illustrates the use of a memory image to clone an application instance.

FIG. 25 shows a diagram 2500 that illustrates an example process for cloning an application instance. A clone operation may be similar to a restore operation except that certain external resources (e.g., writable files, client connection ports, etc.) need to be changed so as to not conflict with the original application instances.

As shown in FIG. 25, an original application instance 2520a can be cloned to create a clone application instance 2520b. The clone instance 2520b may be created to, for example, scale out appropriate workloads or to facilitate parallel testing and/or debugging of the application. In any case, the clone instance 2520b may resume/restore execution of an application process based on a memory image 2530 that was captured during execution of the original instance. The memory image 2530 may be captured using any embodiment of the introduced technique described in previous sections or may be captured using existing techniques for capturing memory images.

4.3 Recovering an Application Process

For applications that create a transaction log, it is possible to extend the restore of an image capture point in time to a point in time represented by the end of the log. In other words, the restoration of the application process can be extended beyond the point of image capture to recover a last known transaction state. As used herein, a "transaction log" refers to any record or other information indicative of various operations, tasks, jobs, routines, procedures, etc. (collectively referred to as "transactions") performed by an application as part of executing an application process.

Recovery of an application process to a last known transactions state can be performed by replaying a transaction log. In other words, one or more operations indicated in a transaction log can be re-executed by the application to recover to a last known transaction state (i.e., following execution of a last operation indicated in the transaction log). A general pain point to recover an in-memory database is that replay of an entire transaction log can take a long time. For example, a scenario involving a relatively long transaction log (e.g., including hundreds or thousands of operations) and relatively large amount of data (e.g., involving gigabytes of data) may take several hours to replay completely to a last known transaction state. Embodiments of an introduced technique for recovery can improve recovery times by first using a memory image to restore an application to a point in time when the memory image was captured, then bringing the application to the point before failure (i.e., to a last know transaction state) by replaying a "catch-up" log which contains only the entries from a transaction log created after the image capture was taken.

In some embodiments, the recovery process is application-specific in its details. For example, certain operations such as creation of the catch-up log, formatting of the catch-up log, and replay of the catch-up log may differ slightly between implementations based on the specific configurations and/or requirements of the application. That said, at a high level, the recovery procedure can be generically applied to any application process.

In some embodiments, the recovery process may add little to no processing overhead, and in turn no little to no additional time to a memory image capture process. In other words, the recovery process can be applied without any additional processing at the time of image capture. For example, the recovery process may rely on a log file information such as a log file name and size (which would already be captured as part of the image capture process) so a copy of the failure-point log can be made and truncated to the log's size at image capture time for use by the restored application.

4.3.1 Single Instance Rapid Recovery

Memory images can be captured periodically using the introduced technique for image capture or any existing technique for image capture. When recovery of an application process is required (e.g., due to a crash), the application is first restored to an image capture point in time (e.g., by using the most recent memory image) then a catch-up log from that image capture point in time to the most recent transaction state (e.g., immediately prior to failure) is created and replayed.

Figure 26:
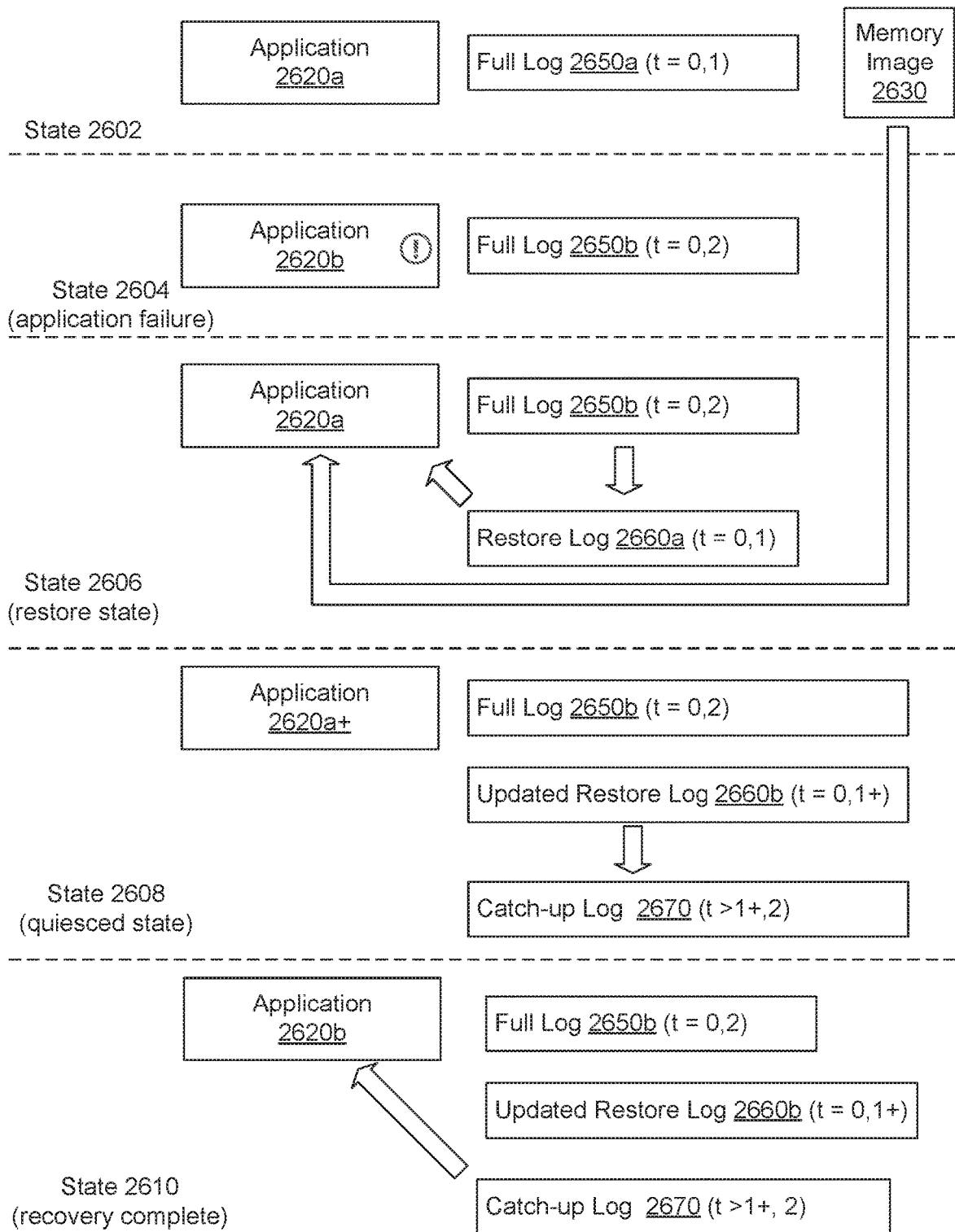
FIG. 26 shows a diagram of a state progression over time that illustrates an example process for single instance rapid recovery.

FIG. 26 shows a diagram of an example state progression over time that illustrates an example process for single instance rapid recovery.

State 2602, at the top of FIG. 26, represents a first state of an application executing an application process. At the first state 2602, the application is at first application state 2620a and is creating, generating, updating, or otherwise maintaining a full transaction log (referred to herein as a "full log") including records indicative of transactions associated with the execution of one or more application processes. At the first state 2602, the full log is at a state 2650a and includes records of transactions from an initial point in time (e.g., time t=0) to a point in time current to the first state 2602 (e.g., time t=1). Further, at the first state 2602, a memory image 2630 is captured that reflects the state of the memory (e.g., the in-memory data associated with an application process) at the first state 2602. Thus, in this example, time t=1 may be referred to an image capture point in time. The memory image 2630 may be captured using the introduced technique for image capture or any existing technique for image capture.

At a later point in time following the first state 2602 (e.g., at time t=2), the application process is interrupted, for example, due to an application failure or some other failure. State 2604 represents a second state of the application following interruption of the application process. As shown at state 2604, the application is now at application state 2620b which is different than application state 2620a, since some number of transactions have been performed since the first state 2604. Similarly, the full log is now at a full log state 2650b which is different than the full log state 2650a since the transactions performed since the first state 2604 are now recorded in the full log. As indicated, the full log state 2650b now includes records of transactions from the initial point in time (e.g., time t=0) to a point in time current to the second state 2604 (e.g., time t=2).

After the interruption of the application process at state 2604 (time t=2), the recovery process is initiated. At state 2606, a restore log is created, generated, or otherwise accessed. The restore log may include records of transactions from the full log up to an image capture point in time. For example, in the scenario depicted in FIG. 26, the restore log is depicted at a restore log state 2660a and include records of transactions from an initial point in time (e.g., time t=0) to a point in time at which the memory image 2630 was captured (e.g., time t=1).

The application can then be restored to its state at the image capture point in time using the memory image 2630 and the restore log 2660a, for example, as described with respect to FIG. 23. As shown at state 2606, the application has been restored back to application state 2620a (i.e., as it existed at state 2602). Thus state 2606 may be referred to as a restore point in time. Notably, any transactions that were executed in the intervening time between state 2602 and 2606 will not be reflected in the application at state 2606. In other words, the restored application at application state 2620a will differ from the application state 2620b at the last known transaction state (i.e., state 2604).

The restored application is then allowed to execute to a quiesced state which is reflected at state 2608. In other words, the restored application is allowed to complete execution of any operations that were in-progress and/or in a processing queue at the time memory image was captured. This quiesced state may also be referred to as an updated restore state. Thus, following completion of the additional operations to quiesce, the application is at application state 2620a+(indicating slightly beyond state 2620a) and the restore log is updated to include a record of the additional operations. For example, as shown in FIG. 26, the restore log is updated to state 2660b and now includes records of transactions from an initial point in time (e.g., time t=0) to quiesced state following the point in time at which the memory image 2630 was captured (indicated here as time t=1+).

Further, at state 2608, a catch-up log 2670 is created, generated, or otherwise accessed. The catch-up log may include records of transactions from the full log that are beyond the updated restore point. Thus, the catch-up log includes records of transactions from after the quiesced state following the point in time at which the memory image 2630 was captured (indicated here as time t>+1) to a point in time associated with the last known transaction state before the application process was interrupted (e.g., time t=2). In other words, the catch-up log 2670 may include all the records from the full log that are not included in the updated restore log 2660b.

The application can then replay the catch-up log 2670 to recover from the updated restore point (indicated as application state 2620a+) to the last known transaction state (indicated as application state 2620b). Thus, at state 2610, the application is now fully recovered to a last known transaction state before the application process was interrupted (i.e., the same as at state 2604).

Figure 27:
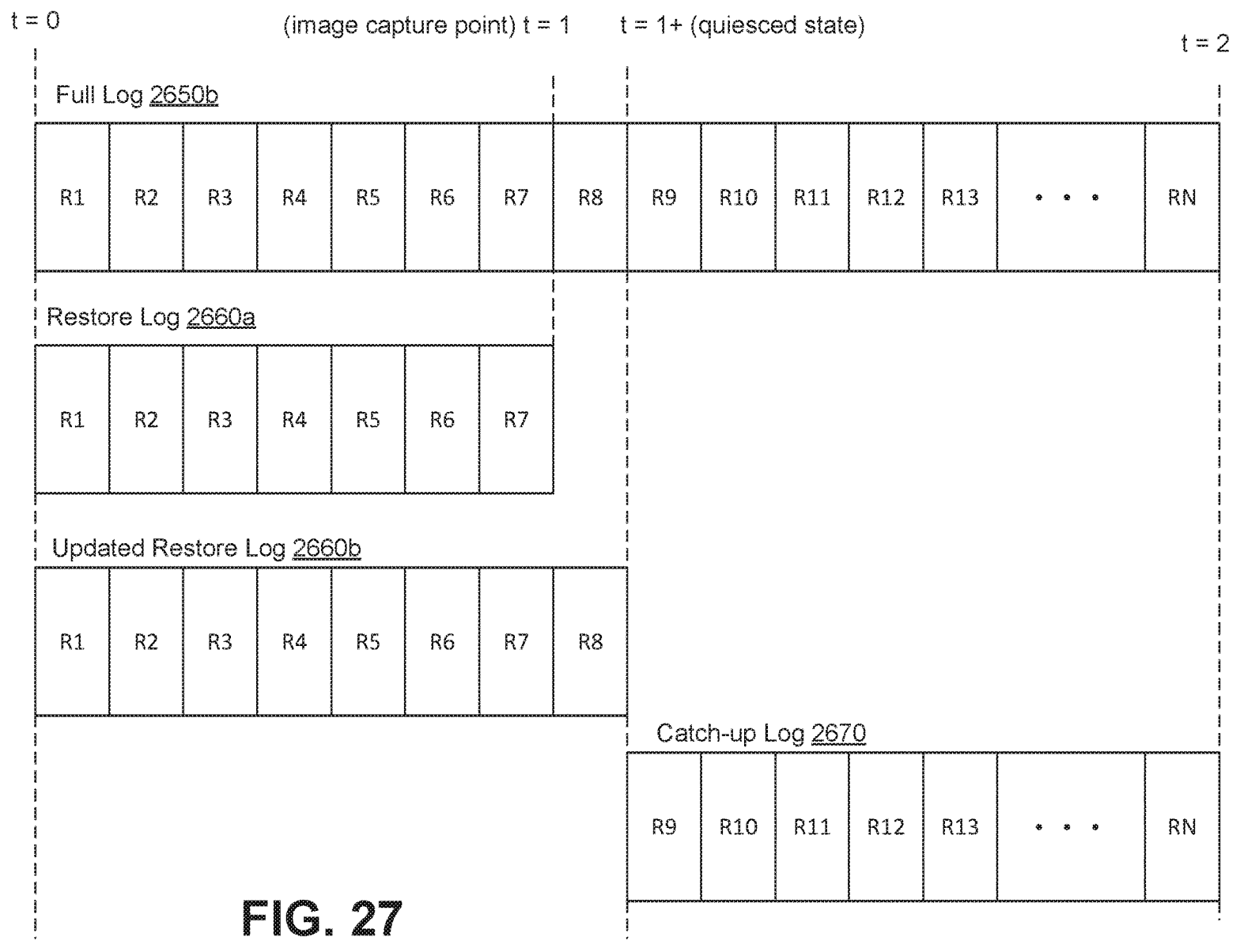

FIG. 27 shows a diagram of various example transaction logs associated with a recovery process, according to an embodiment of the introduced technique. Specifically, FIG. 27 depicts diagrammatic representations of a full log 2650b, a restore log 2660a, an updated restore log 2660b, and a catch-up log 2670 that are referenced in FIG. 26.

As shown in FIG. 27, the full log 2650b includes multiple transaction records R1 through RN that span various times from an initial time (e.g., t=0) to a current time (e.g., t=2). The full log 2650b is depicted in FIG. 27 as a sequenced listing of records R1 through RN for illustrative clarity; however, the actual configuration of the full log will differ depending on how the application is configured. Further, the full log 2650b may be implemented using a single data structure such as a single log file or may be implemented using multiple data structures. In some embodiments, applications may implement more complicated log schemes such as log segmentation and/or rotation which may involve renaming and/or moving various log files associated with a full log. Further, the full log 2650b depicted in FIG. 27 represents a snapshot of a full log at a particular state of execution of an application process at time t=2. As time progresses past time t=2, additional records may be added to the full log that reflect any additional transactions performed.

As previously discussed with respect to FIG. 26, the restore log 2660a includes only the records from the full log 2650b from an initial time (e.g., time t=0) up to an image capture point in time (e.g., time t=1). For example, as depicted in FIG. 27, the restore log includes records R1 through R7. In some embodiments, the restore log 2660a may be created after initiating a recovery process by first making a copy of the full log 2250b and truncating that copy of the full log at an earlier image capture point in time. Alternatively, the restore log 2260a may be created at the time of image capture by simply copying the full log as it exists at that time. Alternatively, the restore log 2260a may be created at any time by creating a new log file and copying individual records from the full log 2250b (up to a time of image capture) into the new log file. These are just examples of how to create a restore log 2260a and are not to be construed as limiting.

In some embodiments, the restore log 2260a may be updated after allowing a restored application to continue execution to a quiesced state. For example, the depiction of the updated restore log 2260b in FIG. 27 includes records R1 through R8. In this example, record R8 may be indicative of an operation that was in process or in a queue at the time of image capture and that was subsequently executed by the restored application as part of execution to a quiesced state. In some embodiments, the updated restore log 2660b may be created by updating the previously created restore log 2660a. For example, the updated restore log 2660b may be created by appending one or more new records (e.g., record R8) to the restore log 2660a in response to the restored application executing to a quiesced state.

As previously discussed with respect to FIG. 26, the catch-up log 2670 the catch-up log includes records of transactions from after the quiesced state (e.g., after time t=1+) up to a last known transaction state before the application process was interrupted (e.g., time t=2). In other words, the catch-up log 2670 may include all the records from the full log that are not included in the updated restore log 2660b. In the example depicted in FIG. 27, the catch-up log 2670 includes records R9 through RN. Alternatively, the catch-up log 2670 can be created by creating a new log file and copying individual records from the full log 2650b (that are not included in the updated restore log 2660b) into the new log file. These are just examples of how to create a catch-up log 2670 and are not to be construed as limiting.

Figure 28:
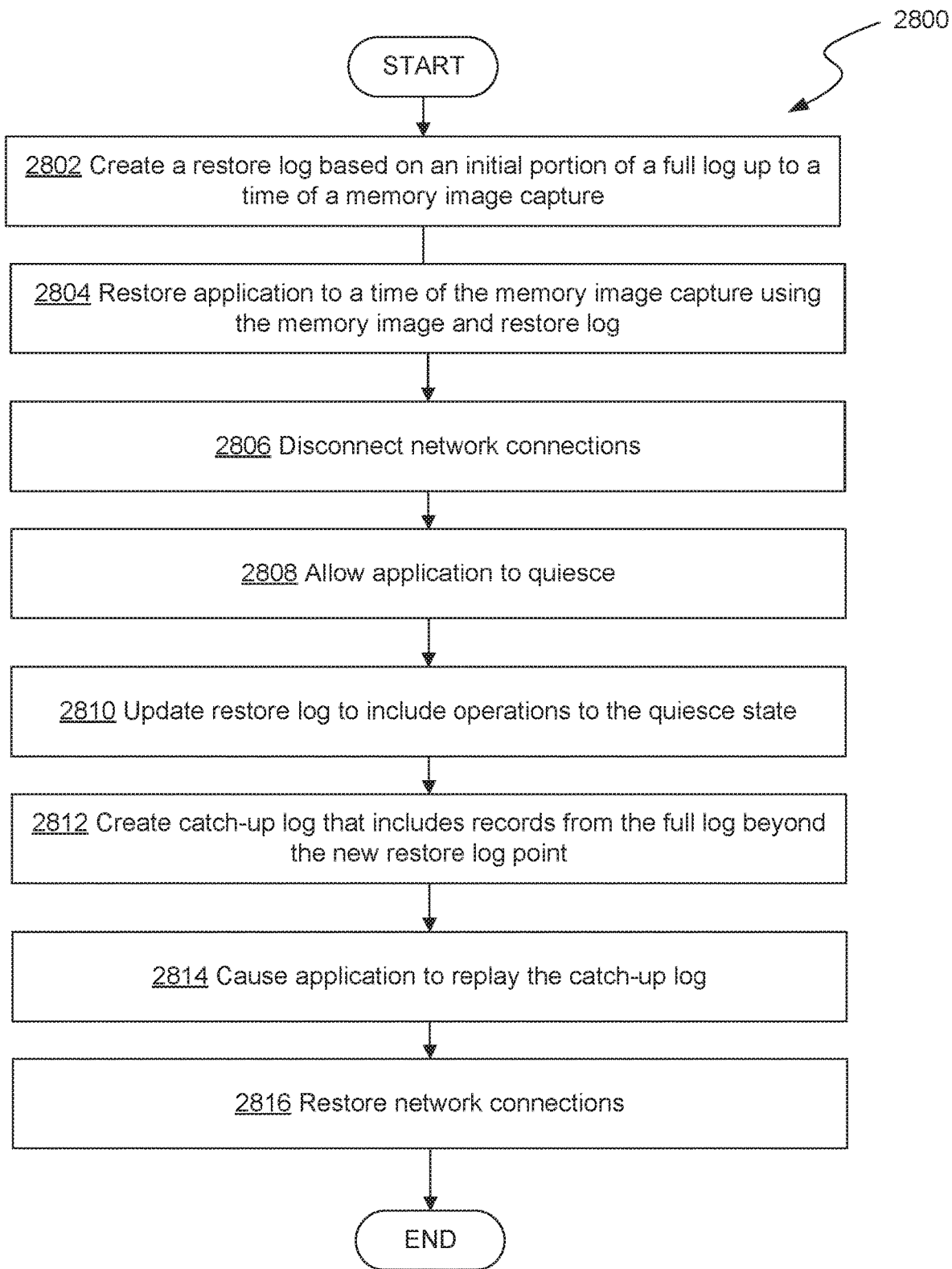
FIG. 28 shows a flow diagram of example process for single instance recovery of an application process.

FIG. 28 shows a flow diagram of example process 2800 for single instance recovery of an application process, according to an embodiment of the introduced technique.

Figure 42:
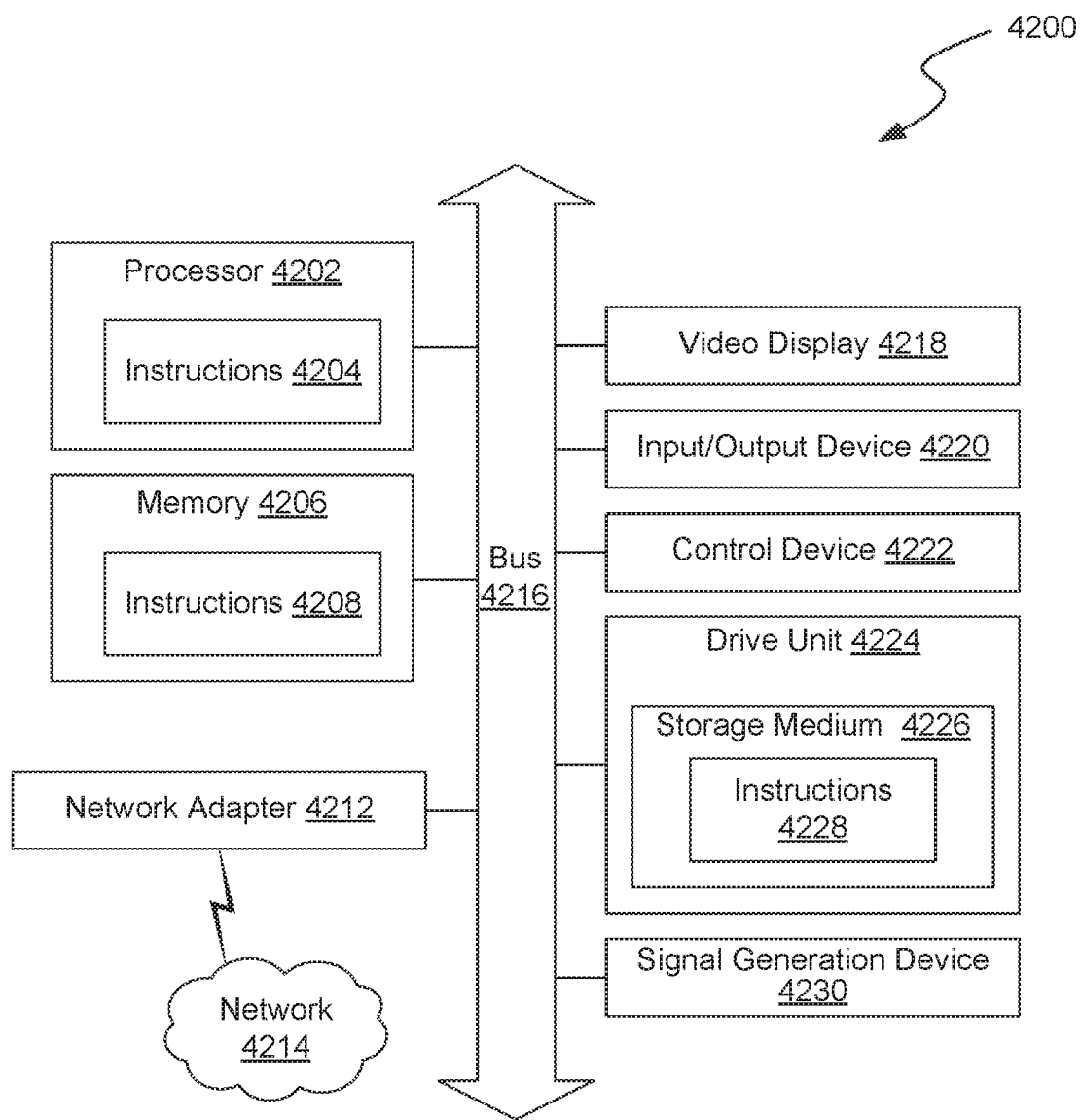
FIG. 42 shows a block diagram that illustrates an example computer processing system in which at least some operations associated with the introduced technique can be implemented.

Example process 2800 can be executed by one or more of the components of a computer system such as the example processing system 4200 described with respect to FIG. 42. For example, in some embodiments, example process 2800 may be represented in instructions stored in memory that are then executed by a processor. Alternatively, or in addition, certain operations associated with example process 2800 may be implemented in hardware such as a memory controller. In this context, a memory controller may include one or more digital circuits. The digital circuitry of the memory controller may include programmable circuitry such FPGAs, PLDs, etc., special-purpose hardwired (i.e., non-programmable) circuitry such as ASICs, or a combination of such forms, that are programmed or otherwise configured to perform one or more memory management operations. Such a memory controller may be a standalone memory controller or may be integrated into another component such as CPU or a memory module (e.g., an NVDIMM). The process 2800 described with respect to FIG. 28 is an example provided for illustrative purposes and is not to be construed as limiting. Other processes may include more or fewer operations than depicted, while remaining within the scope of the present disclosure. Further, the operations depicted in example process 2800 may be performed in a different order than is shown.

Example process 2800 begins at operation 2802 with creating, generating, or otherwise accessing a restore log associated with an application process. The restore log may be based on a full transaction log that is maintained by the application process. Specifically, the restore log may include an initial portion of the full log up to a time at which a memory image was captured during execution of the application process. That is the restore log may include records from the full log that are indicative of transactions performed during execution of the application process up to a point in time that a memory image was captured.

In some embodiments, the memory image is a most recently captured memory image from among multiple memory images periodically captured during execution of the application process. In such cases, operation 2802 may include searching a database of memory images associated with the application to identify a memory image that matches a search criterion (e.g., latest timestamp).

In some embodiments, operation 2802 includes generating a copy of the full log at or after the application process was interrupted (e.g., due to an application failure) and truncating the copy of the full log. In some embodiments, operation 2802 includes copying the full log at the time a memory image is captured (e.g., as part of a memory image capture process) and storing the copy of the full log from that time as the restore log. In such an embodiment, the original copy of the full log is continually updated with new records as execution of the application process continues after capture of the memory image. In some embodiments, operation 2802 includes creating a new log file and copying a subset of the records from the full log (e.g., those reflecting transactions up to an image capture point) into the new log file.

Example process 2800 continues at operation 2804 with restoring the application to a restore state that corresponding to the time at with the memory image was captured. In some embodiments, the application is restored using the memory image and/or the restore log accessed at operation 2802.

Example process 2800 continues at operation 2806 with isolating the restored application by disconnecting any of its associated network connections. Operation 2806 may be performed to prevent clients from accessing the restored application until the recovery process is completed.

Example process 2800 continues at operation 2808 with allowing the restored application to quiesce. In some embodiments, operations 2808 may include allowing the restored application to complete execution of any application operations that were in-progress and/or in a processing queue at the time the memory image was captured.

In some embodiments, the application may be configured to continue execution to the quiesced state, in which case operation 2808 may be a passive operation (i.e., no active step is taken). Alternatively, operation 2808 may include taking an action to cause the restored application to execute to a quiesced state, for example, by communicating a request or other signal to the restored application.

Example process 2800 continues at operation 2810 with updating the restore log (accessed at operation 2802) with information indicative of the operations performed by the application as part of the execution by the application to the quiesced state. For example, operation 2810 may include appending one or more records to the previously accessed or generated restore log. In some embodiments, operation 2810 (i.e., updating the restore log) is performed by the application as part of its execution to quiescence.

Example process 2800 continues at operation 2812 with creating, generating, or otherwise accessing a catch-up log. The catch-up log includes records of transactions from after the quiesced state up to a last known transaction state before the application process was interrupted. In other words, the catch-up log may include all the records from the full log that are not included in the updated restore log (generated at operation 2010). In some embodiments, operation 2812 includes creating a new log file and copying individual records from the full log (that are not included in the updated restore log) into the new log file.

Example process 2800 continues at operation 2814 with causing the restored application to replay the catch-up log. In other words, after executing to a quiesced state (as a result of operation 2808), the application replays the catch-up log by executing, in order, each operation, job, task, etc. that is indicated in the catch-up log. Thus, as a result of operation 2814, the application is recovered to a last known transaction state indicated in the full log.

In some embodiments, the updated restore log (from operation 2810) continues to be updated as the application replays the catch-up log. Thus, when replay is complete, the updated restore log should match the full log.

Example process 2800 concludes at operation 2816 with restoring the network connections that were disconnected at operation 2806 to enable clients to again access the application. Thus, as a result of operation 2816, the recovery of the application to its last known transaction state is complete and clients can continue to access the application from this recovered state.

The operations associated with example process 2800 may be repeated each time a recovery is performed. For example, after successfully recovering from a first failure at a first time, an application may experience a second failure at a second time. In such as case, one or more of the operations associated with example process 2800 may be performed again. This may include creating, generating, or otherwise accessing a second restore log, catch-up log, etc.

4.3.2 Mitigating the Impact of Memory Image Capture

As previously discussed, capturing a memory image typically includes freezing or otherwise suspending execution of an application process. While the introduced technique for capturing memory images can reduce this time (e.g., to as little as hundreds of milliseconds), this delay may still negatively impact certain applications. To further mitigate the impact of image capture on a primary application instance, the image capture process can be offloaded to a replica of an application instances. In other words, the delay impact due to image capture can be shifted away from a primary application instance to a replica application instance. In some embodiments, primary application instance may support the creation of a replica application instance by asynchronously shipping log entries (e.g., from a full transaction log) to the replica application instance which then replays the log entries to thereby follow execution behind the state of the primary application instance. Once the replica application instance is established, periodic memory image capture can be performed on the replica application instance. After a memory image is captured, the memory image may optionally be copied to one or more servers that are pre-positioned for rapid restoration of the primary application instance, if needed.

Figure 29:
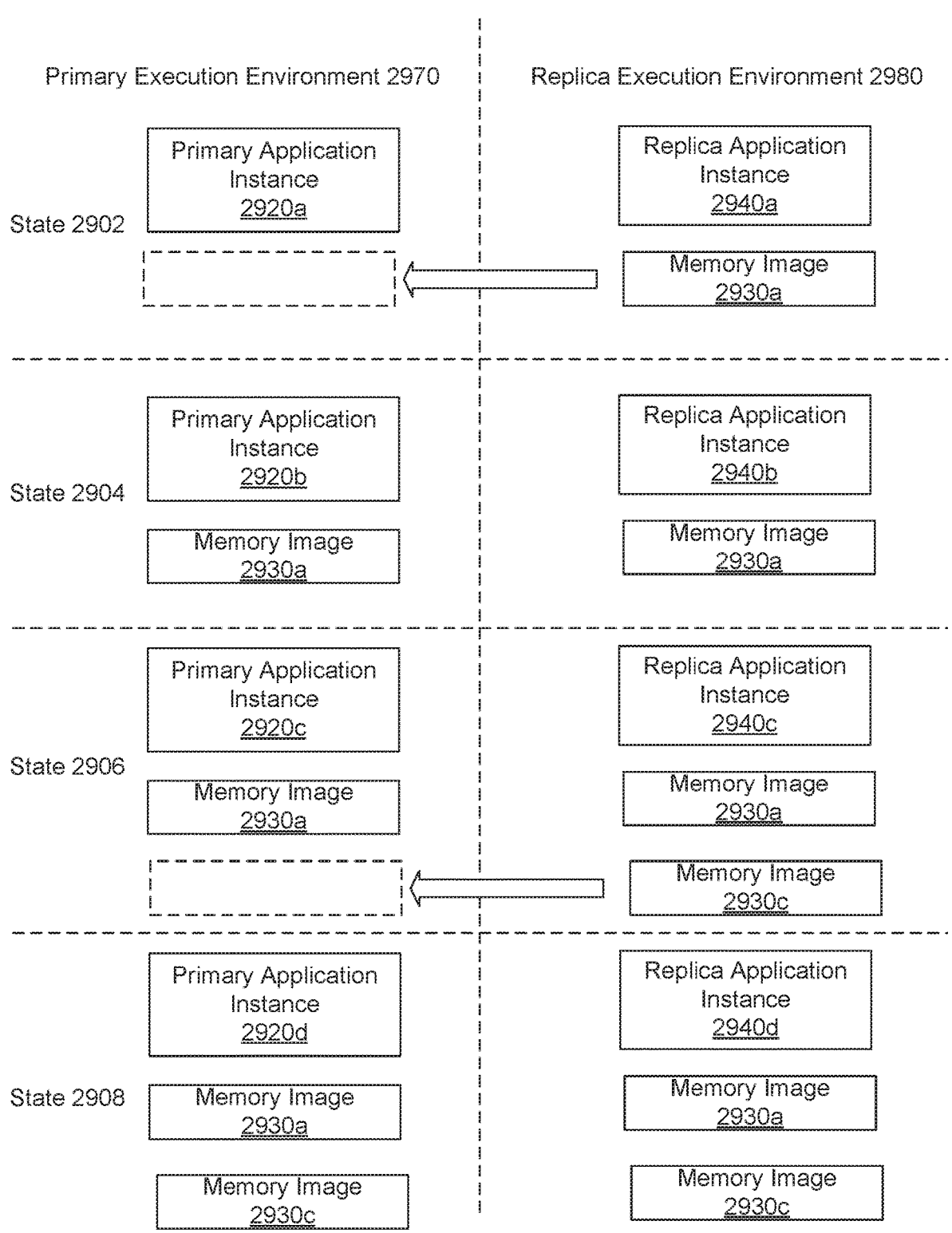
FIG. 29 shows a diagram of a state progression over time that illustrates an example process for offloading memory image capture to a replica application instance.

FIG. 29 shows a diagram of an example state progression over time that illustrates an example process for offloading memory image capture to a replica application instance. As shown in FIG. 29, a replica application instance can be created based on a primary application instance. The primary application instance executes in a primary execution environment and may provide log entries (e.g., from a full transaction log) to the replica application instance executing in a replica execution environment 2980. The log entries from the primary application instance enable the replica application instance to perform the same transactions as the primary application instance thereby causing the replica application instance to asynchronously follow the state of the primary application instance. For example, as the example process progresses through states 2902, 2904, 2906, and 2908, the primary application instance may progress through states 2920*a*, 2920*b*, 2920*c*, and 2920*d* and the replica application instance may progress through states 2940*a*, 2940*b*, 2940*c*, and 2940*d* (respectively). Note, since the replica application instance is following behind the primary application instance, corresponding states may be different than each other. For example, at a first process state 2902, the first primary application state 2920*a* may be different than the first replica application state 2940*a*.

The two execution environments 2970 and 2980 may represent two different physical machines (e.g., connected via a network), may represent two different virtual machines instantiated at one or more physical machines, may represent two different modules in a single machine, or may represent any other physical or logical separation of execution environments.

At state 2902, a memory image 2930*a* is captured based on the state of the in-memory data associated with the replica application instance. In other words, the memory image 2930*a* may reflect the state of the in-memory data at replica application state 2940*a*. The memory image 2930*a* may be captured using the introduced technique for image capture or any existing technique for image capture.

This memory image 2930*a* can be pre-positioned for rapid restoration of the primary application instance, for example, by transferring a copy of the memory image 2930*a* from the replica execution environment 2980 into the primary execution environment 2970, as reflected in the second state 2904. Note that in the second state 2904, the primary application instance has progressed to a second primary application state 2920*b* and the replica application instance has progressed to a second replica application state 2940*b*.

As both the primary application instance and replica application instance progress in their separate execution, additional memory images may be captured (e.g., periodically). For example, as shown at a third state 2906, a second memory image 2930c has been captured based on a later state of the in-memory data associated with the replica application instance. In other words, the second memory image 2930c may reflect the state of the in-memory data at replica application state 2940c.

The second memory image 2930c can also be pre-positioned for rapid restoration of the primary application instance, for example, by transferring a copy of the second memory image 2930c from the replica execution environment 2980 into the primary execution environment 2970, as reflected in the fourth state 2908.

The example process depicted in FIG. 29 can continue as additional memory images are captured in the replica execution environment 2980 and prepositioned in the primary execution environment 2970 for rapid restoration of the primary application instance. As such, any impact due to the image capture is placed on the replica application instance which thereby alleviating any impact on the primary application instance. Since the replica application instance is following the execution of the primary application instance, the captured memory images are usable by the primary application instance for any use including restore and/or recovery. Note, although FIG. 29 only depicts image capture being performed in the replica application environment 2980, this is not to be construed as limiting. In some embodiments, memory images may also be captured in the primary execution environment 2970 based on execution of the primary application instance.

Figure 30:
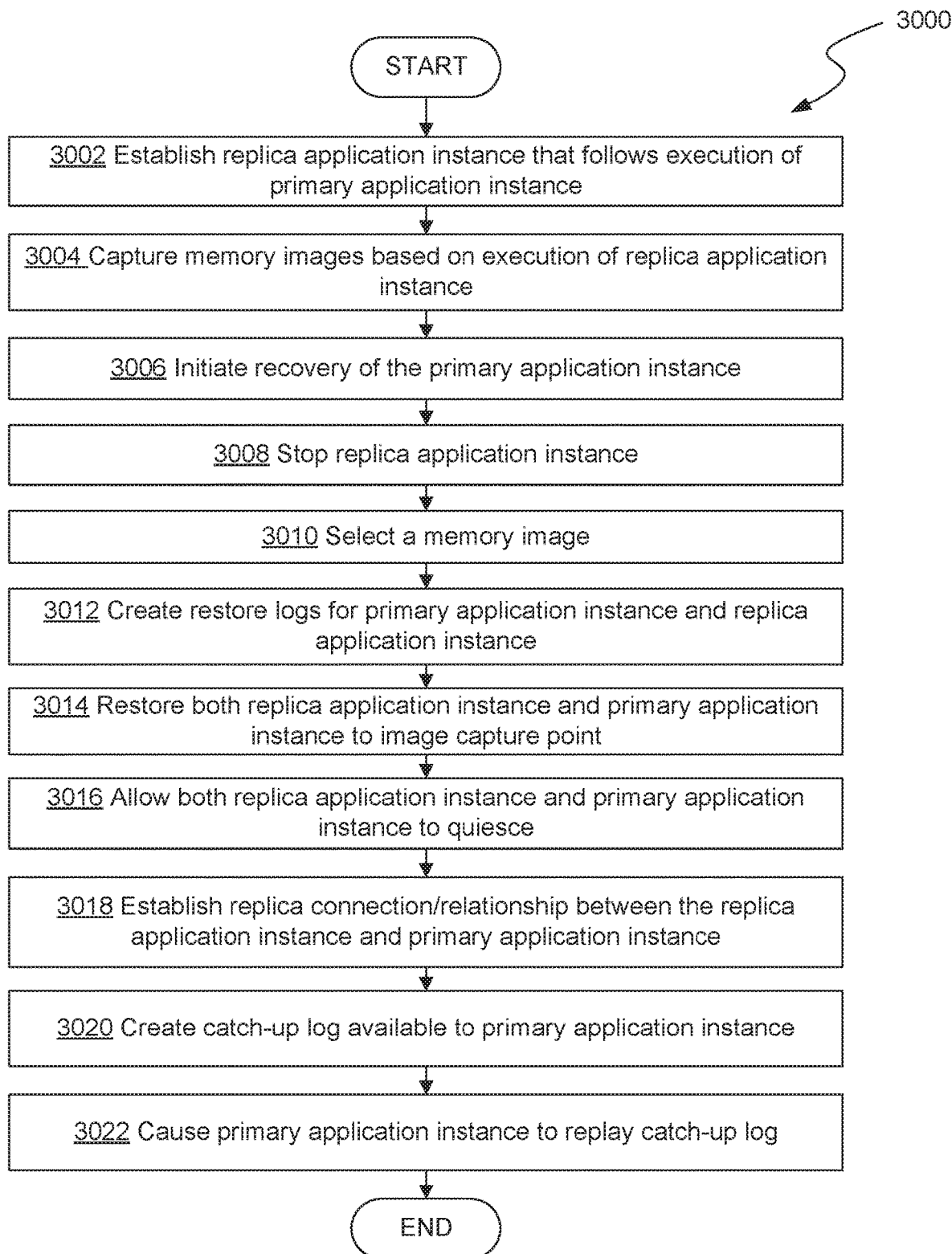
FIG. 30 shows a flow diagram of example process for recovering a primary application instance using a memory image captured based on a replica application instance.

FIG. 30 shows a flow diagram of example process 3000 for recovering a primary application instance using a memory image captured based on a replica application instance. Example process 3000 can be executed by one or more of the components of a computer system such as the example processing system 4200 described with respect to FIG. 42. For example, in some embodiments, example process 3000 may be represented in instructions stored in memory that are then executed by a processor. Alternatively, or in addition, certain operations associated with example process 3000 may be implemented in hardware such as a memory controller. In this context, a memory controller may include one or more digital circuits. The digital circuitry of the memory controller may include programmable circuitry such FPGAs, PLDs, etc., special-purpose hardwired (i.e., non-programmable) circuitry such as ASICs, or a combination of such forms, that are programmed or otherwise configured to perform one or more memory management operations. Such a memory controller may be a standalone memory controller or may be integrated into another component such as CPU or a memory module (e.g., an NVDIMM). The process 3000 described with respect to FIG. 30 is an example provided for illustrative purposes and is not to be construed as limiting. Other processes may include more or fewer operations than depicted, while remaining within the scope of the present disclosure. Further, the operations depicted in example process 3000 may be performed in a different order than is shown.

Example process 3000 begins at operation 3002 with establishing or casing the establishment of a replica application instance that follows execution of a primary application instance. In some embodiments, operation 3002 may include causing a primary application instance to establish the replica application instance. The replica application instance may be established in a replica execution environment that is physically and/or logically separated from a primary execution environment in which the primary application instance. The primary application instance and replica application instance may be configured such that the primary application instance asynchronously follow the execution of the primary application instance. For example, operation 3002 may include causing the primary application instance to transmit, communicate, or otherwise enable access to transaction log entries to the replica application instance. The transaction log entries may be part of a full log that is maintained and continually updated by the primary application instance as it executes and application process.

Example process 3000 continues at operation 3004 with capturing a memory image based on the execution, by the replica application instance, of the application process. That is the memory image captured at operation 3004 is indicative of a state of the in-memory data associated with the replica instance. The memory image may be captured using the introduced technique for image capture or any existing technique for image capture.

In some embodiments, operation 3004 may additionally pre-positioning the captured memory image for rapid restoration of the primary application instance, for example, by transferring a copy of the captured memory image from the replica execution environment into the primary execution environment where the primary application instance is executing. In some embodiments, the memory image may be pre-positioned immediately in response to capture. In other embodiments, batches of one or more memory images may be pre-positioned at regular or irregular intervals (e.g., according to a specified schedule).

Example process 3000 continues at operation 3006 with initiating recovery of the primary application instance. In some embodiments, recovery is necessary due to a failure by the primary application instance (e.g., crash) and/or some other failure associated with the primary execution environment (e.g., power loss). Accordingly, in some embodiments, operation 3006 may include determining that recovery is necessary, for example, by detecting a failure associated with the primary application instance. In some embodiments, operation 3006 may be performed in response to a request to perform a recovery. Such a request may be in the form of a message or other communication from the primary application instance.

Example process 3000 continues at operation 3008 with stopping execution of the replica application instance. For example, operation 3008 may include transmitting a signal to the replica application instance that causes the replica application instance to suspend execution.

Example process 3000 continues at operation 3010 with selecting a memory image capture point. For example, as described with respect to FIG. 29, multiple memory images may be captured during execution of an application process by the replica application instance. Accordingly, operation 3010 may include selecting a memory image from a database of multiple memory images to use in the recovery process. The selected memory image may be a latest (i.e., most recent) memory image. In some embodiments, the selected memory image is the most recent memory image that resides in both the primary execution environment and the replica execution environment.

Example process 3000 continues at operation 3012 with creating restore logs for the primary application instance and/or the replica application instance, for example, as described with respect to FIGS. 26-28. In some embodiments, operation 3012 may include creating a restore log for one of the instances (e.g., the primary application instance), and copying that restore log for use by the other instance (e.g., the replica instance). Since the primary application instance is maintaining the full log, operation 3012 may include creating the restore log in the primary execution environment based on the full log and copying that restore log into the replica execution environment.

Example process 3000 continues at operation 3014 with restoring both the primary application instance and the replica application instance to an image capture point of the selected memory image. For example, using the memory image and/or a restore log, the primary application instance and replica application instance can be restored to a point in time that the memory image was captured as described with respect to FIGS. 26-28.

Example process 3000 continues at operation 3016 with allowing both the primary application instance and the replica application instance to quiesce, for example, as described with respect to FIGS. 26-28. Further, although not depicted in FIG. 30, the restore logs of both the primary application instance and replica application instance may be updated based on any additional operations performed as the applications executed to a quiesced state.

Example process 3000 continues at operation 3018 with establishing a replica connection/relationship between the replica application instance and the primary application instance. Establishing such a connection/relationship may be needed where the primary application instance is responsible for communicating log entries to the replica application instance. In other words, establishing the connection/relationship informs the primary application instance that it should perform such functionality and provides any information necessary to perform such functionality. In an example embodiment, operation 3018 may include providing an identifier (e.g., a network address) associated with the replica application instance to the primary application instance to enable the primary application instance to communicate log entries to the replica application instance.

Example process 3000 continues at operation 3020 with creating a catch-up log and making that catch-up log available to the primary application instance, for example, as described with respect to FIGS. 26-28.

Example process 3000 concludes at operation 3022 with causing the primary application instance to replay the catch-up log, for example, as described with respect to FIGS. 26-28. As a result of replaying the catch-up log, the primary application instance will be recovered to a last known transaction state. Further, any changes made based on the replay of the catch-up log will propagate to the replica application instance as log entries are made available to the replica application instance.

Following operation 3022, the primary application instance is fully recovered to the last known transaction state. Accordingly, any network connections can be reestablished to enable client access to the primary application instance. As execution progresses after recovery, the process of image capture in the replica execution environment can continue, for example, as described with respect to FIG. 29.

4.3.3 Periodic Catch-Up for Replica Creation

In some embodiments, rather than rely on an application's mechanism of creating a replica (which may in itself impact the performance of the primary application instance), the replica application instance may be produced by periodically creating a catch-up log of all new records in the primary application instance's full log and replaying the catch-up log at the replica application instance. In such an embodiment, the primary application instance may be totally unaware and uninvolved in this process. In some embodiments, the period may be the same as the image capture interval (e.g., create catch-up log, replay catch-up log on replica application instance, capture memory image based on replica application instance), or some integer sub-multiple (N) of the capture interval (e.g., N*[create and replay catch-up log], then image capture) in order to reduce the time-lag between the state of the memory image and the primary application instance.

Figure 31:
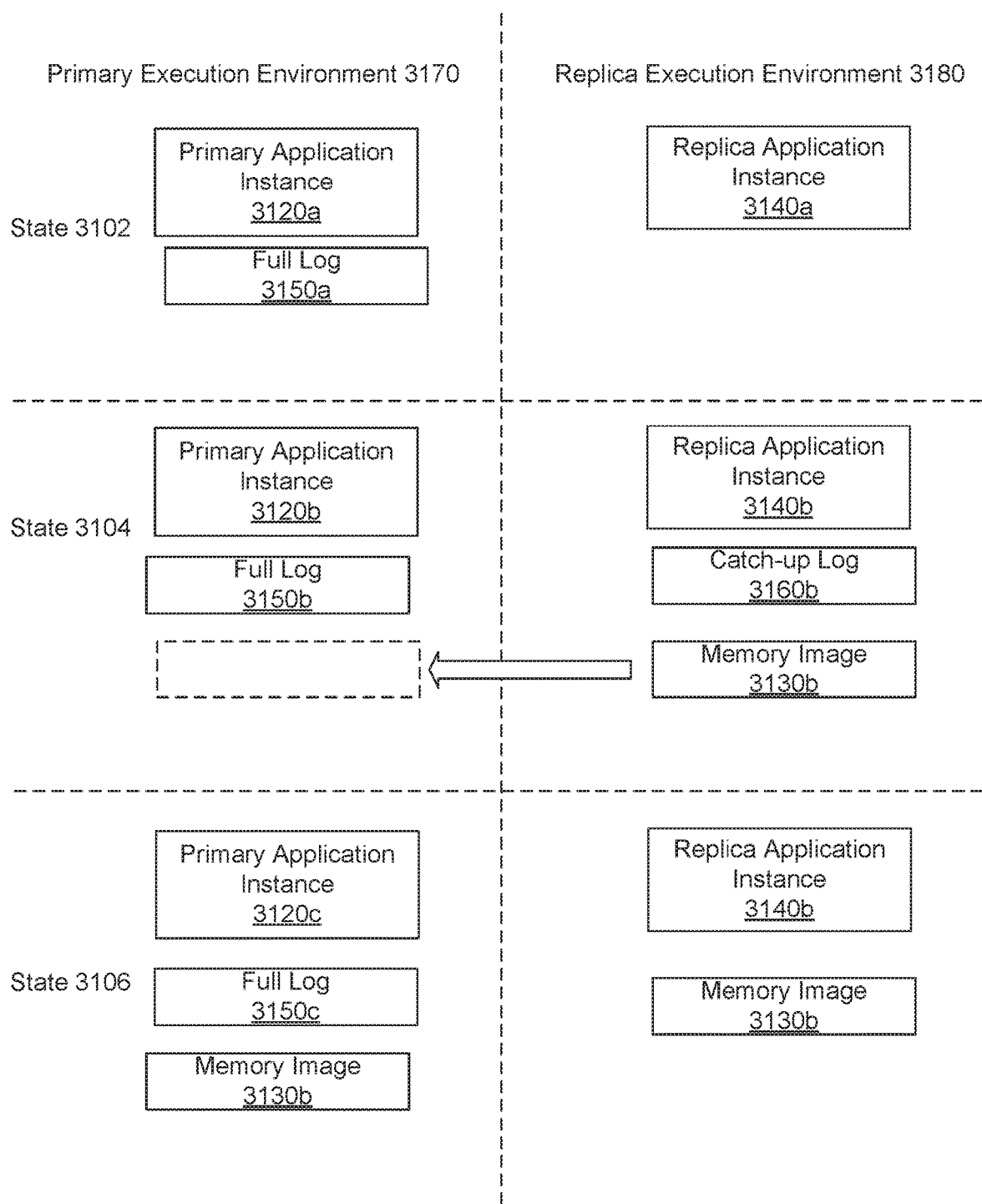
FIG. 31 shows a diagram of an example state progression over time that illustrates an example process for periodic catch-up for replica creation.

FIG. 31 is a diagram of an example state progression over time that illustrates an example process for periodic catch-up for replica creation. As shown in FIG. 31, a primary application instance can execute in a primary execution environment 3170 and a replica application instance can execute in a replica application environment 3180, for example, similar to as described with respect to FIG. 29. In contrast with the scenario depicted in FIG. 29, the replica application instance in replica execution environment 3180 may be periodically created and recreated based on catch-up logs based on the execution of the primary application instance in the primary execution environment.

State 3102 shows a first state 3102 in which the primary application instance is executing (see primary application state 3120*a*) and a replica application instance is executing (see replica application state 3140*a*). Note, since the replica application instance is following behind the primary application instance, corresponding states may be different than each other. For example, at a first process state 3102, the first primary application state 3120*a* may be different than the first replica application state 3140*a*.

The primary application instance may create, generate, update, or otherwise maintain a full log (e.g., as described with respect to FIGS. 26-28). As the example process progresses through states 3102, 3104, and 3106, the primary application instance may progress through states 3120*a*, 3120*b*, and 3120*c* (respectively). Similarly, the full log associated with the primary application instance may progress through states 3150*a*, 3150*b*, and 3150*c* (respectively).

At state 3104, a catch-up log is created based on the full log of the primary application instance and is made available to the replica application instance. For example, as shown in FIG. 31, a catch-up log 3160*b* is created based on the state of the full log 3150*b* when the primary application instance is at state 3120*b*. The catch-up log may include records from the full log that are beyond a previous restore point, for example, as described with respect to FIGS. 26-28. The replica application instance is then created or updated to a most recent transaction point using the catch-up log 3160*b* (e.g., as indicated by replica application state 3140*b*). In the example of FIG. 31, the previous replica application state 3140 may be updated to state 3140*b* by replaying the catch-up log 3160*b*.

In some embodiments, a memory image is captured using the replica application instance at a time that the replica application instance is created and/or updated. For example, FIG. 31 shows a memory image 3130*b* captured at state 3104. In some embodiments, a memory image is captured each time a new catch-up log is created and replayed at the replica application instance. Alternatively, this catch-up process is performed only on some integer sub-multiple (N) of the capture interval (e.g., N*[create and replay catch-up log], then image capture). The memory image is then pre-positioned for rapid restoration of the primary application instance as shown at state 3106 and as previously described with respect to FIG. 29.

The flow depicted in FIG. 31 can be repeated continually during execution of the primary application instance until a recovery of the primary application instance is needed (e.g., due to a crash).

Figure 32:
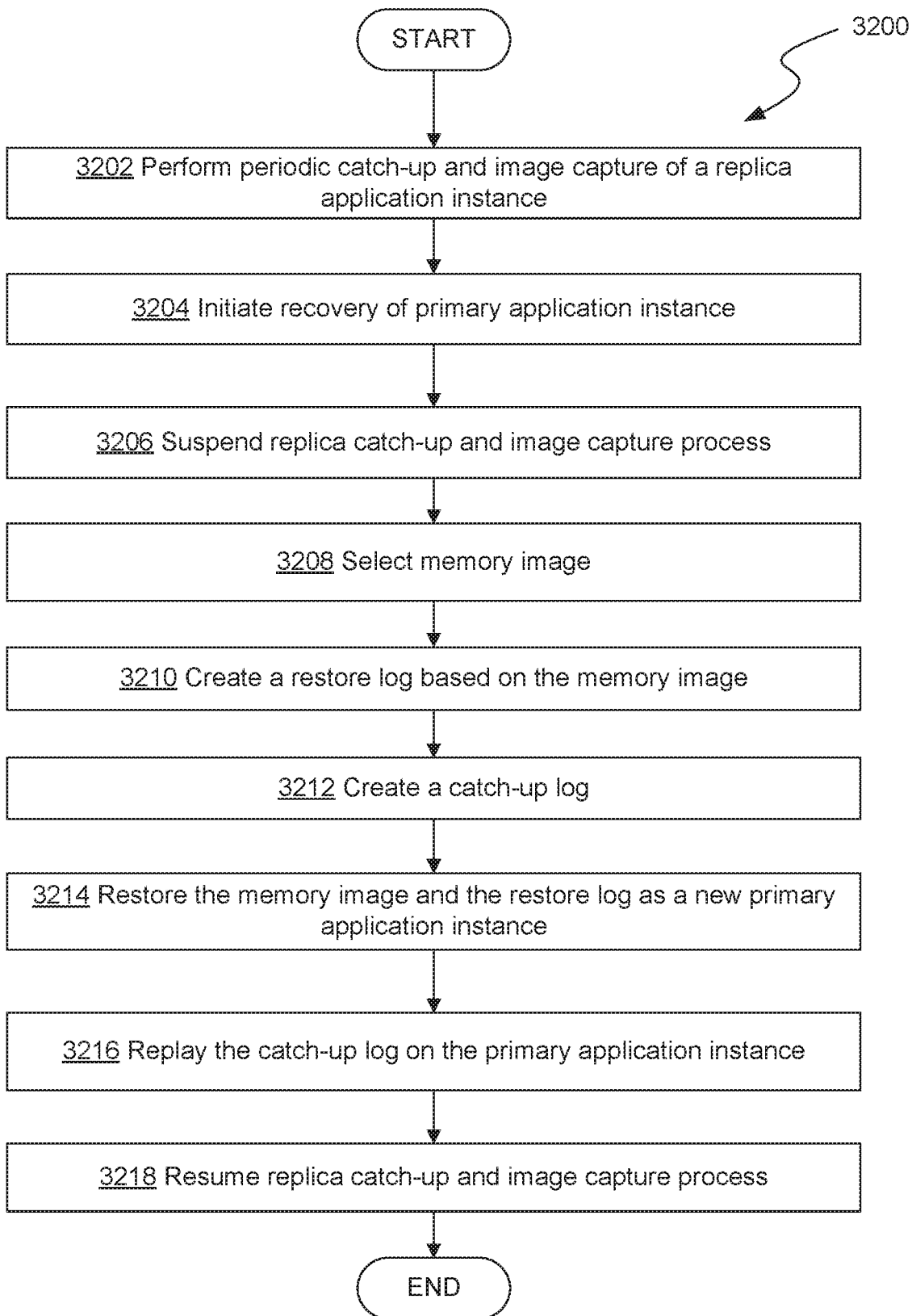
FIG. 32 shows a flow diagram of example process for recovery of a primary application instance based on periodic catch-up for replica creation.

FIG. 32 shows a flow diagram of example process 3200 for recovery of a primary application instance based on periodic catch-up for replica creation. Example process 3200 can be executed by one or more of the components of a computer system such as the example processing system 4200 described with respect to FIG. 42. For example, in some embodiments, example process 3200 may be represented in instructions stored in memory that are then executed by a processor. Alternatively, or in addition, certain operations associated with example process 3200 may be implemented in hardware such as a memory controller. In this context, a memory controller may include one or more digital circuits. The digital circuitry of the memory controller may include programmable circuitry such FPGAs, PLDs, etc., special-purpose hardwired (i.e., non-programmable) circuitry such as ASICs, or a combination of such forms, that are programmed or otherwise configured to perform one or more memory management operations. Such a memory controller may be a standalone memory controller or may be integrated into another component such as CPU or a memory module (e.g., an NVDIMM). The process 3200 described with respect to FIG. 32 is an example provided for illustrative purposes and is not to be construed as limiting. Other processes may include more or fewer operations than depicted, while remaining within the scope of the present disclosure. Further, the operations depicted in example process 3200 may be performed in a different order than is shown.

Example process 3200 begins at operation 3202 with performing periodic catch-up and image capture of a replica application instance, for example, as described with respect to FIG. 31.

Example process 3200 continues at operation 3204 with initiating a recovery of a primary application instance, for example, as described with respect to operation 3006 of example process 3000.

Example process 3200 continues at operation 3206 with suspending the periodic catch-up and image capture of the replica application instance (i.e., suspending operation 3202).

Example process 3200 continues at operation 3208 with selecting a memory image, for example, as described with respect to operation 3010 of example process 3000.

Example process 3200 continues at operation 3210 with creating a restore log based on the memory image selected at operation 3208, for example, as described with respect to FIGS. 26-28. Specifically, the restore log may match the full log size at the selected image capture point.

Example process 3200 continues at operation 3212 with creating a catch-up log based on a full log. Specifically, the catch-up log created at operation 3212 may include records after the restore point up to a last known transaction state.

Example process 3200 continues at operation 3214 with restoring the memory image (selected at operation 3208) and the restore log as a new primary application instance.

Example process 3200 continues at operation 3216 with causing the new primary application instance (restored at operation 3214) to replay the catch-up log (created at operation 3212). This causes the new primary application instance to reach the last known transaction state before the recovery process was initiated.

Example process 3200 concludes at operation 3218 with resuming the replica catch-up and image capture process (i.e., resuming operation 3202).

5. Distributed Memory Object Architecture

In some embodiments, one or more of the introduced techniques can be applied in a distributed system. For example, a DMO system can provide persistent DMOs that can be accessed in either memory mode (i.e., volatile mode) or file-storage mode, and may be implemented in low-latency RDMA. Thus, the DMO system enables use of DMOs both as memory and storage. The DMO system may also enable data in the system to be converted between in-memory and file-storage modes. In general, a DMO system can provide close-to-memory-speed data access which in turn can significantly relieve data bottlenecks observed at upper layer applications. Furthermore, embodiments may be built in user-space, thus obviating the need to install a customized operating system kernel.

A DMO can be accessed in one of the two modes, namely, storage mode and memory mode. In general, storage mode allows a user to perform conventional file and object operations on DMOs. Such operations include open, read, write, close, memory map operations, and directory operations, etc. A DMO in storage mode can be replicated for high availability. Memory mode allows a user to access data using memory semantics such as memory allocation, deallocation, and accessing data using pointer semantics. Therefore, reading from and writing to memory mode objects are achieved via memory load and store semantics.

FIGS. 33-41 show various diagrams that illustrate the structure and operation of an example DMO architecture. The descriptions of the example DMO architecture are provided for illustrative purposes and are not to be construed as limiting. For illustrative simplicity and clarity, various embodiments a DMO architecture are described in the context of physical PMEM media; however, other embodiments may be implemented using other types of memory media including volatile memory such as DRAM. Further, the aforementioned techniques related to memory images (e.g., memory image capture, structure and management of memory images, resume/restore/cloning/recovery of application processes, etc.) need not be implemented in a system configured according to a DMO architecture as described with respect to FIGS. 33-41.

Figure 33:
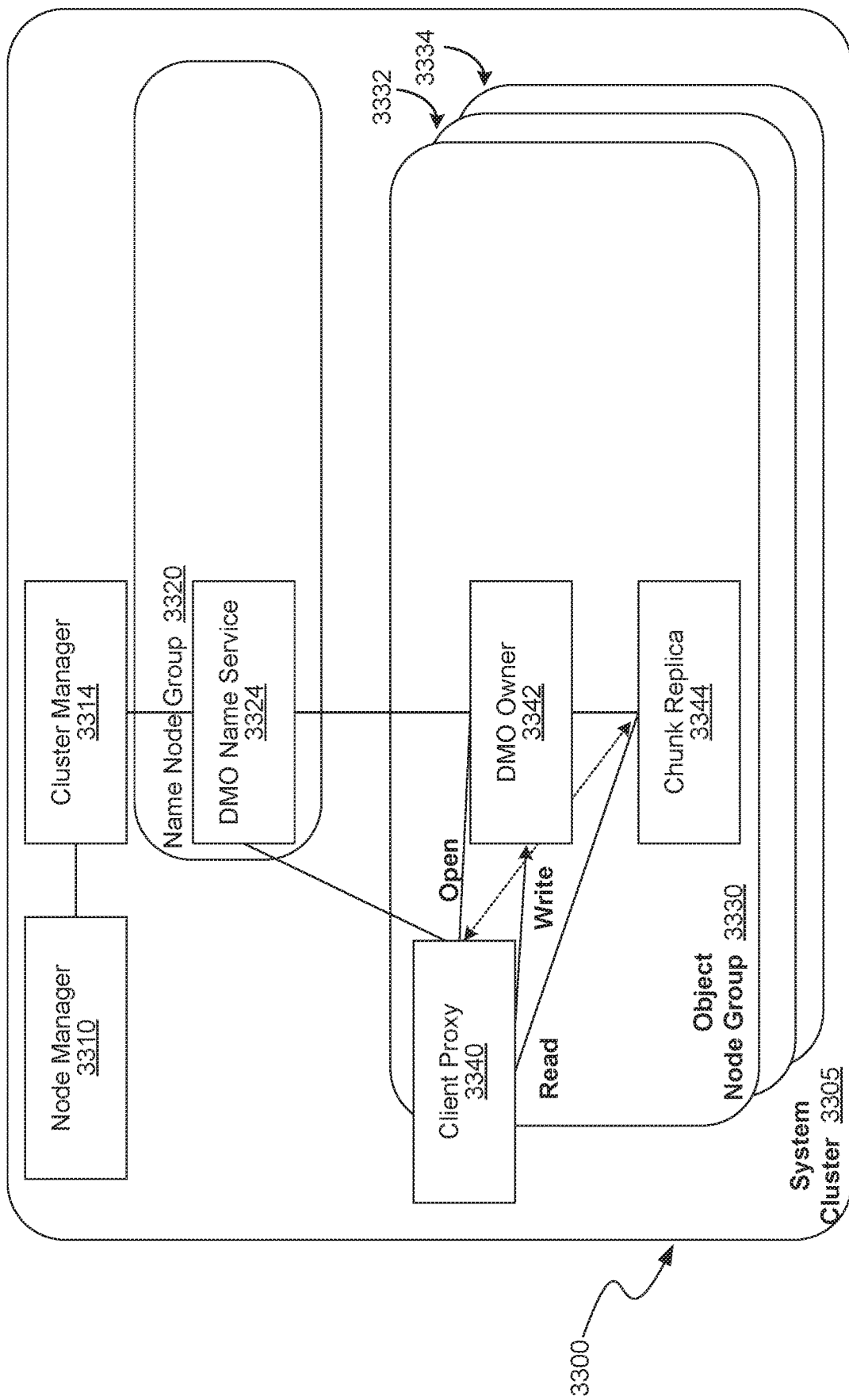
FIG. 33 shows a diagram of an example Distributed Memory Object (DMO) system, in which the introduced technique can be applied.

FIG. 33 shows a diagram of an example DMO system 3300 that provides persistent DMOs that can be accessed in either memory mode or file-storage mode. In the example DMO system 3300, a system cluster 3305 is formed by a number of nodes. Each node in the system cluster 3305 may include a memory, a processor, and a network interface through which the node may send and receive messages and data. The illustrated DMO system 3300 provides for the creation of sharable memory spaces, each space being a DMO with a single owner node such as DMO owner node 3342. In this example, a node that uses a DMO is referred to herein as a client proxy node 3340. In the example embodiment depicted in FIG. 33, a system cluster 3305 within which the DMO system 3300 may be implemented includes an object node group 3330, a name node group 3320, a node manager 3310, and a cluster manager 3314.

Address space for a DMO may be partitioned into equal size chunks, with each chunk being stored on one or more chunk replica nodes 3344 included in the cluster of nodes 3305. The chunks can be distributed among a subset of the cluster nodes in such a manner as to: 1) focus locality of the chunks for performance efficiency, 2) provide sufficient availability of address space, and to 3) balance resources among the cluster of nodes. Furthermore, any node in a cluster using a DMO can locally keep a copy of a page.

The object owner node 3342 is responsible for coordinating updates to the client proxy nodes 3340 as well as the chunk replica nodes 3344. The object owner node 3342 is also responsible for maintaining a configurable replication factor per DMO. The object owner node 3342 and chunk replica nodes 3344 can migrate to deal with failures, performance, or resource constraints. Client proxy nodes 3340 and chunk replica nodes 3344 cooperate with the object owner node 3342 in implementing protocols to make coherent updates and thereby provide a crash consistent view in the face of failures.

A node manager 3310 operates on each node in the DMO system 3300. Once a node manager 3310 starts on a node, it can start or stop all other services associated with a node. Some services associated with a node may be started or stopped automatically or by request. The node manager 3310 is responsible for finding or electing the cluster manager (CM) 3314 and notifying its existence and node health to the cluster manager 3314. Hence, the node manager 3310 has access to performance and exception information from other components in the DMO system 3300.

The cluster manager 3314 runs on a single node in the DMO system 3300. The single node on which the cluster manager 3314 runs may be elected by a consensus algorithm of the node managers 3310. The cluster manager 3314 mediates cluster membership, node ID assignment, and the name service (NS) group 3320. The cluster manager 3314 also chooses nodes to satisfy allocation request constraints against cluster resource loading.

The DMO name service 3324 is a hash-distributed service which provides mapping of a DMO name string to its object ID and the object owner. The service is hash distributed across a set of nodes in the system cluster 3305. In the present example, the set of nodes is a name service group that is determined by the cluster manager 3314.

The DMO owner 3342 is a single-node service that manages a DMO. The node corresponding to the client proxy 3340 that creates the DMO becomes the DMO owner 3342. The DMO owner 3342 is responsible for selecting (via a cluster manager 3314) an initial object node group 3330 to contain the DMO and for assigning the chunk replicas 3344 within that node group 3330. Some embodiments may contain additional object node groups 3332, 3334, etc. The DMO owner 3342 also manages growing, shrinking, migrating, and recovering both the object node group 3330 as a whole, and the chunk replica 3344 assignments within that group, as required to meet the DMO's size and replication requirement, or to optimize its usage efficiency. The DMO owner 3342 can choose to move to another node (e.g., to be on the same node as a write client proxy). If the DMO owner 3342 node fails, the DMO's node group will re-elect a new DMO owner. The DMO owner 3342 keeps track of client proxies and orchestrates all updates affecting the DMO (e.g., configuration changes as well as data writes (msync commits and/or write 10)).

The chunk replica 3344 is a slave entity to the object owner 3342 and client proxy 3340. The DMO owner 3342 and client proxy 3340 read from and write to the chunk replica 3344. The chunk replica 3344 owns some amount of memory/storage devices (PMEM, DRAM, SSD, etc.) on its node and manages the details of how/where a chunk of address space is stored therein.

The client proxy 3340 performs all input/output operations for the client and locally materializes and synchronizes/persists any object that the client requests to be memory mapped. To do that materialization, the client proxy 3340 creates a local cache for pieces of remote chunks that are in use and manages selection and eviction of pieces that are unused (or less actively used) as capacity constraints require. In some embodiments, the client proxy 3340 has code to specifically handle page fault notifications received, for example, from the userfaultfd mechanism of Linux. The client proxy 3340 may similarly be configured to handle other types of page fault notifications in other operating environments.

Figure 34:
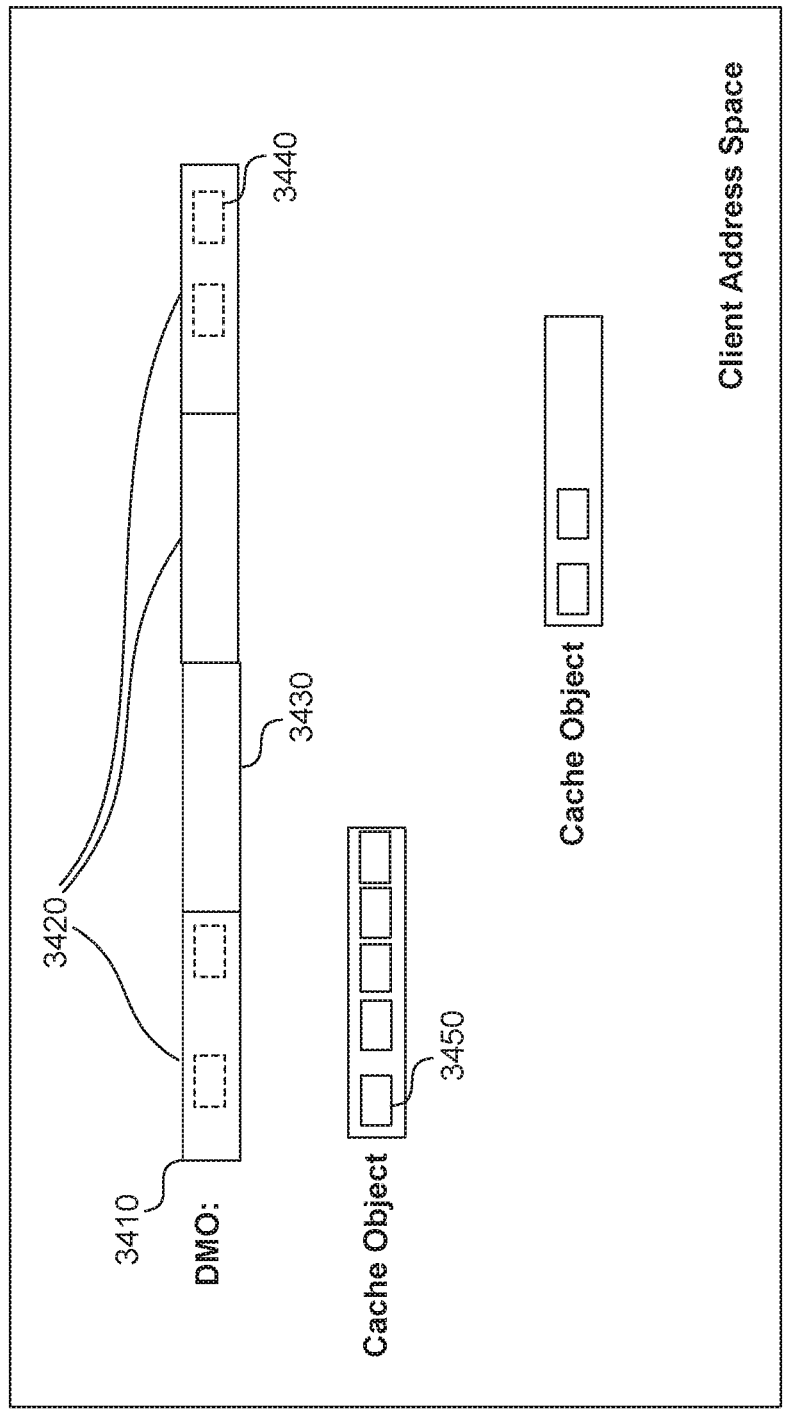
FIG. 34 shows a diagram that illustrates an example DMO in a client address space.

FIG. 34 shows a diagram that illustrates an example DMO in a client address space. When a client proxy 3340 opens a DMO, the client proxy 3340 allocates a logical address region 3410 or space for that DMO and registers the region to monitor for page faults. The client proxy 3340 then direct maps for any local chunks 3430 at their appropriate offset within the logical address region. Next, the client proxy 3340 acquires an RDMA access descriptor to an instance of each remote chunk. The client proxy 3340 then creates and maps one or more persistent memory files to use as a cache 3450. Now when the application accesses a region of that DMO space that is not direct mapped, a page fault is signaled and the client proxy's page fault handler will allocate an area of the cache file, fill the cache file via an RDMA read of the appropriate remote chunk area 3420, and then map that area of the cache file into its appropriate offset of the DMO region, thus completing the handling of the page fault.

In some embodiments, management of the cache capacity may require that a previously allocated area of cache be removed from its current role in the DMO address space (i.e., evicted) in order to reassign it for a new role. This eviction process can typically happen as a background task where an eviction candidate is selected, unmapped from the DMO space, and written back via an RDMA write to its remote location if required. The cache area of that candidate is then freed for reallocation.

With continued reference to FIG. 34 and additional reference to FIG. 33, a client application installed in a client node or local node, which may be any node in the system cluster of FIG. 33, opens a DMO name. For example, an application may transmit, generate, communicate, or otherwise invoke a memory call to a memory function library or other API associated with DMO system 3300 (herein referred to as a "DMO API" for illustrative simplicity) which may in turn call a client proxy 3340. As previously discussed, in some embodiments, the call by the application may be a captured call to a memory function such as malloc( ). The DMO API is configured to map an anonymous memory region equal to the size of the DMO, to register that memory region for user page faults, to over map 3440 the local chunk files on that memory region, and to remember the cache file for later use. The client proxy 3340 is configured to call the DMO name service 3324 to get the DMO owner 3342, call the DMO owner 3342 to get table of chunk nodes, to open "local chunk" files that are on the local node, to open an empty "cache file" or "cache object" on the local node, and to reply to the DMO API in the local node with file information including: a file descriptor for the local chunk files on the local node and a file descriptor for the cache file/object. The file descriptor for the local chunks may include an offset within the logical address space for the DMO and a size for the local chunk.

The client application starts using the DMO. In other words, the client application can perform load/store references to the DMO, and/or read/write input/output calls to/from the DMO. If a load/store reference from the client application accesses a DMO region that is not over mapped, the client application may take or otherwise receive a page fault. The DMO API may receive a page fault notification and calls to the client proxy 3340. The client proxy 3340 caches the needed region into the cache file and replies to the DMO API. The DMO API then can over map the new region onto an appropriate local DMO space.

Thus, from a client application perspective, the DMO system 3300 enables a user, via the client application in conjunction with a client proxy 3340, to initiate the use of a DMO, have data placed in one or more memory regions mapped to the DMO by either of a store call or a write call, and access data stored in one or more memory regions mapped to the DMO by a load call or a read call.

Figure 35:
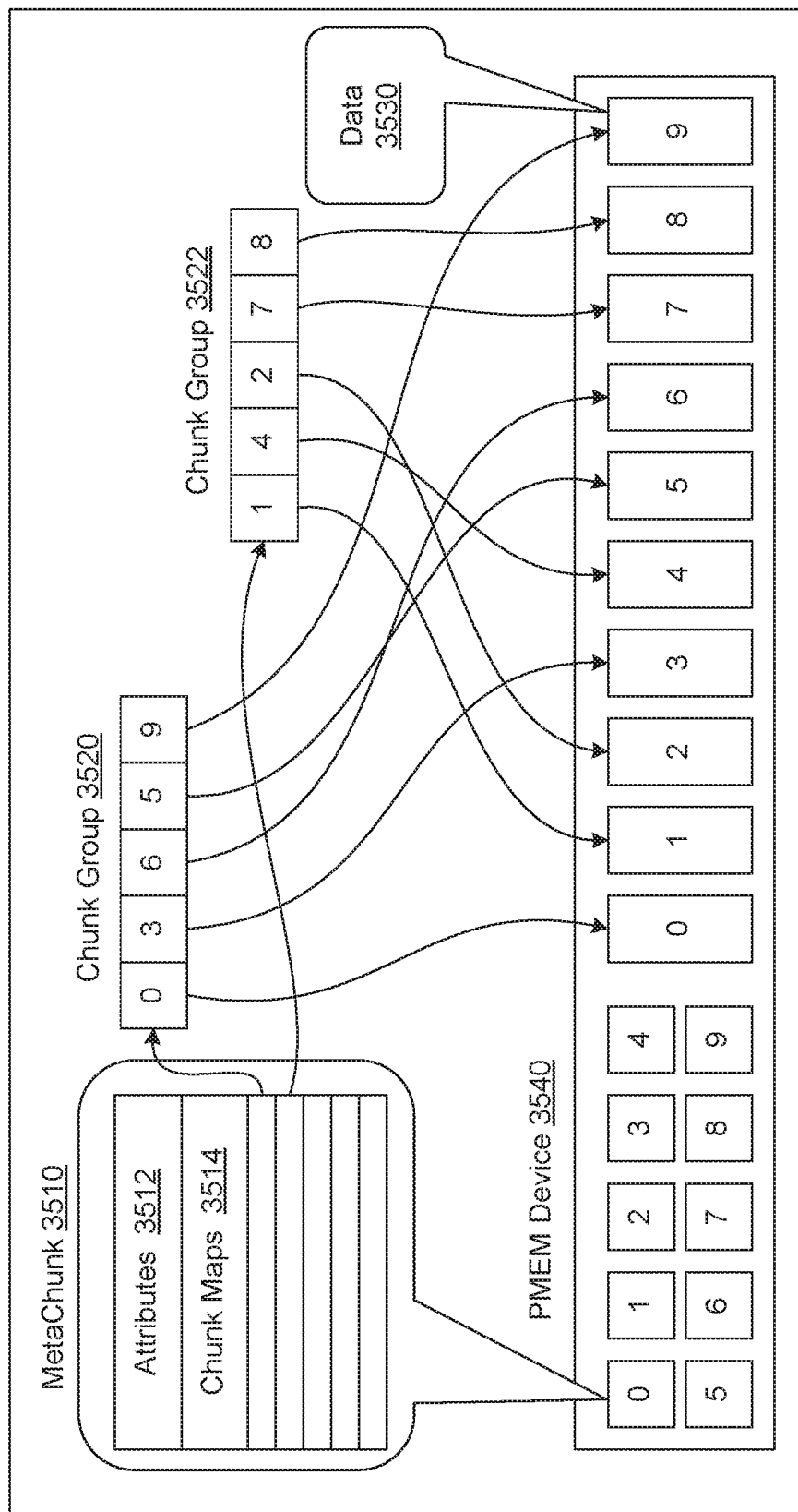
FIG. 35 is an illustration of a chunk-based file in a DMO architecture.

FIG. 35 is an illustration of a chunk-based file in a DMO architecture. The embodiment illustrated in FIG. 35 includes a meta chunk 3510 which includes attributes 3512 and chunk maps 3514. The meta chunk 3510 is stored on a PMEM device 3540 and associates with chunk group 3520, chunk group 3522 and data 3530. As is illustrated in FIG. 35, chunk group 3520 and chunk group 3522 are stored as data within PMEM device 3540 and a chunk map 3514 in the meta chunk 3510 coordinates each chunk group with a location in the PMEM device 3540.

In this way, a DMO architecture may utilize two types of chunks to organize a file, a data chunk 3530 and a meta chunk 3510. The data chunk 3530 is a piece of data in a file. The data chunk 3530 may have a fixed or variable size. The meta chunk 3510 includes information about the file, including attributes 3512 and chunk maps 3514. Attributes 3512 may include common attributes needed by a file, such as size, btime, mtime, etc., while chunk maps 3514 include chunk information that is usable by a file to locate every data chunk. Chunk information may describe the identity and location of a data chunk. A chunk group is a logical conception to help improve object locality and it describes a batch of chunks in a same PMEM device 3540.

Figure 36:
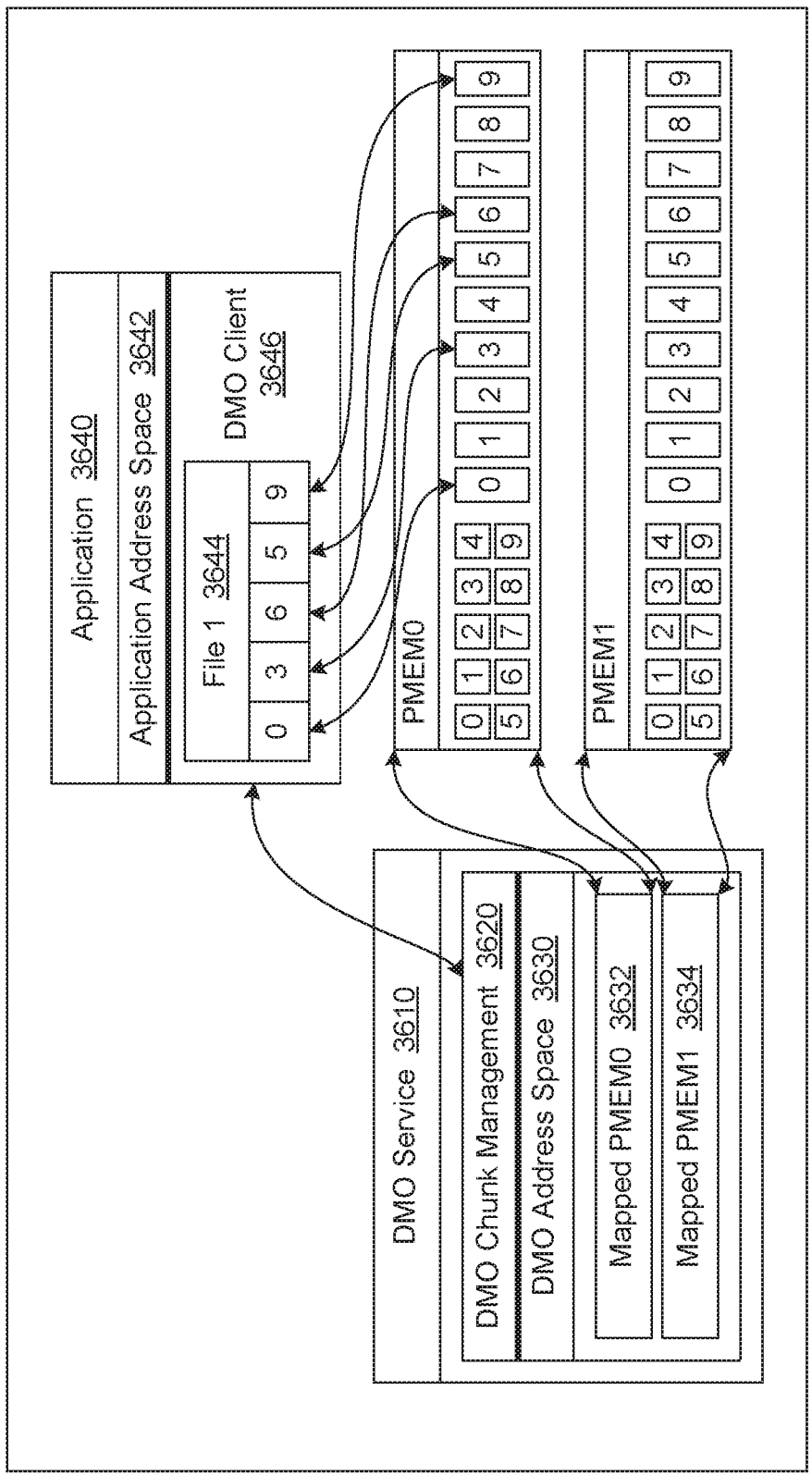
FIG. 36 shows a diagram that illustrates memory mapped 10 in a chunk map based DMO.

FIG. 36 shows a diagram that illustrates memory mapped 10 in a chunk map based DMO. The embodiment in FIG. 36 includes a DMO service 3610 containing a DMO chunk management 3620, and a DMO address space 3630 which includes a first mapped PMEM0 3632 and a second mapped PMEM1 3634. The illustrated embodiment further includes a user application 3640 (e.g., similar to application 410) in communication with DMO chunk service 3610. The user application 3640 may include a virtual memory address space 3642 have a first file 3644 and a DMO client 3646. As illustrated in FIG. 36, the first file 3644 may have data stored in PMEM0 3632. In this way, the DMO service 3610 maps PMEM devices into virtual memory address space and DMO service 3610 can access meta chunks and data chunks directly.

A single user application 3640 is shown, but in practice there may be multiple user applications accessing a sharable DMO. In such cases, each application may access different files. However, for security reasons, each application may only map needed chunks instead of all devices. As discussed above, user application 3640 may implement DMO client 3646 to integrate with DMO service 3610. DMO client 3646 may communicate with DMO service 3610 through an inter process communication (IPC) to perform the actual read/write 10 operations.

In process, a client 3646 may receive a file's chunk map information from DMO service 3610 and map the corresponding data chunk directly into the application virtual memory address space 3642. After the chunk is mapped, the user application 3640 can access the chunk directly without further involvement from the DMO Service 3610. Further, by using a memory mapped 10 procedure, the user application 3640 can direct access file data and avoid any extra memory copy between different memory buffers.

Figure 37:
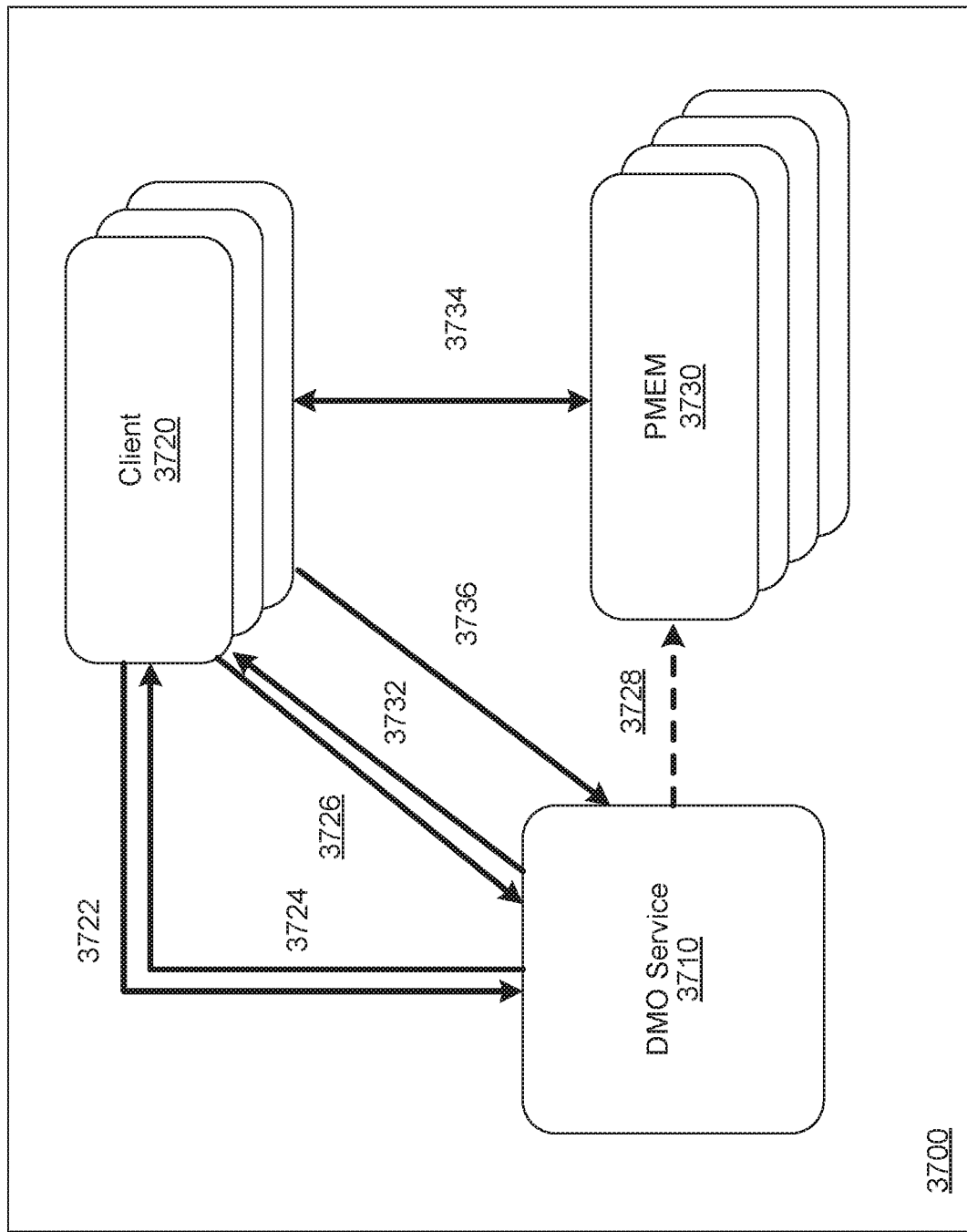
FIG. 37 shows a diagram that illustrates an example client 10 process in a DMO architecture.

FIG. 37 shows a diagram that illustrates an example client 10 process 3700 in a DMO architecture. Initially, IPC connections between a client 3720 and DMO service 3710 are established at operation 3722 to exchange certain data. An IPC connection may utilize a UNIX domain socket, a Share Memory, a network socket or any other system IPC facilities.

Example process continues at operation 3724, with the client 3720 obtaining PMEM device information from the DMO service 3710. After the IPC connection is established at operation 3722, the client 3720 may receive PMEM device information so that the client 3720 can access chunks using chunk info, etc. In some embodiments, chunk information contains a device ID to indicate which PMEM device this chunk belongs to; an offset to indicate the start offset on the PMEM device 3730 of the chunk data; and a length value indicating the length of chunk data.

Example process 3700 continues at operation 3726 with receiving map information. That is, when a client 3720 wants to access a file, the client 3720 requests that the DMO Service 3710 provides the information needed for chunk maps.

Example process 3700 continues at operation 3728 with the DMO service 3710 preparing chunk information for the client 3720. Operation 3728 may cover multiple cases. For example, when a chunk does not exist (for example, when a client 3720 plans to write a file but there is no chunk for the request write range), the DMO service 3710 will allocate a chunk for it. As another example, when a chunk exists and is in local PMEM device, the DMO service 3710 may provide the chunk information to client 3720. As yet another example, when a chunk exists but is in a remote node's PMEM device, the DMO service 3710 will allocate a temporary cache chunk and grab the needed data from remote PMEM chunk so the client 3720 can map the chunk in a local device.

Example process 3700 continues at operation 3732 with return chunk information back to client 3720 after preparing the chunks. An 10 request may involve multiple chunks, therefore the DMO service 3710 may be configured to aggregate the chunk information returned to the client 3720.

Example process 3700 continues at operation 3734 with the client 3720 mapping, based on the retrieved map information, all chunks into a virtual memory space by, for example: (1) using anonymous mmap( ) to get a continuous virtual memory space; and (2) using MAP FIXED mmap( ) to map a piece of PMEM device to the memory space obtained from (1) according to the chunk info. In some embodiments, the example client 10 process 3700 repeats (2) for all the chunks. After all chunks are mapped, the client 3720 receives a file's data and can use it directly.

Once the client 3720 is done with the data, the client 3720 may, at operation 3736, notify the DMO service 3710 to update metadata based on any potential changes.

Figure 38:
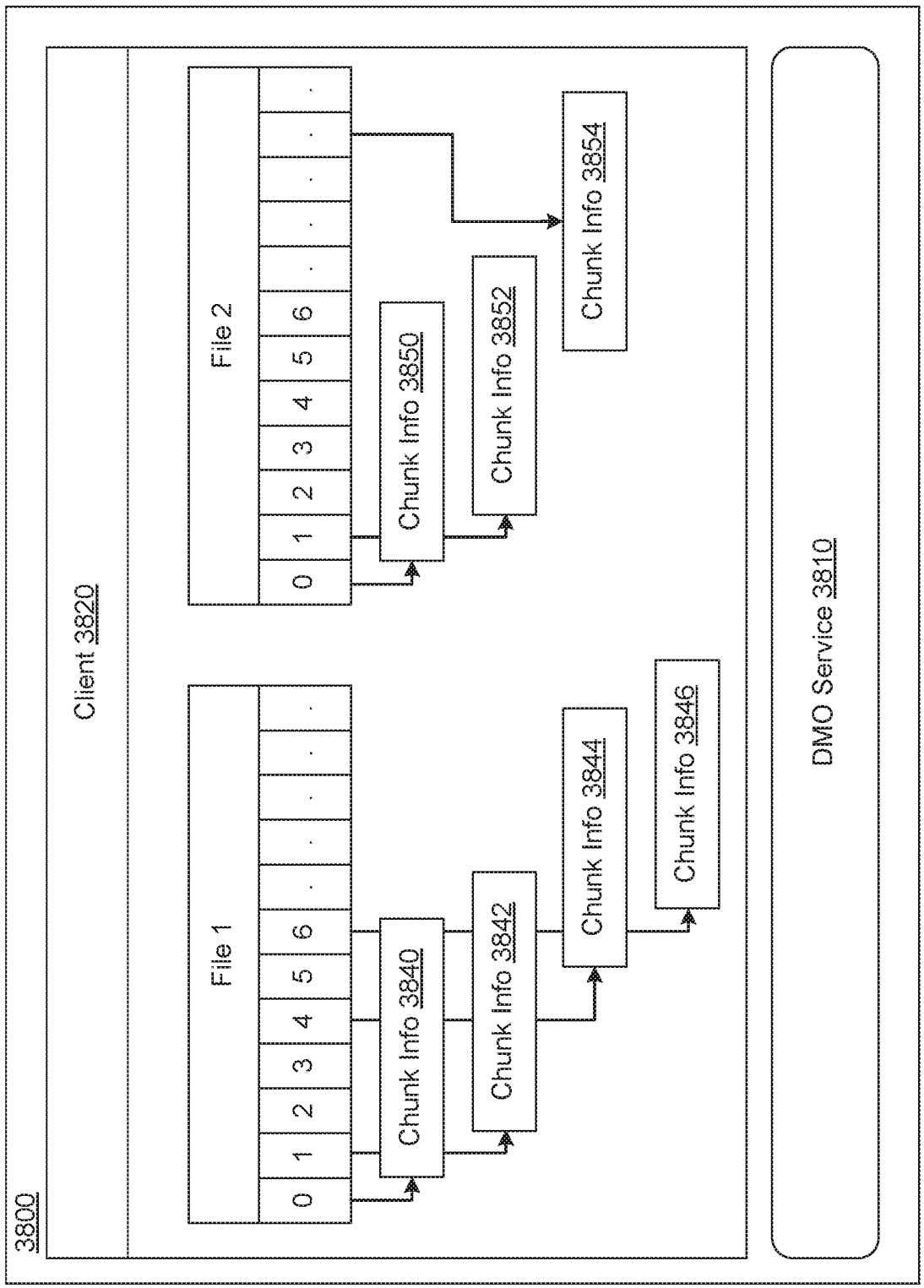
FIG. 38 shows a diagram that illustrates an example client-side cache in a DMO architecture.

FIG. 38 shows a diagram that illustrates an example client-side cache 3800 in a DMO architecture. As described with respect to FIG. 37, a client 3820 (i.e., similar to client 3720) will receive chunk information 3840, 3842, 3844,

3846, 3850, 3852 and 3854 from a DMO service 3810 for any IO operations. As an IPC between a DMO client 3820 and DMO service 3810 can take a certain amount of time, in the case where a user application needs a lot of small IO, the IPC overhead can be a performance bottleneck. A client-side cache can be used to address this type of bottleneck. In some embodiments, a DMO client 3820 may only cache the chunk information which is a very small data structure. Thus, a DMO client-side cache can be implemented in a memory conserving manner.

In the illustrated embodiment, a chunk information cache may be file based. Therefore, in the memory, each file will maintain a cache map for the file chunks. After adding a client-side cache, the IO process changes accordingly in the DMO client side. For example, a user application may require an IO operation. In response, a DMO client 3820 will check if the relevant chunk information has already existed in the chunk information cache. If yes, the DMO client 3820 can just return the chunk information back for IO. If not, request can be made to the DMO service 3810, via IPC, for the chunk information. Then, the user application can receive the chunk information and can perform 10.

Figure 39:
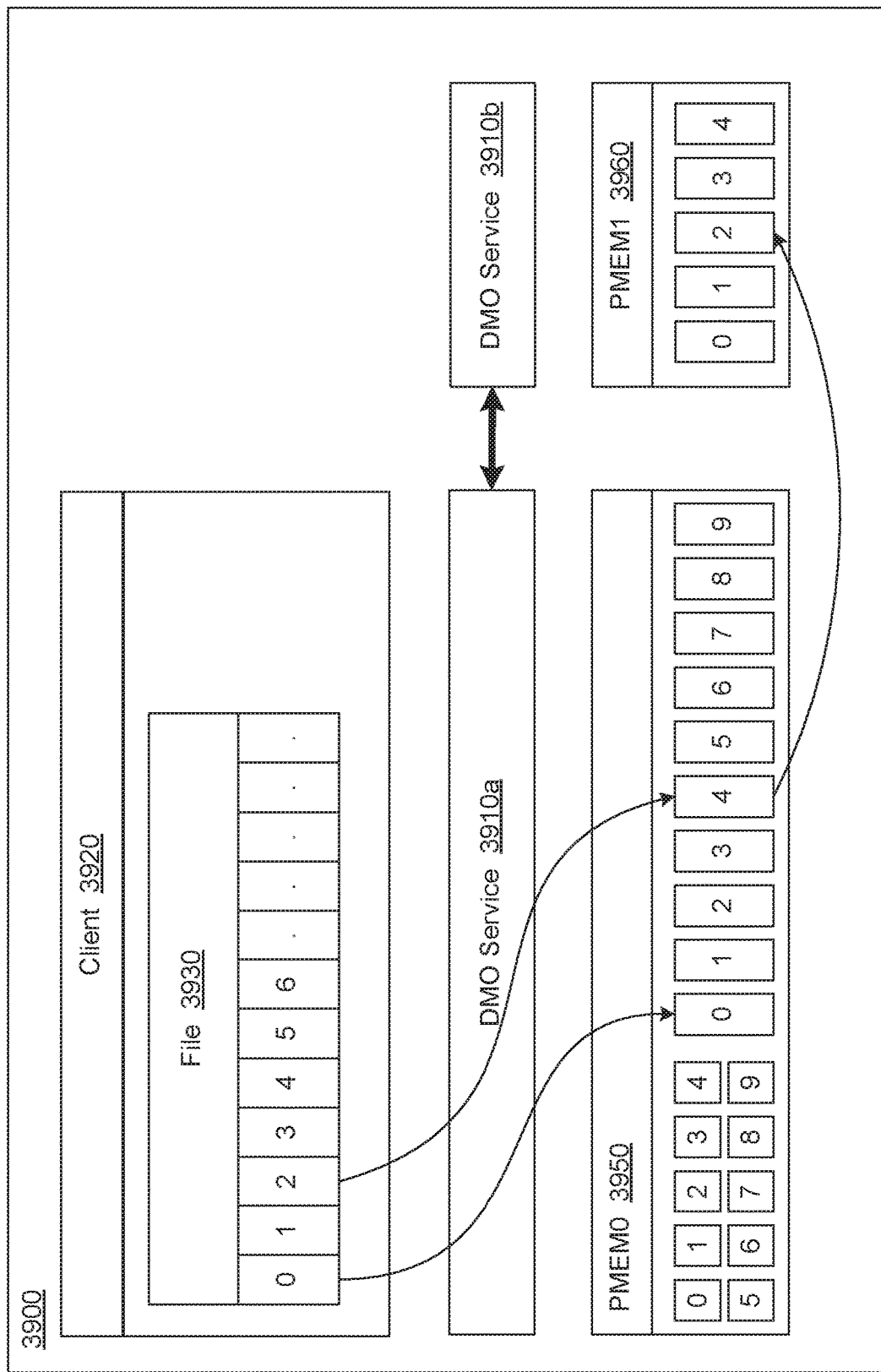
FIG. 39 shows a diagram that illustrates an example DMO architecture that includes remotely located PMEM.

FIG. 39 shows a diagram that illustrates an example DMO architecture 3900 that includes remotely located PMEM. The example architecture 3900 includes a client 3920, having a file 3930, a DMO service 3910*a-b*, and PMEM 3950 and 3960. In this embodiment, a DMO service 3910*a-b* splits a file into many chunks and the chunks can reside on different PMEM devices installed on different nodes.

In some embodiments, to simplify a user application's access, the user application will communicate directly with a local DMO service (e.g., DMO service 3910*a*), and can map the local PMEM device to the user application's virtual memory address. Thus, a DMO service will be configured to handle the case where data is on remote PMEM devices. A DMO approach can therefore implement a cache chunk mechanism to support this case. For example, when a client 3920 plans to access chunk 2 in file 3930, the client 3920 accesses the DMO service 3910*a* to get the chunk information. At this stage, the DMO service 3910*a* determines chunk 2 is on another node's PMEM1 3960. The DMO service 3910*a* then allocates a cache chunk from local PMEM0 3950 (chunk #4) and copies the contents from PMEM1 3960 via a high-speed network (RDMA/dpkg/ . . . ) to PMEM0 3950. After the data is ready, the DMO service 3910*a* returns chunk information of cache chunk #4 back to client 3920 and the client 3920 can use the chunk information locally.

Next, after a file is closed, all remote chunk data can be flushed back to remote PMEM 3960 and the cache chunk can be removed. For future use and to reduce the network data throughput, the DMO service 3910*a* may keep the cache chunk in a local PMEM device 3950, so if the remote chunk is needed again the DMO service 3910*a* doesn't need to re-copy the data. In this case, chunk revalidation may be needed to ensure the cached data is updated. In this way, a DMO service 3910*a* can use a last modified time stamp (mtime) as a key. In the case the chunk is modified, the mtime will be updated. Cached data can therefore be discarded and re-retrieved from the remote chunk. If not, the local cache can be used directly.

The cache chunk will use the local PMEM 3950 device space, so when there's not enough space, the DMO service 3910*a* will evict some cached chunks to free up more memory space. In similar fashion to the embodiment illustrated in FIG. 38, the DMO service 3910*a* can use an LRU or equivalent process to choose which chunk should be evicted.

A DMO can provide a larger memory space than is physically available (e.g., in a physical PMEM media) at a given node. Several approaches can be taken to provide such a memory space including a kernel space approach, a user space approach, and a hypervisor approach.

In a kernel space approach, the kernel memory management can be used to intercept page faults from a client process (e.g., an application process). As a kernel entity, the page fault handler can directly manipulate the address map. The page fault handler can maintain a memory pool where the page fault handler caches a copy of the required data, and then directly maps it into the client's address space. A kernel space approach can provide a fast, efficient access to memory map; however, it may involve the use of a custom operating system which may increase scope of testing.

Figure 40:
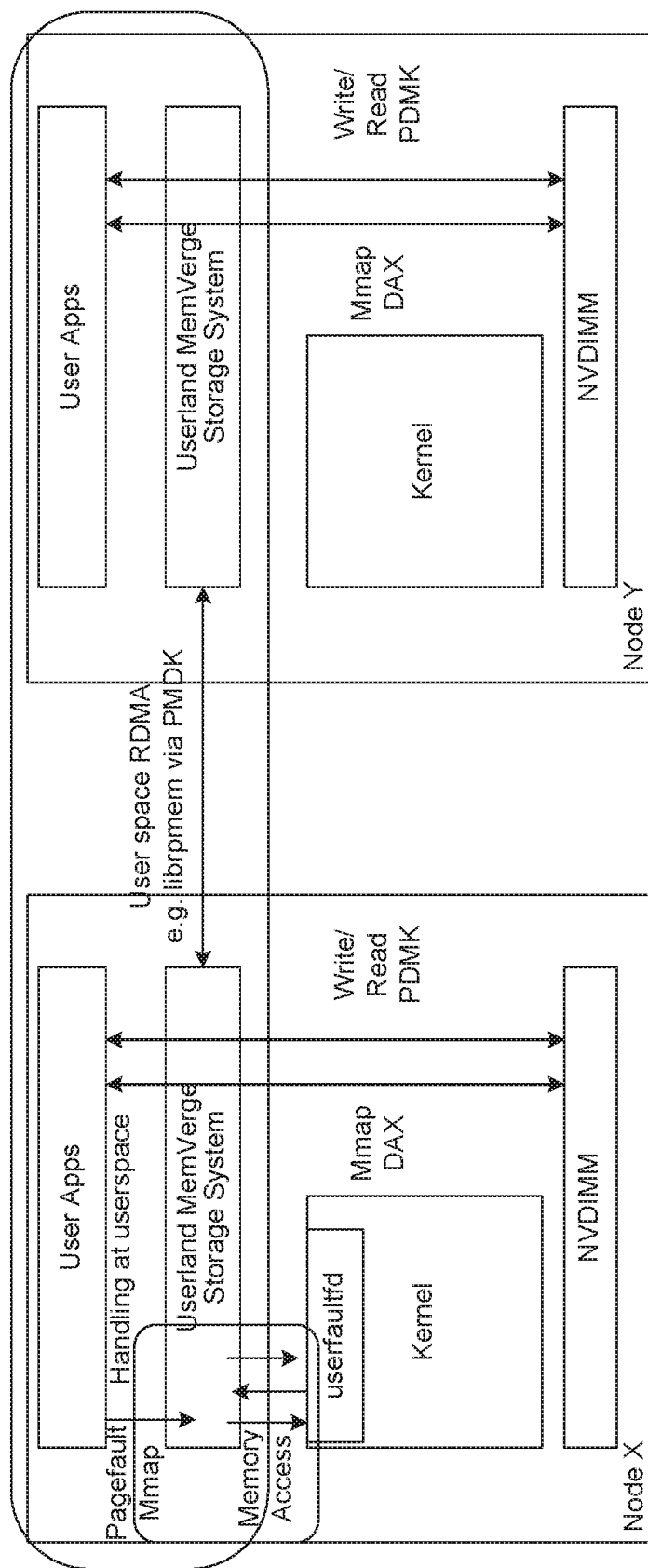
FIG. 40 shows a diagram illustrating components and processes for implementing a larger memory space across nodes in a DMO architecture by a user space approach.

FIG. 40 shows a diagram illustrating components and processes for implementing a larger memory space across nodes by a user space approach. The user space approach may use the Linux userfaultfd mechanism to monitor a logical address space of a client (e.g., an application) and provide notification whenever access to a non-resident page of the object is attempted. Since a user space process cannot directly control physical memory mapping, it uses a direct access (DAX) file system to indirectly affect this.

The data for the faulting area is copied to a local file and that file is mapped into the client's address space, thus materializing the data for the page fault. This mechanism is less intrusive to the operating environment in that it does not require a new operating system or customization of an existing operating system. A user space approach may provide fast development, which in turn may be beneficial to both prototype and product developments. Furthermore, a user space approach may facilitate experiments with different new technologies invented for user space applications. Additionally, a user space approach may be easy to deploy, easy to containerize, and may easily connect to other user space storage frameworks such as SPDK.

Figure 41:
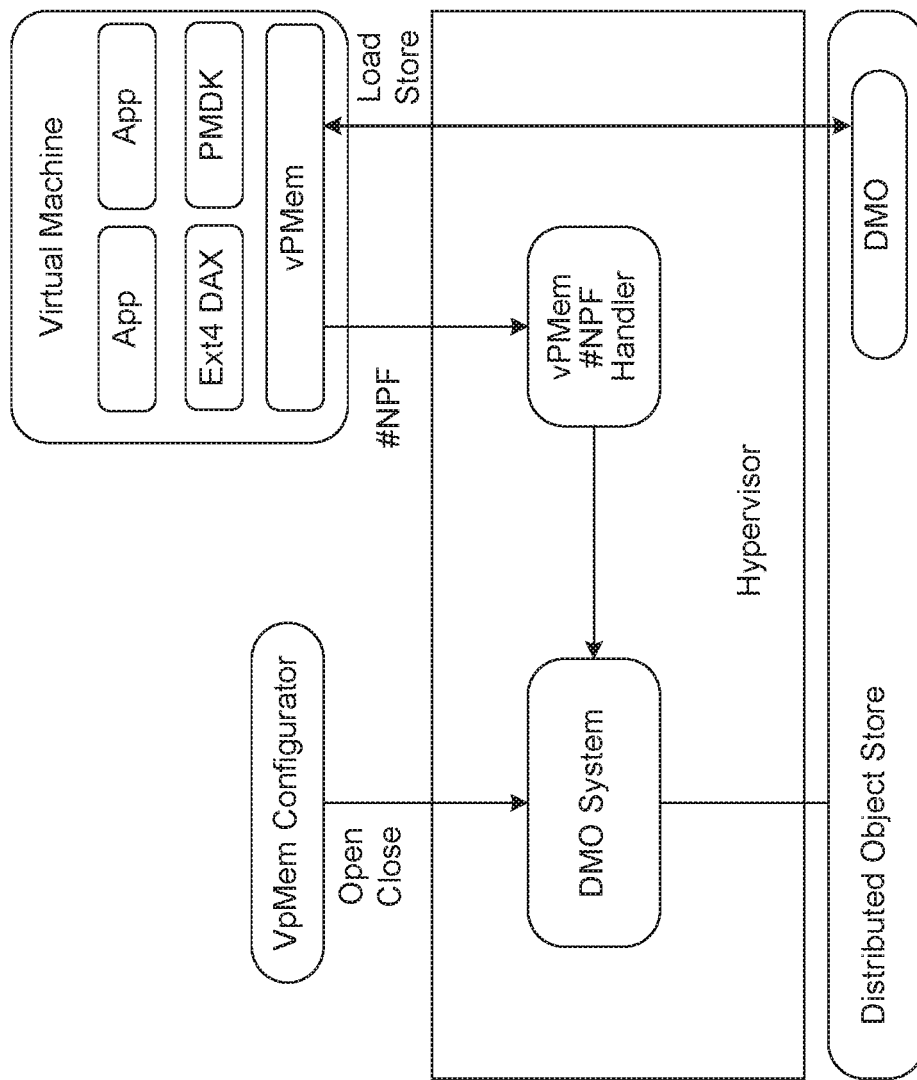
FIG. 41 shows a diagram illustrating components and processes for implementing a larger memory space across nodes in a DMO architecture by a hypervisor approach.

FIG. 41 shows a diagram illustrating components and processes for implementing a larger memory space across nodes by a hypervisor approach. In the hypervisor approach, one or more virtual PMEM (vPMem) devices is presented to the host operating system. Each vPMem is a logical address space within the hypervisor address map that gets presented to the host operating system as its physical address space. The hypervisor's memory manager intercepts the page faults to that space to materialize the assigned object's data. Analogous to the operating system kernel, a hypervisor has direct access to its map. The page fault handler can therefore maintain a memory pool in which it caches required data, and then map that data into a host operating system's address space to service a page fault. Note that the page fault can be from a user application in the host operating system, or from a host operating system component, etc. This approach can provide a fast, efficient access to memory map, and does not require a new operating system or customization of an existing operating system.

6. Computer Processing System

FIG. 42 shows a block diagram that illustrates an example computer processing system 4200 in which at least some operations described herein can be implemented. For example, some components of the computer processing system 4200 may be part of a computer system in which an application (e.g., application 410) is executing an application process and/or any one or more of the nodes associated with a distributed computing cluster such as DMO system 3300 described with respect to FIG. 33.

The processing system 4200 may include one or more processing units ("processors") 4202, memory 4206, network adapter 4212 (e.g., network interface), video display 4218, input/output devices 4220, control device 4222 (e.g., keyboard and pointing devices), drive unit 4224 including a storage medium 4226, and signal generation device 4230 that are communicatively connected to a bus 4216. The bus 4216 is illustrated as an abstraction that represents one or more physical buses and/or point-to-point connections that are connected by appropriate bridges, adapters, or controllers. The bus 4216, therefore, can include a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus (also referred to as "Firewire").

The processor 4202 may include programmable circuitry such as one or more microprocessors (e.g., CPU or GPU), FPGAs, PLDs, etc., special-purpose hardwired (i.e., non-programmable) circuitry such as ASICs, or a combination of such forms.

The memory 4206 may include volatile memory (e.g., DRAM), and/or non-volatile memory (e.g., PMEM).

The processing system 4200 may share a similar computer processor architecture as that of a server computer, a desktop computer, a tablet computer, personal digital assistant (PDA), mobile phone, a wearable electronic device (e.g., a watch or fitness tracker), network-connected ("smart") device (e.g., a television or home assistant device), virtual/augmented reality systems (e.g., a head-mounted display), or any other electronic device capable of executing a set of instructions (sequential or otherwise) that specify action(s) to be taken by the processing system 4200.

Memory 4206 and storage medium 4226 may be collectively referred to as "machine-readable media" and/or "storage media." The terms "machine-readable media" and "storage media" should be taken to include a single medium and/or multiple media (e.g., a centralized/distributed database and/or associated caches and servers) that store one or more sets of instructions 4204, 4208, and 4228. The term "machine-readable media" and "storage media" shall also be taken to include any medium that is capable of storing, encoding, or carrying a set of instructions for execution by the processing system 4200.

In some cases, the routines executed to implement certain embodiments of the disclosure may be implemented as part of an operating system or a specific application, component, program, object, module, or sequence of instructions (collectively referred to as "computer programs"). The computer programs typically comprise one or more instructions (e.g., instructions 4204, 4208, 4228) set at various times in various memory and storage devices in a computing device. When read and executed by the one or more processors 4202, the instruction(s) cause the processing system 4200 to perform operations to execute elements involving the various aspects of the disclosure.

Moreover, while embodiments have been described in the context of fully functioning computing devices, those skilled in the art will appreciate that the various embodiments are capable of being distributed as a program product in a variety of forms. The disclosure applies regardless of the particular type of machine or computer-readable media used to actually effect the distribution.

Further examples of machine-readable storage media, machine-readable media, or computer-readable media include recordable-type media floppy and other removable disks, HDDs, optical discs (e.g., Compact Disc Read-Only Memory (CD-ROMS), Digital Versatile Discs (DVDs)), and transmission-type media such as digital and analog communication links.

The network adapter 4212 enables the processing system 4200 to mediate data in a network 4214 with an entity that is external to the processing system 4200 through any communication protocol supported by the processing system 4200 and the external entity. The network adapter 4212 can include a network adaptor card, a wireless network interface card, a router, an access point, a wireless router, a switch, a multilayer switch, a protocol converter, a gateway, a bridge, a bridge router, a hub, a digital media receiver, and/or a repeater.

The network adapter 4212 may include a firewall that governs and/or manages permission to access/proxy data in a computer network, as well as tracks varying levels of trust between different machines and/or applications. The firewall can be any number of modules having any combination of hardware and/or software components able to enforce a predetermined set of access rights between a particular set of machines and applications, machines and machines, and/or applications and applications (e.g., to regulate the flow of traffic and resource sharing between these entities). The firewall may additionally manage and/or have access to an access control list that details permissions, including the access and operation rights of an object by an individual, a machine, and/or an application, and the circumstances under which the permission rights stand.

7. Remarks

The foregoing description of various embodiments of the claimed subject matter has been provided for the purposes of illustration and description. It is not intended to be exhaustive or to limit the claimed subject matter to the precise forms disclosed. Many modifications and variations will be apparent to one skilled in the art. Embodiments were chosen and described in order to best describe the principles of the invention and its practical applications, thereby enabling those skilled in the relevant art to understand the claimed subject matter, the various embodiments, and the various modifications that are suited to the particular uses contemplated.

Although the Detailed Description describes certain embodiments and the best mode contemplated, the technology can be practiced in many ways no matter how detailed the Detailed Description appears. Embodiments may vary considerably in their implementation details, while still being encompassed by the specification. Particular terminology used when describing certain features or aspects of various embodiments should not be taken to imply that the terminology is being redefined herein to be restricted to any specific characteristics, features, or aspects of the technology with which that terminology is associated. In general, the terms used in the following claims should not be construed to limit the technology to the specific embodiments disclosed in the specification, unless those terms are explicitly defined herein. Accordingly, the actual scope of the technology encompasses not only the disclosed embodiments, but also all equivalent ways of practicing or implementing the embodiments.

The language used in the specification has been principally selected for readability and instructional purposes. It may not have been selected to delineate or circumscribe the subject matter. It is therefore intended that the scope of the technology be limited not by this Detailed Description, but rather by any claims that issue on an application based hereon. Accordingly, the disclosure of various embodiments is intended to be illustrative, but not limiting, of the scope of the technology as set forth in the following claims.

What is claimed is:

1. A method for capturing a memory image, the method comprising:
enabling an application to use persistent memory (PMEM) as volatile-mode memory to store and access in-memory data during execution of a process;
generating metadata indicative of a particular state of the PMEM at a particular time during execution of the process;
storing the metadata in a non-volatile storage;
safekeeping, in the PMEM, a particular state of the in-memory data as it exists at the particular state of the PMEM;
generating a copy of the particular state of the in-memory data;
storing the copy of the particular state of the in-memory data in the PMEM; and
enabling the application to use the copy of the particular state of the in-memory data in the PMEM to initiate execution of a second instance of the process, wherein the process and the second instance of the process execute in parallel.

2. The method of claim 1, wherein safekeeping the particular state of the in-memory data includes preventing modification of the in-memory data from the particular state to a new state until at least the process has completed execution.

3. The method of claim 1, wherein safekeeping the particular state of the in-memory does not include copying the in-memory data from the PMEM to a separate non-volatile storage device.

4. The method of claim 1, wherein the metadata is indicative of mappings between a logical address space associated with the application and the PMEM at the particular time.

5. The method of claim 1, wherein the metadata includes:
first metadata indicative of a first mapping, at the particular time, from a logical address space associated with the application to a file offset; and
second metadata indicative of a second mapping, at the particular time, from the file offset to a physical address space associated with the PMEM.

6. The method of claim 1, further comprising:
monitoring a state of the PMEM during execution of the process;
wherein the metadata is generated based on the monitored state of the PMEM.

7. The method of claim 1, further comprising:
maintaining a record of mappings between a logical address space associated with the application and the PMEM during execution of the process;
wherein the metadata is generated based on the record of the mappings.

8. The method of claim 7, further comprising:
receiving a memory call from the application;
in response to receiving the memory call, mapping a portion of the PMEM into the logical address space associated with the application; and
updating the record of mappings to reflect the portion of PMEM mapped into the logical address space associated with the application.

9. The method of claim 7, wherein maintaining the record of mappings includes:
continually updating the record of mappings as portions of PMEM are mapped into the logical address space associated with the application.

10. The method of claim 1, further comprising:
causing execution of the process to freeze at the particular time before generating the metadata.

11. The method of claim 10, further comprising:
flushing data from a cache to the PMEM.

12. The method of claim 10, wherein safekeeping the particular state of the in-memory data includes:
after causing execution of the process to freeze, write protecting the in-memory data at the particular state of the PMEM.

13. The method of claim 12, wherein write protecting the in-memory data includes setting write protection in mappings between a logical address space of the application and the PMEM.

14. The method of claim 12, wherein write protecting the in-memory data sets up a copy-on-write (CoW) operation, wherein the CoW operation is triggered when the application or another application attempts to modify the particular state of the in-memory data.

15. The method of claim 12, wherein capturing the memory image further includes:
causing execution of the process to resume after write protecting the in-memory data.

16. The method of claim 15, wherein at least some of the metadata is generated after execution of the process resumes.

17. The method of claim 1, wherein the non-volatile storage is the PMEM.

18. The method of claim 1, wherein storing the metadata includes:
generating a capture file object based on the metadata; and
storing the capture file object in the non-volatile storage.

19. The method of claim 1, wherein the memory image is a first memory image, the metadata is first metadata, the particular state of the PMEM is a first state of the PMEM, and the particular time is a first time, the method further comprising:
capturing a second memory image by:
generating second metadata indicative of a second state of the PMEM at a second time during execution of the process, the second time after the first time; and
storing the second metadata in the non-volatile storage; and
safekeeping, in the PMEM, the second state of the in-memory data as it exists at the second state of the PMEM.

20. The method of claim 19,
wherein the first metadata includes:
a first family pointer indicative that the second memory image is a child to the first memory image; and
a first chunk index and pointer indicative of a plurality of chunks of the PMEM mapped to a logical address space associated with the application;
wherein the second metadata includes:
a second family pointer indicative that the first memory image is a parent to the second memory image; and a second chunk index and pointer indicative of one or more of the plurality of chunks that differ from the first chunk index associated with the first memory image.

21. The method of claim 1,
wherein the memory image is one of a plurality of memory images captured at different times during execution of the process; and
wherein the metadata associated with the memory image includes a linked difference-only index and/or a linked full-index.

22. The method of claim 1, wherein enabling the application to use the PMEM as volatile-mode memory includes:
virtualizing a memory object as anonymous byte-addressable memory for use by the application.

23. The method of claim 22, wherein the memory object is a distributed memory object.

24. The method of claim 1, further comprising:
enabling the application to use the memory image to resume execution of the process after an interruption in the execution of the process.

25. The method of claim 24, wherein the interruption is due to any of:
a loss of power by a computer system in which the process is executing;
a processing failure in the computer system;
a temporary pause to free computing resources in the computer system; or
migration of the process from the computer system to a different computer system.

26. The method of claim 1,
wherein the application is an asynchronous replica application instance of a primary application instance;
wherein the process executed by the replica application instance is an asynchronous replica process of a primary process executed by the primary application instance; and
wherein the replica application instance executes the replica process by:
accessing records from a full log associated with the primary application instance; and
performing transactions indicated in the full log associated with the primary application instance.

27. The method of claim 26, further comprising:
positioning the memory image to enable the primary application instance to access the memory image for recovery.

28. The method of claim 26, the method further comprising:
at periodic intervals during execution of the primary process by the primary application instance:
generating a catch-up log based on the full log associated with the primary application instance, the catch-up log including a subset of records from the full log; and
causing the replica application instance to replay the catch-up log;
wherein the memory image is captured after the replica application instance has completed replaying a respective catch-up log.

29. The method of claim 1, wherein the in-memory data is first in-memory data, the method further comprising:
enabling the application to use volatile memory to store and access second in-memory data during execution of the process; and
copying the second in-memory data from the volatile memory to the non-volatile storage.

30. The method of claim 29, where the non-volatile storage is the PMEM.

31. The method of claim 29, wherein enabling the application to use the PMEM and the volatile memory includes:
virtualizing a memory object as anonymous byte-addressable memory for use by the application;
wherein the memory object is based on the PMEM and the volatile memory.

32. The method of claim 29, wherein the volatile memory is DRAM.

33. A system comprising:
a persistent memory (PMEM) configured for use as volatile-mode memory to enable an application to store and access in-memory data during execution of a process; and
a memory controller configured to:
generate metadata indicative of a particular state of the PMEM at a particular time during execution of the process;
store the metadata in a non-volatile storage; and
safekeep, in the PMEM, a particular state of the in-memory data as it exists at the particular state of the PMEM;
generate a copy of the particular state of the in-memory data;
store the copy of the particular state of the in-memory data in the PMEM; and
enable the application to use the copy of the particular state of the in-memory data in the PMEM to initiate execution of a second instance of the process, wherein the process and the second instance of the process execute in parallel.

34. A method for storing and managing time-evolved memory images, the method comprising:
enabling an application to use memory to execute a process;
capturing a plurality of memory images at various times during execution of the process, wherein a particular memory image of the plurality of memory images is indicative of a state of the memory at a current time; and
storing metadata associated with the plurality of memory images using a linked index scheme, wherein metadata associated with the particular memory image includes:
a chunk index data structure indicative of chunks that are owned by the particular memory image, wherein the chunks that are owned by the particular memory image include one or more chunks, of a plurality of chunks, that differ from a parent of the particular memory image;
wherein each of the plurality of chunks represents a portion of the memory mapped to an address space associated with the application;
wherein the parent of the particular memory image is one of the plurality of memory images captured earlier than the particular time;
detecting a change in memory mappings associated with the process during execution of the process; and
updating the chunk index data structure based on the change in the memory mappings.

35. The method of claim 34, wherein the chunk index data structure is configured as a full index.

36. The method of claim 35, wherein the full index includes chunk pointers to all of the plurality of chunks, and wherein the full index is associated with chunk status indicators that are indicative of the chunks that are owned by the particular memory image.

37. The method of claim 36,
wherein each of the chunk status indicators is stored with an associated chunk pointer in the full index; and/or
wherein the chunk status indicators are stored separately from the full index.

38. The method of claim 34, wherein the chunk index data structure is configured as a difference-only index.

39. The method of claim 38, wherein the difference-only index includes chunk pointers to only the chunks that are owned by the particular memory image.

40. The method of claim 39, wherein each of the chunk pointers indicate a location in the memory that is mapped to the address space associated with the application.

41. The method of claim 39, wherein the chunk pointers are stored as part of a key-value data structure, a hash-map data structure, or a tree data structure.

42. The method of claim 39, further comprising:
reconfiguring the chunk index data structure as a full index by:
obtaining, from one or more of the other plurality of memory images, chunk pointers to chunks that are not owned by the particular memory image;
updating the chunk index data structure to include the chunk pointers to chunks that are not owned by the particular memory image.

43. The method of claim 34, wherein the metadata associated with the plurality of memory images includes a plurality of chunk index data structures, each of the plurality of chunk index data structures associated with a different one of the plurality of memory images.

44. The method of claim 43,
wherein a first chunk index data structure of the plurality of chunk index data structures is configured as a full index; and
wherein a second chunk index data structure of the plurality of chunk index data structures is configured as a difference-only index.

45. The method of claim 43, wherein the metadata associated with the plurality of memory images further includes family pointers indicative of familial links between memory images in an ancestry chain.

46. The method of claim 34, wherein the metadata associated with the particular memory image further includes:
a parent pointer indicative of a link to the parent of the particular memory image;
a child pointer indicative of a link to a child of the particular memory image, wherein the child of the particular memory image is one of the plurality of memory images captured later than the particular time; and/or
a sibling pointer indicative of a link to a sibling of the particular memory image, wherein the sibling is an additional child of the parent of the particular memory image.

47. The method of claim 34, further comprising:
maintaining a record of memory mappings associated with process, during execution of the process;
wherein capturing the particular memory image includes:
causing, at the particular time, execution of the process to freeze;
after freezing the process, setting write protection in the memory mappings associated with the process;
generating, based on the record of the memory mappings, at least some of the metadata associated with the particular memory image; and
causing execution of the process to resume.

48. The method of claim 47, wherein write protecting the mapping sets up a copy-on-write (CoW) operation that is triggered when the process attempts to modify the memory mappings.

49. The method of claim 47, wherein the at least some metadata associated with the particular memory image is generated after causing execution of the process to resume.

50. The method of claim 47, wherein the particular memory image is a first memory image, wherein the metadata associated with the particular memory image is first metadata, and wherein capturing the particular memory image further includes:
before causing execution of the process to resume, creating a second memory image that is child to the first memory image by:
storing second metadata associated with the second memory image, wherein the second metadata includes:
a parent pointer indicative of a link to the first memory image; and
a second chunk index data structure indicative that no chunks are owned by the second memory image;
detecting a second change in the memory mappings associated with the process after execution of the process has resumed; and
updating the second chunk index data structure based on the second change in the memory mappings;
wherein the second chunk index data structure is updated to be indicative of one or more chunks that are owned by the second memory image, wherein the chunks that are owned by the second memory image include one or more chunks, of the plurality of chunks, that differ from the first memory image.

51. The method of claim 34, further comprising:
deleting the particular memory image;
wherein deleting the memory image includes freeing the chunks that are owned by the particular memory image.

52. The method of claim 34, further comprising:
deleting the particular memory image;
wherein deleting the memory image includes:
freeing a first mapped chunk that is owned by the particular memory image and that is also owned by a child of the particular memory image; and
merging, into the child of the particular memory image, a second mapped chunk that is owned by the particular memory image and not owned by the child of the particular memory image;
wherein the child of the particular memory image is one of the plurality of memory images captured later than the particular time.

53. The method of claim 34, further comprising:
copying the particular memory object;
wherein copying the memory object includes:
creating a new memory image;
designating the parent of the particular memory image as a parent of the new memory image;
copying, to the new memory image, the chunks that are owned by the particular memory image.

54. The method of claim 34, wherein updating the chunk index data structure includes:
adding a chunk pointer to the chunk index data structure, wherein the chunk pointer is indicative of a location in the memory that is mapped to the address space associated with the application; or
associating a chunk status identifier with an existing chunk pointer in the chunk index data structure, wherein the chunk status identifier is indicative that a mapped chunk associated with the existing chunk pointer is owned by the particular memory image.

55. The method of claim 34, wherein the memory includes volatile memory and/or byte-addressable persistent memory (PMEM).

56. The method of claim 34, wherein enabling the application to use the memory to execute the process includes:
   virtualizing a memory object as anonymous byte-addressable memory for access by one or more applications;
   wherein the memory object includes the memory.

57. The method of claim 56, wherein the memory object is a distributed memory object (DMO).

* * * * *